United States Patent
Murai et al.

(10) Patent No.: US 11,379,282 B2
(45) Date of Patent: Jul. 5, 2022

(54) RECORDING MEDIUM, RECORDING SYSTEM, RECORDING DEVICE, ANALYSIS DEVICE, AND RECORDING METHOD

(71) Applicant: C-RISE Ltd., Takaoka (JP)

(72) Inventors: Masanori Murai, Kanazawa (JP); Yutaka Mitsubayashi, Kanazawa (JP)

(73) Assignee: C-RISE Ltd., Takaoka (JP)

( * ) Notice: Subject to any disclaimer, the term of this patent is extended or adjusted under 35 U.S.C. 154(b) by 0 days.

(21) Appl. No.: 17/049,821

(22) PCT Filed: May 15, 2020

(86) PCT No.: PCT/JP2020/019430
§ 371 (c)(1),
(2) Date: Oct. 22, 2020

(87) PCT Pub. No.: WO2021/010008
PCT Pub. Date: Jan. 21, 2021

(65) Prior Publication Data
US 2021/0279121 A1 Sep. 9, 2021

(30) Foreign Application Priority Data
Jul. 16, 2019 (JP) .............................. JP2019-131457

(51) Int. Cl.
*G06F 9/54* (2006.01)
*G06F 9/451* (2018.01)
(Continued)

(52) U.S. Cl.
CPC ............ *G06F 9/548* (2013.01); *G06F 3/0482* (2013.01); *G06F 3/14* (2013.01); *G06F 9/451* (2018.02);
(Continued)

(58) Field of Classification Search
CPC .. G06F 9/548; G06F 16/9574; G06F 16/9577; G06F 9/543
See application file for complete search history.

(56) References Cited

U.S. PATENT DOCUMENTS

| 5,838,906 | A | * | 11/1998 | Doyle | ................... | G06F 16/957 |
| | | | | | | 715/205 |
| 2011/0126130 | A1 | * | 5/2011 | Lieb | ...................... | G06F 3/1454 |
| | | | | | | 715/753 |
| 2011/0231802 | A1 | * | 9/2011 | Lee | .......................... | G06F 8/38 |
| | | | | | | 715/848 |

FOREIGN PATENT DOCUMENTS

| JP | 2003-122771 A | 4/2003 |
| JP | 6452882 B1 | 1/2019 |
| JP | 2019-109852 A | 7/2019 |

OTHER PUBLICATIONS

English translation of International Search Report for PCT/JP2020/019430 dated Jun. 16, 2020, 4 pages.

* cited by examiner

*Primary Examiner* — Andrea C Leggett
(74) *Attorney, Agent, or Firm* — Rudy J. Ng; Bret E. Field; Bozicevic, Field & Francis LLP

(57) ABSTRACT

A recording program is used to record the procedure of an operation automatically performed on a browser screen, and causes a control unit to execute the following processing. The control unit executes processings of: displaying a browser image in which the browser screen is shown; and outputting a selection position selected on the browser image to an external device. Then, the control unit acquires, regarding an element located at the screen position of the browser screen corresponding to the output selection position, element information indicating the size of the element and the image position of the element on the browser image, from the external device. The control unit displays an object, (Continued)

which indicates that the element is selected, on the browser image based on the acquired element information.

17 Claims, 43 Drawing Sheets

(51) Int. Cl.
*G06F 16/957* (2019.01)
*G06F 3/0482* (2013.01)
*G06F 3/14* (2006.01)
*H04L 9/40* (2022.01)

(52) U.S. Cl.
CPC .......... *G06F 9/543* (2013.01); *G06F 16/9574* (2019.01); *G06F 16/9577* (2019.01); *H04L 63/08* (2013.01); *G06F 2203/04803* (2013.01)

F I G. 1
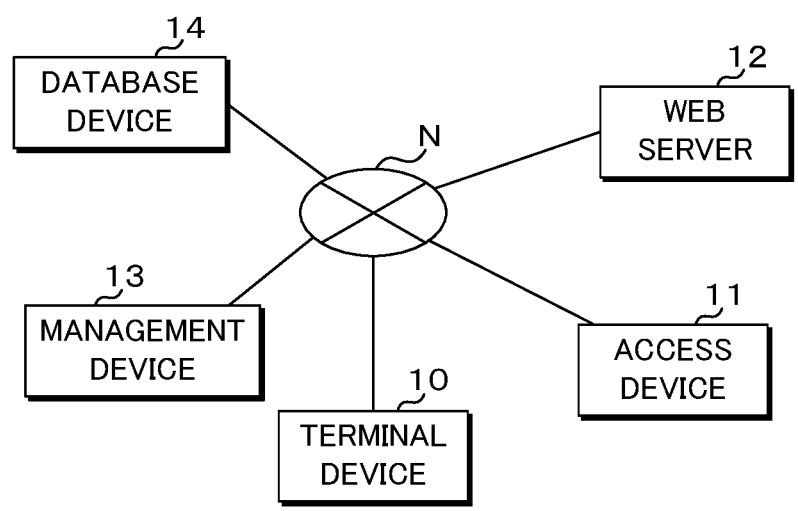

FIG. 2
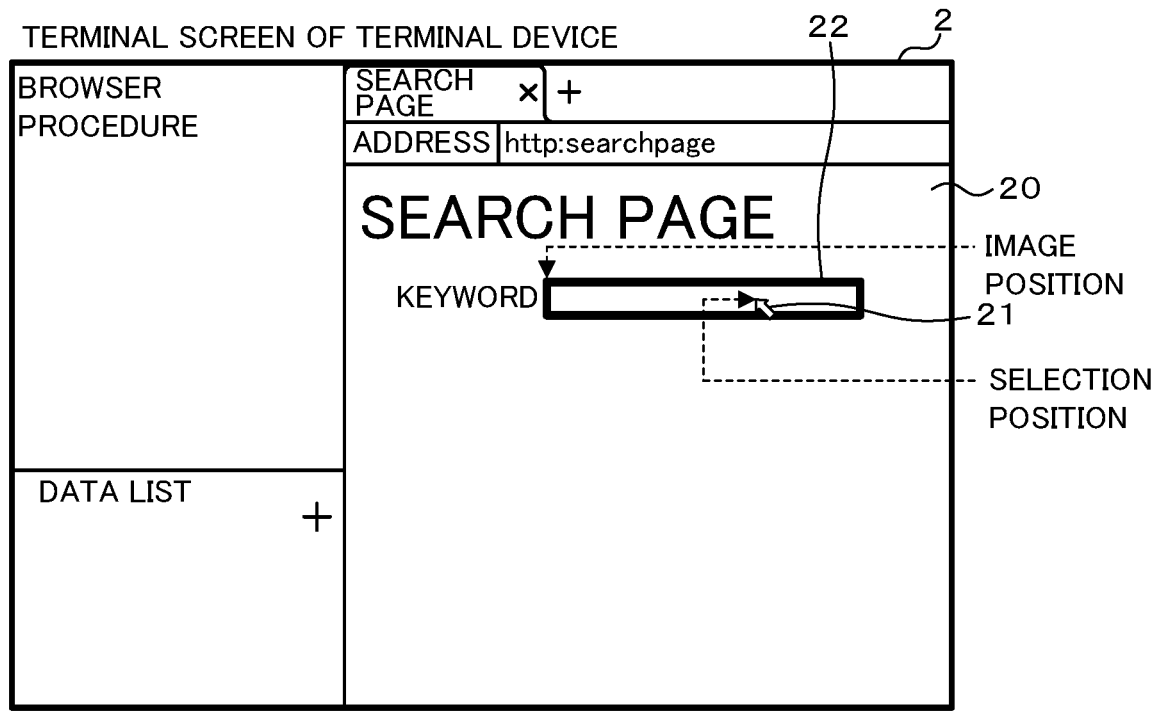
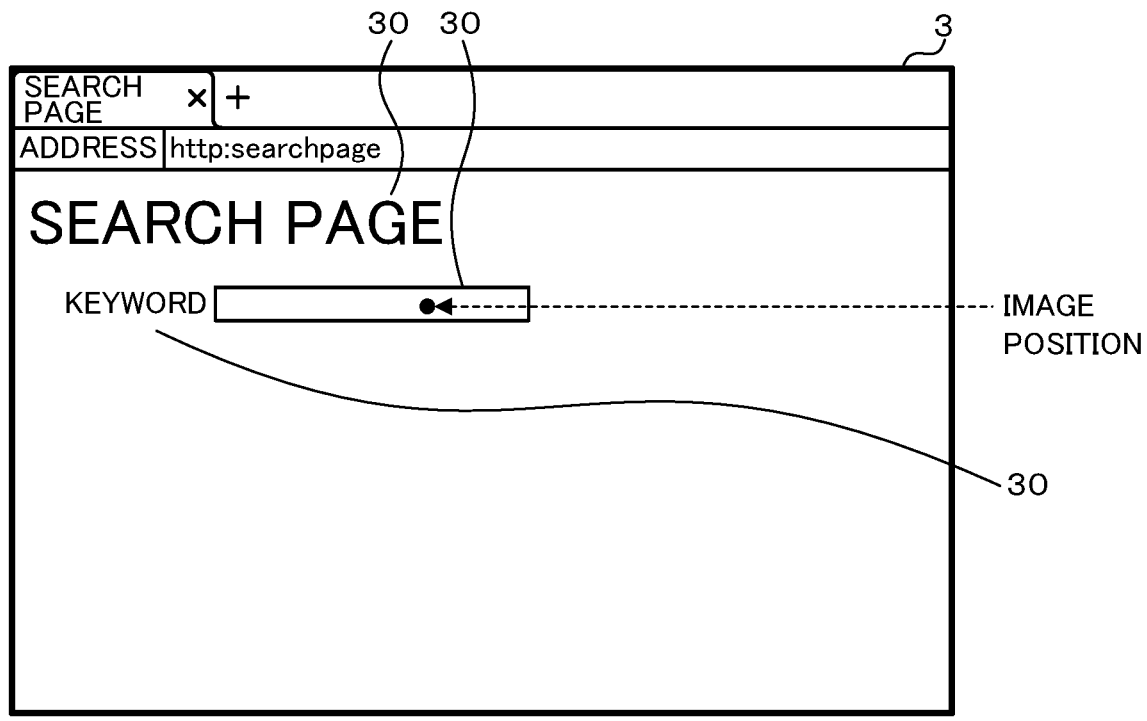

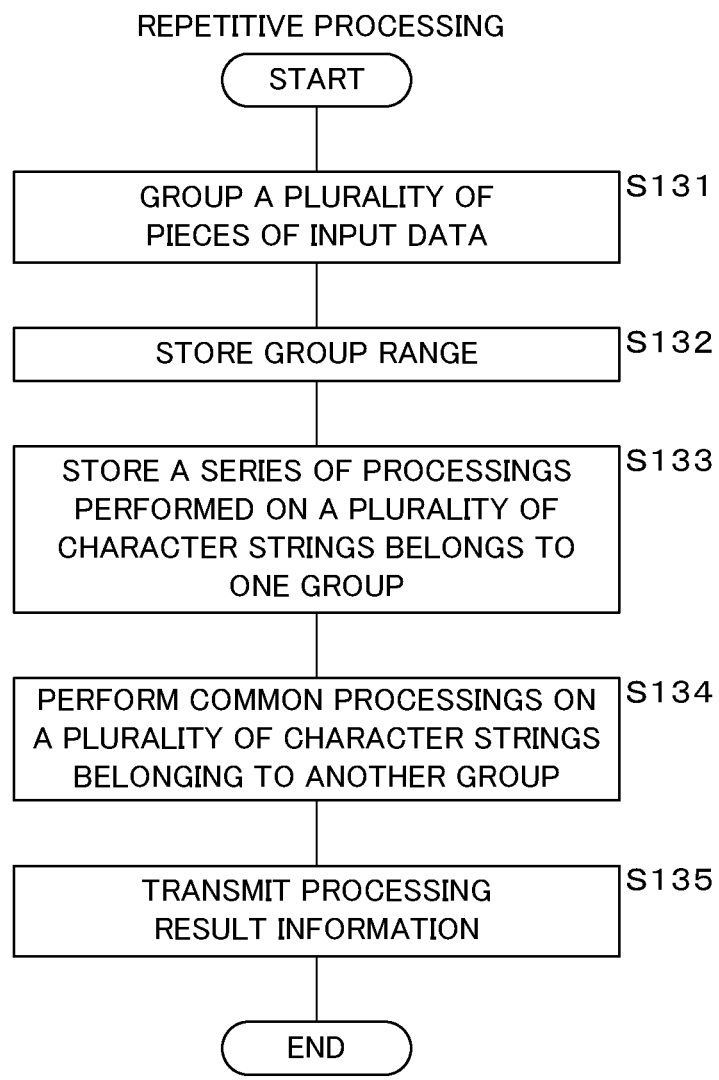
F I G . 43 ized.
RECORDING MEDIUM, RECORDING SYSTEM, RECORDING DEVICE, ANALYSIS DEVICE, AND RECORDING METHOD This application is the national phase under 35 U.S.C. § 371 of PCT International Application No. PCT/JP2020/019430 which has an International filing date of May 15, 2020 and designated the United States of America.

FIELD

The present disclosure relates to a recording medium, a recording system, a recording device, an analysis device, and a recording method.

BACKGROUND

Cloud services that provide various services through the Internet have become widespread. In the cloud service, a user displays a web page on a browser screen and performs various operations on the browser screen. When using the cloud service, the user may repeatedly perform a series of operations of the same content on the browser screen.

In order to eliminate such trouble, a robot that automatically performs a series of operations on the browser screen has been proposed. For the purpose of making a robot, Japanese Patent No. 6452882 discloses a configuration for recording the procedure of operations automatically performed on a browser screen.

SUMMARY

However, in the configuration of Japanese Patent No. 6452882, for the recording of the operation procedure, the amount of processing performed by the computer is large, and the number of operations performed by the user is large.

Therefore, the configuration of Japanese Patent No. 6452882 has a problem that the operations performed by the user cannot be efficiently recorded.

The present disclosure has been made in view of such circumstances, and it is an object thereof to provide a computer program, a recording device, a recording system, an analysis device, and a recording method that can realize efficient recording of an operation procedure.

A computer program according to an aspect of the present disclosure is a computer program for recording a procedure of operations automatically performed on a browser screen. The computer program causes a computer to execute processings of: displaying a browser image in which the browser screen is shown; outputting a selection position selected on the browser image to an external device; acquiring, regarding an element located at a screen position of the browser screen corresponding to the output selection position, element information indicating a size of the element and an image position of the element on the browser image from the external device; and displaying an object, which indicates that the element is selected, on the browser image based on the acquired element information.

A computer program according to an aspect of the present disclosure is a computer program for recording a procedure of operations automatically performed on a browser screen. The computer program causes a computer to execute processings of: displaying a browser image in which the browser screen is shown; storing a plurality of character strings included respectively in a plurality of objects on the browser image; and grouping the plurality of stored character strings.

A recording device according to an aspect of the present disclosure is a recording device that records a procedure of operations automatically performed on a browser screen. The recording device includes: a display unit that displays a browser image in which the browser screen is shown; an output unit that outputs, to an external device, a selection position selected on the browser image displayed by the display unit; and an element acquisition unit that acquires, regarding an element located at a screen position of the browser screen corresponding to the selection position output from the output unit, element information indicating a size of the element and an image position of the element on the browser image from the external device. The display unit displays an object, which indicates that the element is selected, based on the element information acquired by the element acquisition unit.

The recording system according to an aspect of the present disclosure includes: the recording device described above; and an analysis device that analyzes, regarding the element located at the screen position of the browser screen corresponding to the selection position output from the output unit, the size of the element and the image position of the element on the browser image. The element acquisition unit of the recording device acquires, from the analysis device, element information indicating the size and the image position analyzed by the analysis device.

An analysis device according to an aspect of the present disclosure includes: a position acquisition unit that acquires, from a recording device that records a procedure of operations automatically performed on a browser screen, a selection position selected on a browser image in which the browser screen is shown; an analysis unit that analyzes, regarding an element located at a screen position of the browser screen corresponding to the selection position acquired by the position acquisition unit, a size of the element and an image position of the element on the browser image; and a transmission unit that transmits element information indicating the size and the image position analyzed by the analysis unit to the recording device.

A recording method according to an aspect of the present disclosure is a recording method for recording a procedure of operations automatically performed on a browser screen. The recording method causes a computer to execute processings of: displaying a browser image in which the browser screen is shown; outputting position information, which indicates a selection position selected on the browser image, to an external device; acquiring, regarding an element located at a screen position of the browser screen corresponding to the selection position indicated by the position information, element information indicating a size of the element and an image position of the element on the browser image from the external device; and displaying an object, which indicates that the element is selected, on the browser image based on the acquired element information.

According to the above aspect, it is possible to realize efficient recording of the operation procedure.

The above and further objects and features will move fully be apparent from the following detailed description with accompanying drawings.

BRIEF DESCRIPTION OF THE DRAWINGS

FIG. 1 is a block diagram showing the main configuration of a recording system according to Embodiment 1.

FIG. 2 is a schematic diagram of a terminal screen and a browser screen.

FIG. 43 is a flowchart showing the procedure of repetitive processing according to Embodiment 2.

DETAILED DESCRIPTION OF NON-LIMITING EXAMPLE EMBODIMENTS

Figure 3:
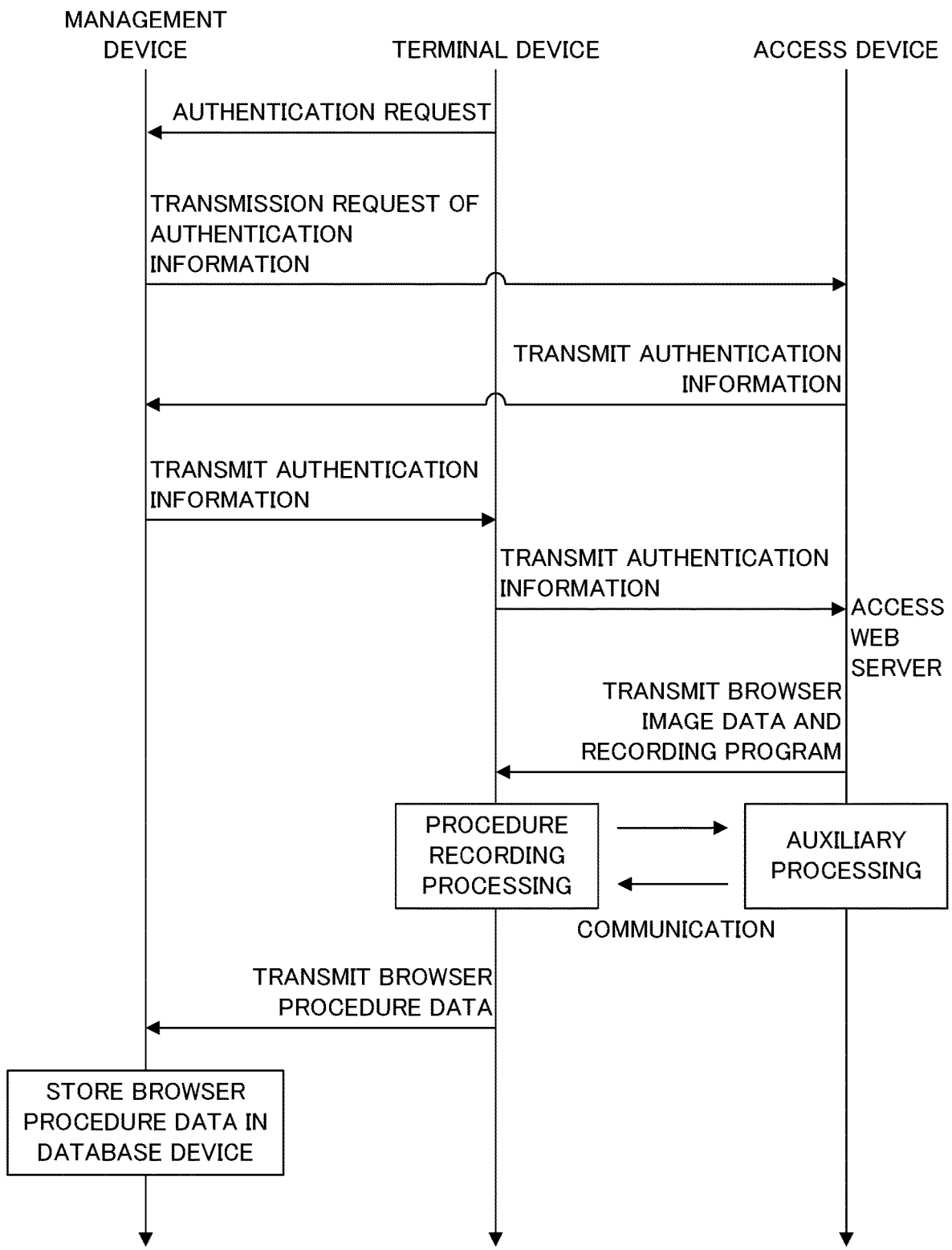
FIG. 3 is a sequence diagram showing the procedure of processing performed in the recording system.

Hereinafter, the present disclosure will be described in detail with reference to the diagrams showing embodiments thereof.

Embodiment 1

FIG. 1 is a block diagram showing the main configuration of a recording system 1 according to Embodiment 1. The recording system 1 includes a terminal device 10, an access device 11, a web server 12, a management device 13, and a database device 14. These are connected to a network N. The terminal device 10 is a personal computer, a tablet, a smartphone, or the like. Each of the access device 11, the management device 13, and the database device 14 is, for example, a server.

The terminal device 10 is a device that records the procedure of operations automatically performed on the browser screen, and functions as a recording device. The procedure of the operations automatically performed on the browser screen is described as a browser procedure below. The user operates the terminal device 10 to determine the browser procedure. The terminal device 10 transmits various kinds of information to the access device 11 to determine the browser procedure. The access device 11 accesses the web server 12 through the network N according to the information received from the terminal device 10. The web server 12 provides a web page according to the content of access, to the access device 11 through the network N. The access device 11 browses the web page. The web server 12 provides various services to devices connected to the network N. Hyper Text Markup Language (HTML) format data is transmitted from the web server 12 to the access device 11.

The terminal device 10 records the browser procedure on the browser screen of the terminal device 10. The access device 11 displays the web page provided from the web server 12 on the browser screen of the access device 11. Hereinafter, for easy understanding of Embodiment 1, the browser screen of the terminal device 10 is described as a terminal screen. When simply described as a browser screen, this means a browser screen of the access device 11 or a browser screen of a device different from the terminal device 10 and the access device 11.

The access device 11 transmits browser image data of a browser image shown on the browser screen, to the terminal device 10. The terminal device 10 displays the browser image of the browser image data received from the access device 11 on the terminal screen. The HTML format data is also transmitted from the access device 11 to the terminal device 10.

It is noted that the browser image may be configured by arranging a plurality of rectangular partial images in a grid pattern. In this case, the browser image data is configured by one or more partial image data corresponding to one or more partial images, display of which has been changed. When the display of one partial image is changed in the browser image, the access device 11 transmits the partial image data of the partial image to the terminal device 10 as browser image data. The terminal device updates the partial image corresponding to the received partial image data, to a new partial image in the browser image.

In addition, the browser image is not limited to a still image and may be a moving image. In this case, the access device 11 performs streaming distribution for the terminal device 10. The browser image displayed on the terminal screen is updated in real time.

After the browser image is displayed on the terminal screen, the user performs various operations on the terminal screen to determine the browser procedure. The terminal device 10 transmits browser procedure data indicating the browser procedure, to the management device 13.

The database device 14 is a device in which data is stored by the management device 13. When receiving the browser procedure data from the terminal device 10, the management device 13 stores the received browser procedure data in the database device 14. The browser procedure data stored in the database device 14 is read by a device (not shown) connected to the network N. This device automatically performs a series of operations on the browser screen according to the browser procedure indicated by the browser procedure data read from the database device 14.

FIG. 2 is a schematic diagram of a terminal screen 2 and a browser screen 3. On the terminal screen 2 of the terminal device shown in FIG. 2, a column showing the browser procedure is displayed in the upper left, and a data list column displaying the data stored in the terminal device 10 is displayed in the lower left. On the right side of the terminal screen 2, one or more tabs and an address bar for inputting or displaying an address of a web page are displayed in order from the top. One tab corresponds to one web page. On the right side of the terminal screen 2, a browser image is displayed below the address bar. Terminal screen data for displaying the terminal screen 2 is HTML format data.

On the browser screen 3 of the access device 11, one or more tabs, an address bar, and a web page are displayed in order from the top. On the browser screen 3, an image of a portion below the address bar, that is, a web page portion is the browser image 20.

Since the access device 11 is not operated by the user, it is not necessary to display the browser screen 3. Browser screen data for displaying the browser screen 3 is stored in the access device 11. The browser screen 3 shown in FIG. 2 is a screen indicated by the browser screen data. The browser screen data is also HTML format data.

As described above, the browser image 20 shown on the browser screen 3 is displayed on the terminal screen 2 of the terminal device 10. The web page displayed on the browser screen 3 is synchronized with the web page shown in the browser image 20.

In the web page portion of the browser screen 3, selectable elements 30 are displayed. In the example of FIG. 2, the number of elements 30 is three. Examples of the element 30 include a box, a link, and a character string. The character string is a sequence of characters. Examples of the characters include numbers and symbols in addition to those used for notation of words. Therefore, a sequence of numbers, a sequence of symbols, and a sequence in which numbers and symbols are mixed also correspond to the character string. In FIG. 2, the box is located on the right side of the word "KEYWORD". No link is placed. The character strings are the word "SEARCH PAGE" and the word "KEYWORD".

When the user selects the box, the user can input the input data into the box. The input data is a character string, an image, a file, or the like. When the user selects the update of the browser screen 3 in a state in which the input data is input in the box, the access device 11 accesses the web server 12 and the web page displayed on the browser screen 3 transitions to a web page provided from the web server 12, so that the browser screen 3 is updated. The link is displayed as a character string or an image. In addition, when the user selects the link, the access device 11 accesses the web server 12 and the web page displayed on the browser screen 3 transitions to a web page provided from the web server 12, so that the browser screen 3 is updated. When the user selects a link, the character string forming the link can be extracted. When the user selects a character string, the character string can be extracted.

When the user selects a tab on the terminal screen 2, a web page corresponding to the selected tab is displayed so that the browser screen 3 is updated. The user can select an add button to add a web page. The user can select a delete button to delete a web page. In the example of FIG. 2, the add button is provided on the right side of the tab and the delete button is provided within the tab. When the user selects the add button, the web page and the tab are added so that the browser screen 3 is updated. When the user selects the delete button, the web page and the tab are deleted so that the browser screen 3 is updated. When the user inputs an address on the terminal screen 2, a web page corresponding to the input address is displayed so that the browser screen 3 is updated.

A pointer 21 is displayed on the terminal screen 2 of the terminal device 10. The pointer 21 moves according to the operation of a pointer operation unit 61 (refer to FIG. 8) for operating the pointer 21. The pointer operation unit 61 is a mouse, for example. When the pointer operation unit 61 is clicked, the position pointed to by the pointer 21 is selected on the terminal screen 2. In addition, a rectangular frame-shaped object 22 is displayed on the browser image 20. The object 22 surrounds the element 30 shown in the browser image 20. In FIG. 2, one object 22 is displayed. This object 22 surrounds the element 30 arranged next to the keyword, that is, a box.

The position indicated by the pointer 21 at the time of selection (clicking) by the pointer 21 is a selection position that is selected on the terminal screen 2 or the browser image 20. The position on the browser screen 3 corresponding to the selection position on the terminal screen 2 is a screen position. The position of the upper left corner of the rectangular frame surrounding the element 30 shown in the browser image 20 is the image position of the element 30. The position of the object 22 is the position of the upper left corner. The object 22 is arranged so that the position of the object 22 matches the image position of the element 30. Each of the selection position, the image position, and the position of the object 22 is indicated by coordinates on the terminal screen 2, for example. The screen position is indicated by coordinates on the browser screen 3, for example.

It is noted that each of the image position of the element 30 and the position of the object 22 is not limited to the position of the upper left corner. Each of the image position of the element 30 and the position of the object 22 may be a lower left position, an upper right position, a lower right position, and the like. Hereinafter, an example will be described in which each of the image position of the element 30 and the position of the object 22 is the position of the upper left corner.

In addition, the selection on the terminal screen 2 is not limited to the selection by the pointer 21. When the terminal device 10 is a device such as a tablet or a smartphone having a touch panel, the selection on the terminal screen 2 may be realized by a tap on the touch panel. In this case, the tapped position is a selection position. An example in which selection is performed by the pointer 21 is shown below.

FIG. 3 is a sequence diagram showing the procedure of processing performed in the recording system 1. When the recording of the browser procedure is started, the terminal device transmits an authentication request to the management device 13 through the network N. The authentication request is for making a request for authentication of the terminal device 10. When the management device 13 receives the authentication request from the terminal device 10, the management device 13 transmits a transmission request to the access device 11 through the network N. The transmission request is for making a request for transmission of authentication information including authentication data necessary for the authentication. The authentication data is, for example, a character string.

When the access device 11 receives the transmission request of the authentication information from the management device 13, the access device 11 generates the authentication information and transmits the generated authentication information to the management device 13. The management device 13 transmits the authentication information received from the access device 11 to the terminal device 10. The management device 13 functions as a transmission device.

When the terminal device 10 receives the authentication information from the management device 13, the terminal device 10 transmits the received authentication information to the access device 11 through the network N. When the access device 11 receives the authentication information from the terminal device 10, the access device 11 determines whether or not the authentication data included in the received authentication information matches the authentication data included in the authentication information transmitted to the management device 13 by the access device 11. When the access device 11 determines that the two pieces of authentication data match each other, that is, when the access device 11 receives the authentication information transmitted to the terminal device 10 by the management device 13, the access device 11 regards the terminal device 10 as a device permitted to transmit information to the access device 11. Then, the access device 11 performs processing relevant to the browser screen 3. As one of the processings relevant to the browser screen 3, there is processing of accessing the web server 12 according to the information received from the terminal device 10. Thereafter, when an unauthorized device different from the terminal device 10 transmits information to the access device 11, the access device 11 does not access the web server 12.

When the access device 11 determines that the two pieces of authentication data match each other, the access device 11 accesses the web server 12 to display a predetermined web page on the browser screen 3. The access device 11 generates browser image data of the browser image 20 shown on the browser screen 3. Then, the access device 11 transmits the generated browser image data and a recording program 52 (refer to FIG. 4) to the terminal device 10. The recording program 52 is a computer program for recording the browser procedure.

As described above, when the browser image 20 is configured by arranging a plurality of rectangular partial images in a grid pattern, the browser image data is configured by one or more partial image data, display of which has been changed.

The terminal device 10 executes the recording program 52 to perform a procedure recording processing for recording the browser procedure. In the procedure recording processing, the user performs, on the terminal screen 2, a work similar to that performed in a case of use. The browser procedure obtained by the work is recorded. During the procedure recording processing, the terminal device 10 communicates with the access device 11 through the network N to receive assistance from the access device 11. The access device 11 performs an auxiliary processing for assisting the recording of the browser procedure.

In the procedure recording processing, the terminal device 10 transmits position information to the access device 11. The position information indicates the selection position that is selected by the pointer 21 on the browser image 20. In the auxiliary processing, when the access device 11 receives the position information, the access device 11 analyzes: the size of the element located at the screen position on the browser screen 3 corresponding to the selection position indicated by the position information; the image position of the element 30 shown in the browser image 20; and the data position of the element 30 in the browser screen data.

Here, the size of the element 30 is the horizontal and vertical lengths of a rectangular frame surrounding the element 30 shown in the browser image 20 of the terminal screen 2. The browser screen data of the browser screen 3 is configured by a plurality of syntaxes. The data position of the element 30 is the position of the syntax corresponding to the element 30 in the browser screen data. The information indicating the data position is so-called selector information.

In the auxiliary processing, the access device 11 transmits element information to the terminal device 10. The element information indicates the analyzed size, image position, and data position of the element 30. In the procedure recording processing, when the terminal device 10 receives the element information, the terminal device 10 displays the rectangular frame-shaped object 22 at the image position of the element 30 analyzed by the access device 11 on the browser image 20 based on the size and the image position indicated by the received element information. The position of the object matches the image position of the element 30. The size of the object 22 matches the size analyzed by the access device 11. The terminal device 10 stores the data position indicated by the received element information, that is, the selector information so as to be associated with the displayed object 22.

In the procedure recording processing, when the object 22 corresponds to a box, the terminal device 10 accepts input of input data into the object 22. When the update of the browser screen 3 is selected in a state in which the input data is input in the object 22, the terminal device 10 transmits, to the access device 11, update information which indicates the data position of the element 30 corresponding to the selected object 22 and the input data in the object 22. In a case where the object 22 corresponds to a link, when the update of the browser screen 3 is selected, the terminal device 10 transmits, to the access device 11, update information indicating the data position of the element 30 corresponding to the selected object 22.

When the terminal device 10 receives the input of the address on the terminal screen 2, the terminal device 10 transmits, to the access device 11, update information indicating the input address. When the terminal device 10 receives the selection of the tab on the terminal screen 2, the terminal device 10 transmits, to the access device 11, update information indicating the selected tab. When the terminal device 10 receives the selection of a button on the terminal screen 2, the terminal device 10 transmits, to the access device 11, update information indicating the selected button.

In the auxiliary processing, when the access device 11 receives the update information, the access device 11 updates the browser screen 3 according to the received update information. The access device 11 transmits, to the terminal device 10, the browser image data of the browser image 20, in which the web page portion of the updated browser screen 3 is shown. In the procedure recording processing, when the terminal device 10 receives the browser image data, the terminal device 10 displays the browser image 20 of the received browser image data on the terminal screen 2.

In the procedure recording processing, the terminal device 10 transmits, to the access device 11, extraction information for making an instruction to extract a character string (content) in the rectangular frame-shaped object 22. The extraction information indicates the data position of the element 30 corresponding to the object 22. When the access device 11 receives the extraction information, the access device 11 extracts a character string which is included in the element 30 located at the data position indicated by the received extraction information in the browser screen data. The extraction information corresponds to an extraction request. The access device 11 transmits, to the terminal device 10, character string information indicating the extracted character string. When the terminal device 10 receives the character string information, the terminal device 10 adds the character string indicated by the received character string information to the data list column of the terminal screen 2.

The content included in the object 22 is not limited to the character string, and may be an image, a file, or the like. In this case, the extraction information makes an instruction for extraction of an image, a file, or the like. The access device 11 extracts the image, the file, or the like. In the configuration of extracting an image, a file, or the like, the access device 11 transmits data, such as the extracted image or file, to the terminal device 10 instead of the character string information.

Hereinafter, the configuration will be described on the assumption that the content included in the object 22 is a character string.

In the procedure recording processing, the terminal device 10 generates browser procedure data indicating the browser procedure. After ending the procedure recording processing, the terminal device 10 transmits the browser procedure data to the management device 13 through the network N. When the management device 13 receives the browser procedure data, the management device 13 stores the received browser procedure data in the database device 14.

Hereinafter, the access device 11 and the terminal device 10 will be described in detail.

Figure 4:
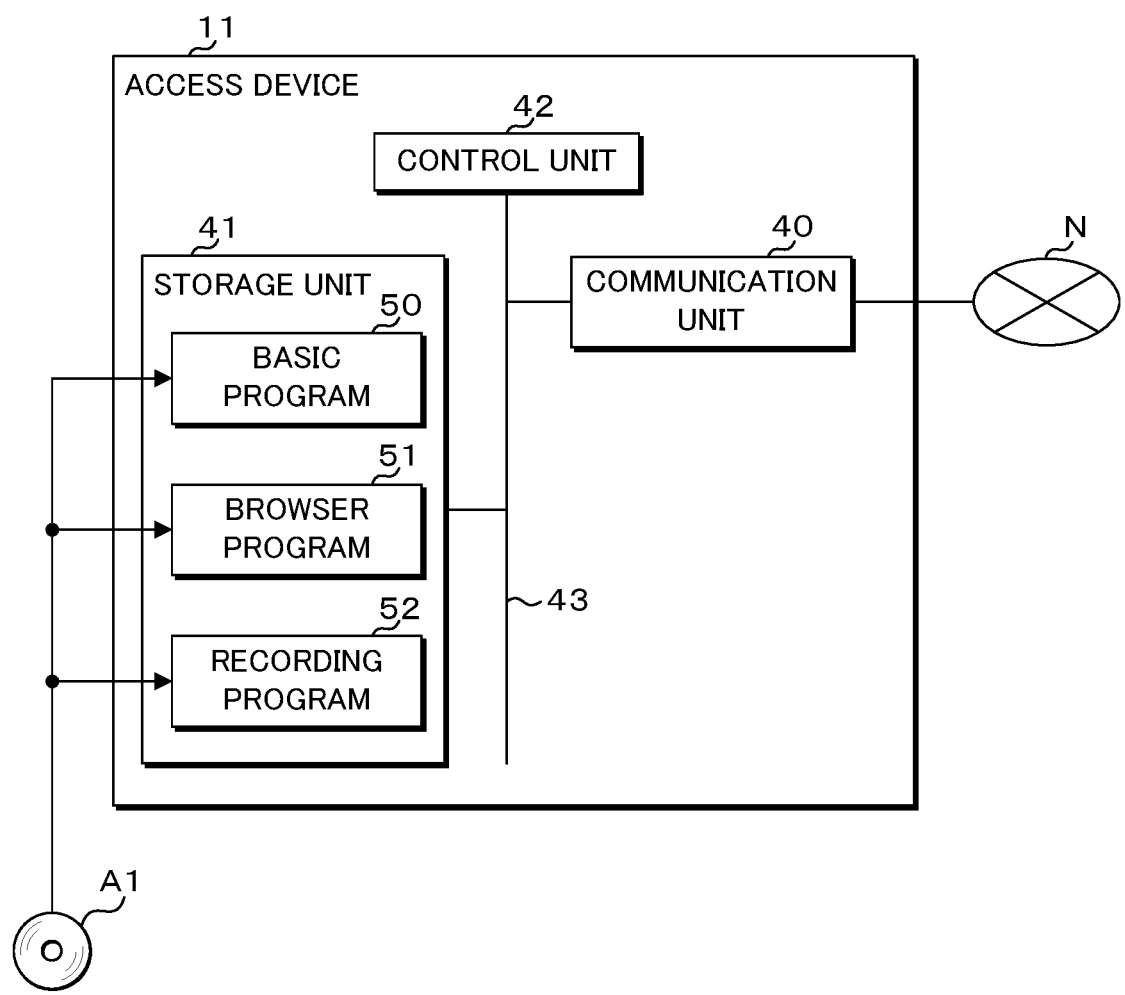
FIG. 4 is a block diagram showing the main configuration of an access device.

FIG. 4 is a block diagram showing the main configuration of the access device 11. The access device 11 includes a communication unit 40, a storage unit 41, and a control unit 42. These are connected to an internal bus 43. The communication unit 40 is also connected to the network N.

At the stage of authenticating the terminal device 10, the communication unit 40 receives a request for transmission of authentication information from the management device 13. The communication unit 40 transmits the authentication information to the management device 13 according to an instruction from the control unit 42.

In addition, the communication unit 40 receives position information, update information, and extraction information from the terminal device 10 through the network N. The communication unit 40 functions as a request receiving unit. The communication unit 40 accesses the web server 12 according to an instruction from the control unit 42. The communication unit 40 transmits element information, browser image data, and character string information to the terminal device 10 according to an instruction from the control unit 42.

The storage unit 41 is a non-volatile memory. A basic program 50, a browser program 51, and the recording program 52 are stored in the storage unit 41. The basic program 50 is a computer program relevant to the operating system. The browser program 51 is an application program for browsing a web page. The browser program 51 is executed using the basic program 50 as a platform. The recording program 52 is a computer program for recording the browser procedure as described above. The recording program 52 is executed by the terminal device 10.

The control unit 42 has a processing element (computer), such as a Central Processing Unit (CPU), a Micro-Processing Unit (MPU) or a Graphics Processing Unit (GPU). The processing element of the control unit 42 executes the basic program 50. The processing element of the control unit 42 executes the browser program 51 using the basic program 50 as a platform. The processing element of the control unit 42 executes the basic program 50 or both the basic program 50 and the browser program 51 to perform: processing for transmitting the authentication information, the browser image data, and the recording program 52; processing for accessing the web page; auxiliary processing; and the like. The control unit 42 performs a plurality of processings in parallel in a time division manner, for example.

The processing element of the control unit 42 performs processing relevant to the web page by executing the browser program 51. The processing relevant to the web page includes accessing the web server 12, displaying the web page on the browser screen 3, receiving the input of input data, selecting a link, selecting a button, extracting a character string, or the like.

The auxiliary processing includes: analysis processing for analyzing the size, image position, and data position of the element 30; screen update processing for updating the browser screen 3; and extraction processing for extracting a character string from the browser screen 3.

It is noted that the number of processing elements included in the control unit 42 may be two or more. In this case, a plurality of processing elements may cooperatively perform the above-described various processings according to the basic program 50 or both the basic program 50 and the browser program 51.

In addition, the basic program 50, the browser program 51, and the recording program 52 may be provided to the access device 11 by using a non-transitory recording medium A1 that records these in a readable manner. The recording medium A1 is, for example, a portable memory. Examples of the portable memory include a CD-ROM, a Universal Serial Bus (USB) memory, an SD card, a micro SD card, and a compact flash (registered trademark). When the recording medium A1 is a portable memory, the processing element of the control unit 42 may read the basic program 50, the browser program 51, and the recording program 52 from the recording medium A1 using a reader (not shown) and store the read basic program 50, browser program 51, and recording program 52 in the storage unit 41.

In addition, each of the basic program 50, the browser program 51, and the recording program 52 may be provided to the access device 11 by communication through the communication unit 40. In this case, the processing element of the control unit 42 may acquire the basic program 50, the browser program 51, or the recording program 52 through the communication unit 40 and store the acquired computer program in the storage unit 41.

The basic program 50, the browser program 51, and the recording program 52 may not be stored in the common recording medium A1. For example, the basic program 50, the browser program 51, and the recording program 52 may be stored in three non-transitory storage media, respectively. In this case, the processing element of the control unit 42 reads the basic program 50, the browser program 51, and the recording program 52 from the three storage media using a reader. The processing element of the control unit 42 stores the read basic program 50, browser program 51, and recording program 52 in the storage unit 41.

Figure 5:
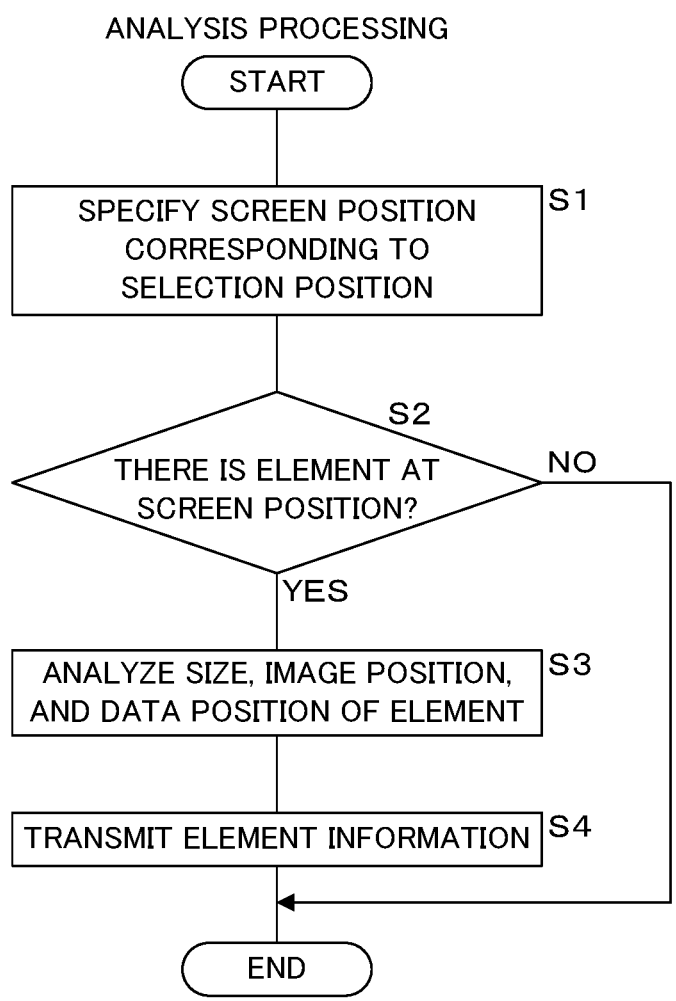
FIG. 5 is a flowchart showing the procedure of analysis processing.

FIG. 5 is a flowchart showing the procedure of the analysis processing. As described above, the communication unit 40 receives, from the terminal device 10, position information which indicates a selection position that is selected by the pointer 21 on the browser image 20. When the communication unit 40 receives the position information, the control unit 42 acquires the position information received by the communication unit 40. The control unit 42 functions as a position acquisition unit. The control unit 42 performs the analysis processing when the position information is acquired.

In the analysis processing, first, the control unit 42 specifies the screen position of the browser screen 3 corresponding to the selection position indicated by the acquired position information (step S1). As described above, the web page displayed on the browser screen 3 by the access device 11 is synchronized with a web page shown in the browser image 20 displayed on the terminal screen 2 by the terminal device 10. In addition, data indicating the position where the browser image 20 is displayed on the terminal screen 2 is stored in the access device 11. Therefore, the control unit 42 can specify the screen position corresponding to the selection position.

Then, the control unit 42 determines whether or not there is the element 30 at the screen position specified in step S1 on the browser screen 3 (step S2). When it is determined that there is the element 30 at the screen position (S2: YES), the control unit 42 analyzes the size of the element 30, the image position corresponding to the element 30 in the browser image 20, and the data position of the element 30, the element 30 being located at the screen position specified in step S1 (step S3). As described above, the size of the element 30 is the horizontal and vertical lengths of a rectangular frame surrounding the element 30 shown in the browser image 20 of the terminal screen 2. The control unit 42 also functions as an analysis unit.

Then, the control unit 42 instructs the communication unit to transmit, to the terminal device 10, the element information, which indicates the size, the image position, and the data position analyzed in step S3 (step S4). The communication unit 40 also functions as a transmission unit.

When the control unit 42 determines that there is no element at the screen position (S2: NO) or after executing step S4, the analysis processing ends.

As described above, in the analysis processing, the control unit 42 of the access device 11 analyzes, regarding the element 30 located at the screen position of the browser screen 3 corresponding to the selection position indicated by the position information, the size of the element 30, the image position of the element 30 on the browser image 20, and the data position of the element 30. The communication unit 40 transmits, to the terminal device 10, the element information which indicates the size, the image position, and the data position analyzed by the control unit 42. The access device 11 functions as an analysis device.

Figure 6:
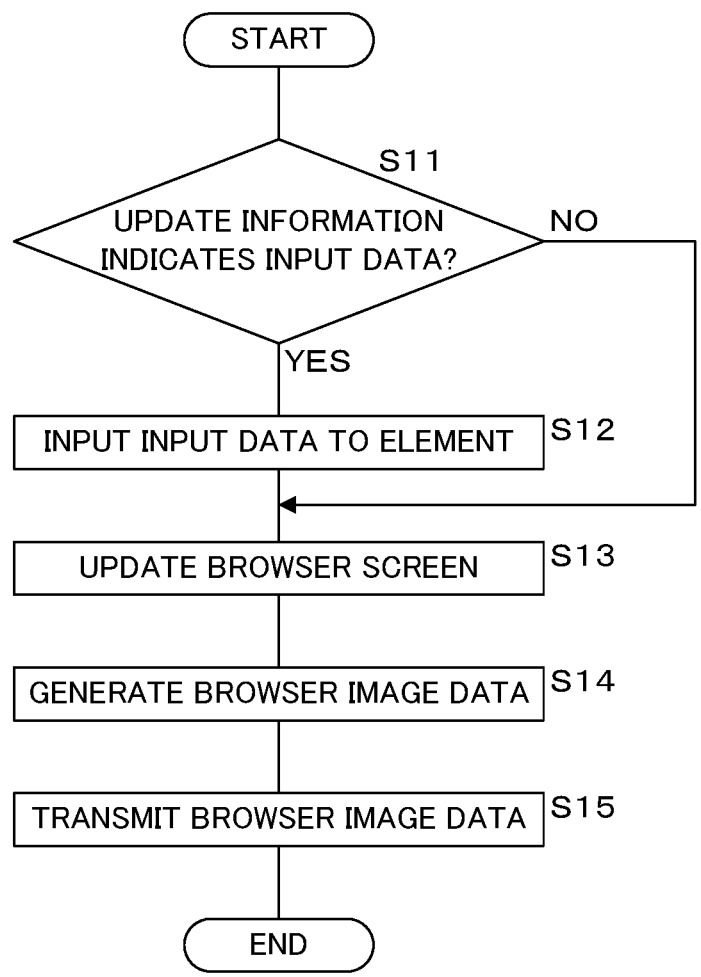
FIG. 6 is a flowchart showing the procedure of screen update processing.

FIG. 6 is a flowchart showing the procedure of the screen update processing. As described above, the communication unit 40 receives the update information from the terminal device 10. When the communication unit 40 receives the update information, the control unit 42 acquires the update information received by the communication unit 40. When the update information is acquired, the control unit 42 performs screen update processing for updating the browser screen.

In the screen update processing, first, the control unit 42 determines whether or not the acquired update information indicates input data (step S11). As described above, when the element 30 corresponding to the object 22 is a box, the update information indicates the data position of the element 30 corresponding to the object 22 and the input data in the object 22. As described above, the input data is a character string, an image, a file, or the like. When the element 30 corresponding to the object 22 is a link, the update information indicates the data position of the element 30 corresponding to the selected object 22. When the element 30 corresponding to the object 22 is a character string, update information is not transmitted.

When the input of an address is received on the terminal screen 2, the update information indicates the input address. When the selection of a tab is received on the terminal screen 2, the update information indicates the selected tab. When the selection of a button is received on the terminal screen 2, the update information indicates the selected button.

When it is determined that the update information indicates the input data (S11: YES), the control unit 42 inputs the input data indicated by the acquired update information to the element 30, which is located at the data position indicated by the acquired update information, in the browser screen data of the browser screen 3 (step S12). When it is determined that the update information does not indicate the input data (S11: NO) or after executing step S12, the control unit 42 updates the browser screen 3 (step S13).

When the element 30 corresponding to the object 22 is a box or a link, the control unit 42 causes the communication unit 40 to access the web server 12 in step S13. Therefore, the web page displayed on the browser screen 3 transitions to a web page provided from the web server 12 to the communication unit 40, so that the browser screen 3 is updated. When the add button or the delete button is selected on the terminal screen 2, a web page is added or deleted, so that the browser screen 3 is updated.

When a web page is added or deleted, a tab is also added or deleted. When a tab is selected on the terminal screen 2, a web page corresponding to the selected tab is displayed on the browser screen 3, so that the browser screen 3 is updated. When the input of the address is received on the terminal screen 2, the control unit 42 causes the communication unit 40 to access the web server 12 in step S13. Therefore, the web page displayed on the browser screen 3 transitions to a web page provided from the web server 12 to the communication unit 40, so that the browser screen 3 is updated. This web page corresponds to the input address. The addition of the web page is also realized by the control unit 42 instructing the communication unit 40 to access the web server 12.

Then, the control unit 42 generates browser image data of the browser image 20 in which the web page portion of the browser screen 3 after the transition of the web page is shown (step S14). Then, the control unit 42 instructs the communication unit 40 to transmit the browser image data generated in step S14 to the terminal device 10 through the network N (step S15), and ends the screen update processing. When the browser image data is received, the terminal device 10 displays the browser image 20 of the received browser image data, that is, the image of the web page portion of the browser screen 3 on the terminal screen 2.

As described above, in the screen update processing, when the communication unit 40 receives the update information from the terminal device 10, the browser screen 3 is updated, and the browser image data of the browser image 20 in which the web page portion of the updated browser screen 3 is shown is transmitted to the terminal device 10.

Figure 7:
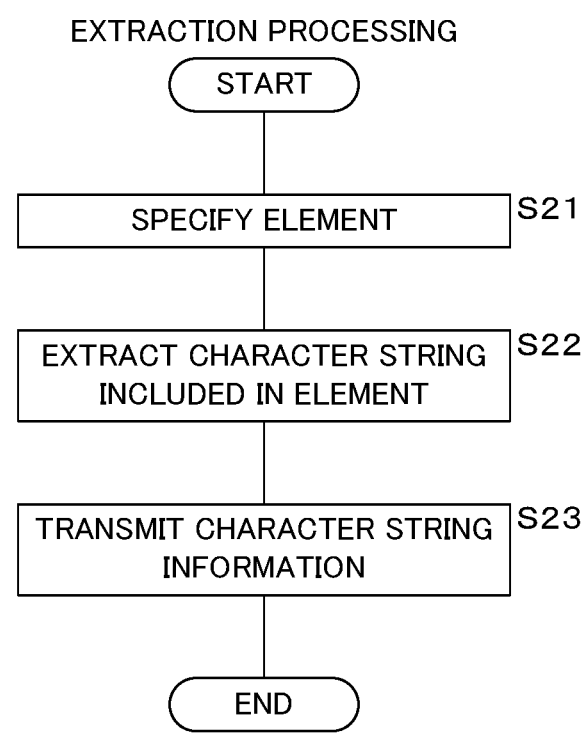
FIG. 7 is a flowchart showing the procedure of extraction processing.

FIG. 7 is a flowchart showing the procedure of the extraction processing. As described above, the communication unit 40 receives the extraction information from the terminal device 10. When the communication unit 40 receives the extraction information, the control unit 42 acquires the extraction information received by the communication unit 40. When the extraction information is acquired, the control unit 42 performs extraction processing for extraction from the browser screen 3.

In the extraction processing, first, the control unit 42 specifies the element 30 in the browser screen data of the browser screen 3 based on the data position indicated by the acquired extraction information (step S21). Then, the control unit 42 extracts a character string included in the element 30 specified in step S21 on the browser screen 3 (step S22). The control unit 42 also functions as an extraction unit. Then, the control unit 42 instructs the communication unit 40 to transmit character string information indicating the character string extracted in step S22 to the terminal device 10 (step S23). After executing step S23, the control unit 42 ends the extraction processing.

As described above, in the extraction processing, the control unit 42 extracts a character string (content) in the object 22 displayed on the browser image 20. The communication unit 40 transmits, to the terminal device 10, the character string information indicating the character string extracted by the control unit 42.

When the extraction information indicates the extraction of an image, a file, or the like, in the extraction processing, the control unit 42 extracts the image, the file, or the like. The control unit 42 instructs the communication unit 40 to transmit the data of the extracted image, file, or the like to the terminal device 10.

Figure 8:
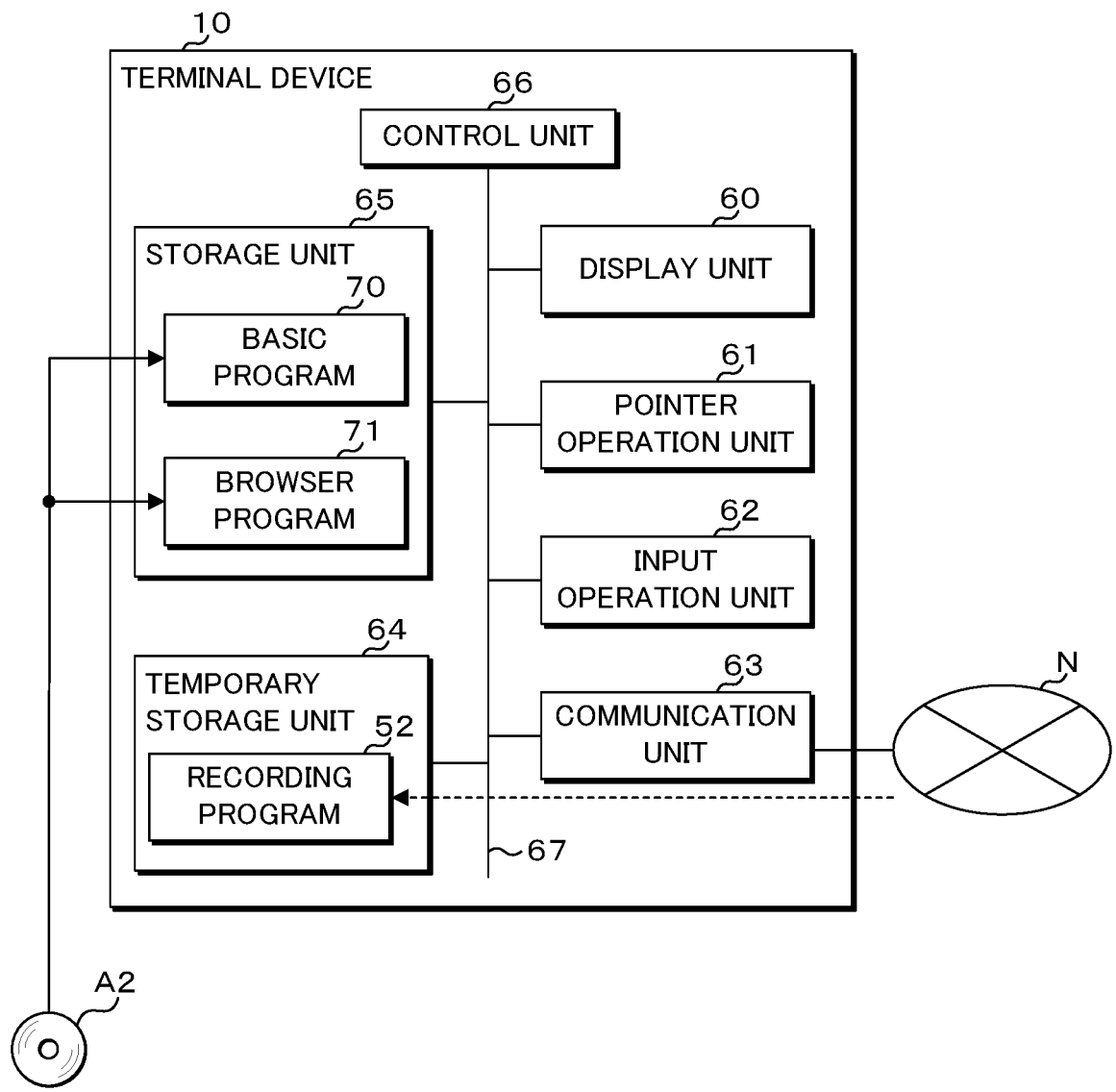
FIG. 8 is a block diagram showing the main configuration of a terminal device.

FIG. 8 is a block diagram showing the main configuration of the terminal device 10. The terminal device 10 includes a display unit 60, the pointer operation unit 61, an input operation unit 62, a communication unit 63, a temporary storage unit 64, a storage unit 65, and a control unit 66. These are connected to an internal bus 67. The communication unit 63 is also connected to the network N.

The display unit 60 displays the terminal screen 2. As described above, the browser image 20, a browser procedure column, and a data list column are displayed on the terminal screen 2. The display unit 60 changes the content displayed on the terminal screen 2, according to an instruction from the control unit 66.

The pointer operation unit 61 is, for example, a mouse. When the user moves the pointer operation unit 61, the control unit 66 instructs the display unit 60 to move the pointer 21 displayed on the terminal screen 2. The pointer 21 moves in conjunction with the movement of the pointer operation unit 61. When the user clicks on the pointer operation unit 61, the position indicated by the pointer 21 is selected as a selection position. The control unit 66 receives the selection position.

The input operation unit 62 is, for example, a keyboard. The user inputs data by operating the input operation unit 62. The control unit 66 acquires the input data input through the input operation unit 62, and instructs the display unit 60 to display the input data on the terminal screen 2.

When the terminal device 10 is a device having a touch panel, the terminal device 10 selects a selection position and inputs data by using a tap on the touch panel instead of the pointer operation unit 61 and the input operation unit 62. The user inputs data by individually tapping a plurality of characters displayed on the touch panel, for example.

At the stage of authenticating the terminal device 10, the communication unit 63 transmits an authentication request to the management device 13 through the network N according to an instruction from the control unit 66. The communication unit 63 receives the authentication information from the management device 13. In addition, the communication unit 63 transmits the authentication information received from the management device 13 to the communication unit 40 of the access device 11. The communication unit 63 functions as a first transmission unit, a second transmission unit, and an information receiving unit.

In addition, the communication unit 63 transmits the position information, the update information, and the extraction information to the access device 11 through the network N according to an instruction from the control unit 66. The communication unit 63 receives the recording program 52, the element information, the browser image data, the character string information, and the like from the access device 11.

The temporary storage unit 64 is, for example, a Random Access Memory (RAM). Data is temporarily stored in the temporary storage unit 64. When the supply of electric power to the temporary storage unit 64 is stopped, the data stored in the temporary storage unit 64 is deleted. The recording program 52 received by the communication unit 63 and the data position (selector information) indicated by the element information received by the communication unit 63 are stored in the temporary storage unit 64. The data stored in the temporary storage unit 64 is read by the control unit 66.

The storage unit 65 is a non-volatile memory. A basic program 70 and a browser program 71 are stored in the storage unit 65. The basic program 70 is a computer program relevant to the operating system. The browser program 71 is an application program for browsing a web page. The browser program 71 is executed using the basic program 70 as a platform. The recording program 52 is a computer program for recording the browser procedure as described above. The recording program 52 is executed using the browser program 71 as a platform. The recording program 52 is, for example, a script program such as JavaScript (registered trademark) or VBScript (registered trademark) that the communication unit 63 acquires from the communication unit 40 of the access device 11. It is not necessary to install the recording program 52 in the terminal device 10.

The control unit 66 has a processing element (computer) such as a CPU, an MPU, or a GPU, and executes the basic program 70, the browser program 71, and the recording program 52. The processing performed in the recording system 1 has been described with reference to FIG. 3. By executing the basic program 70 and the browser program 71, the control unit 66 performs: processing before the communication unit 63 receives the recording program 52; processing for moving the pointer 21 displayed on the terminal screen 2 according to the movement of the pointer operation unit 61; and the like.

Specifically, the control unit 66 instructs the communication unit 63 to perform processing for transmitting the authentication request and the authentication information to the management device 13 and the access device 11, respectively. In addition, when the communication unit 63 receives the recording program 52 from the access device 11, the control unit 66 stores the recording program 52 received by the communication unit 63 in the temporary storage unit 64. Then, the control unit 66 executes the recording program 52 using the browser program 71 as a platform.

In addition, the control unit 66 performs the procedure recording processing by executing the recording program 52 using the basic program 70 and the browser program 71 as platforms. The procedure recording processing includes: processing for selecting a selection position by clicking the pointer operation unit 61; processing for receiving the input of data by operating the input operation unit 62; and processing for instructing the communication unit 63 to transmit browser procedure data to the management device 13.

In addition, the control unit 66 also performs processing different from the procedure recording processing by executing the basic program 70, the browser program 71, and the recording program 52. The control unit 66 performs a plurality of processings in parallel in a time division manner, for example.

It is noted that the number of processing elements included in the control unit 66 may be two or more. In this case, a plurality of processing elements may cooperatively perform the above-described various processings according to at least one of the basic program 70, the browser program 71, and the recording program 52.

In addition, the basic program 70 and the browser program 71 may be provided to the terminal device 10 by using a non-transitory recording medium A2 that records these in a readable manner. The recording medium A2 is, for example, a portable memory. When the recording medium A2 is a portable memory, the processing element of the control unit 66 may read the basic program 70 and the browser program 71 from the recording medium A2 using a reader (not shown) and store the read basic program 70 and browser program 71 in the storage unit 65.

In addition, each of the basic program 70 and the browser program 71 may be provided to the terminal device 10 by communication through the communication unit 63. In this case, the processing element of the control unit 66 may acquire the basic program 70 and the browser program 71 through the communication unit 63 and store the acquired computer program in the storage unit 65.

The basic program 70 and the browser program 71 may not be stored in the common recording medium A2. For example, the basic program 70 and the browser program 71 may be stored in two non-transitory storage media, respectively. In this case, the processing element of the control unit 66 reads the basic program 70 and the browser program 71 from the two storage media using a reader. The processing element of the control unit 66 stores the read basic program 70 and browser program 71 in the storage unit 41.

Hereinafter, the procedure recording processing that is performed by executing the recording program 52 by the control unit 66 in the terminal device 10 will be described in detail.

Figure 9:
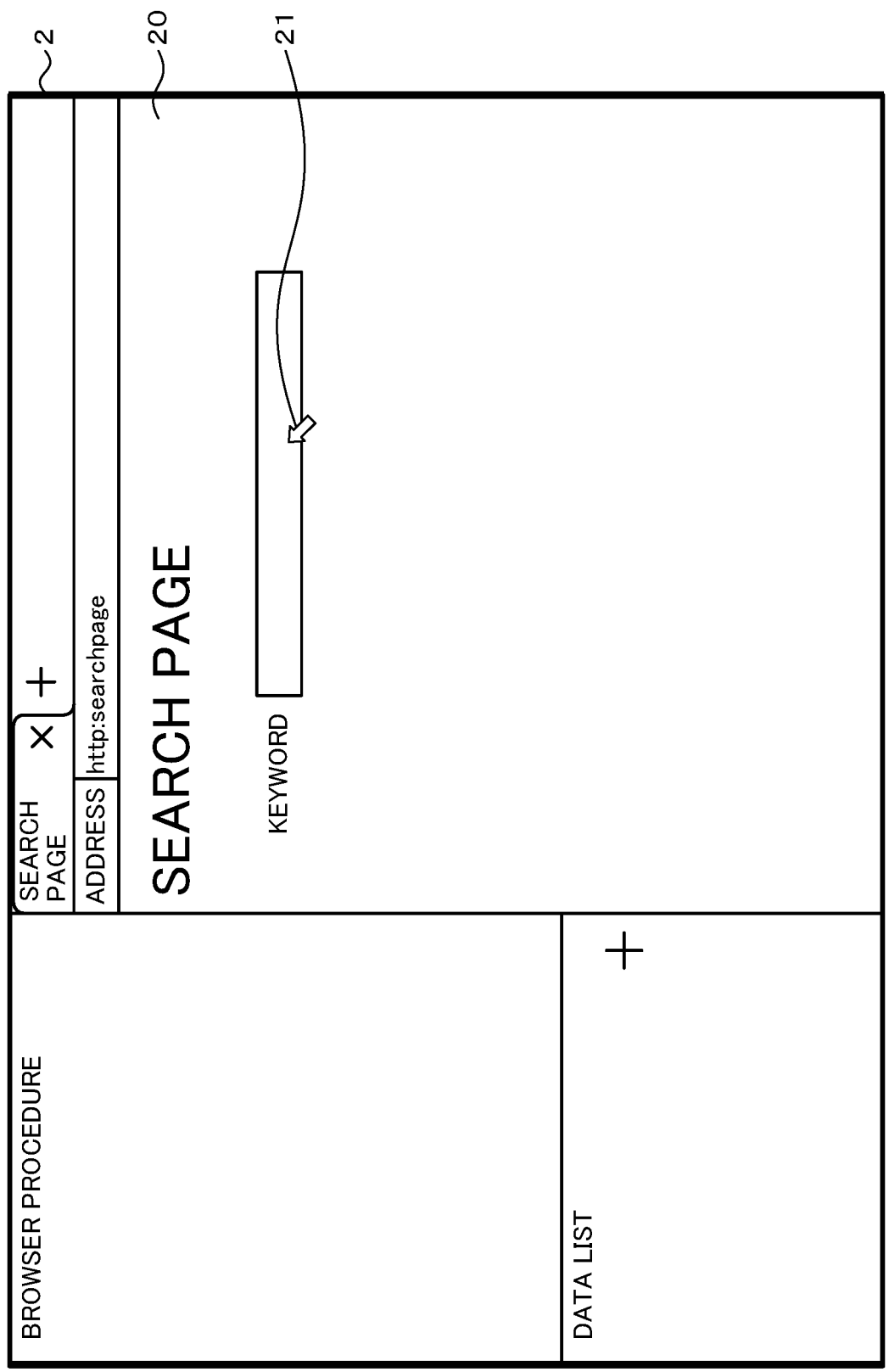
FIG. 9 is an explanatory diagram of an initial state of a terminal screen.

FIG. 9 is an explanatory diagram of the initial state of the terminal screen 2. When the control unit 66 starts executing the recording program 52, the control unit 66 instructs the display unit 60 to display the browser procedure column and the data list column on the left side of the terminal screen 2. In addition, the control unit 66 instructs the display unit 60 to display the browser image 20, in which the browser screen 3 of the access device 11 is shown, at the lower right of the terminal screen 2. A search page for performing a search by inputting a keyword is shown in the browser image 20. The address is displayed on the terminal screen 2.

The user moves the pointer 21 by moving the pointer operation unit 61. The user selects the element 30 shown in the browser image 20 with the pointer 21. In the example of FIG. 9, the user moves the pointer 21 into the box shown on the right side of the word "KEYWORD" and clicks on the pointer operation unit 61. Thereby, the control unit 66 of the terminal device 10 acquires position information indicating the selection position selected by the pointer 21 on the browser image 20. The control unit 66 instructs the communication unit 63 to transmit (output) the acquired position information to the communication unit 40 of the access device 11. The access device 11 functions as an external device. The communication unit 63 also functions as an output unit.

In the access device 11, when the communication unit 40 receives the position information, the control unit 42 performs analysis processing. Thereby, the communication unit 40 transmits, to the communication unit 63 of the terminal device 10, the element information of the element 30, which is located at the screen position of the browser screen 3 corresponding to the selection position indicated by the position information transmitted by the communication unit 63 of the terminal device 10. As described above, the element information indicates the size, the image position on the browser image 20, and the data position for the element 30 located at the screen position. When the communication unit 63 receives the element information, the control unit 66 of the terminal device 10 acquires the element information received by the communication unit 63 from the access device 11. The control unit 66 instructs the display unit 60 to display the object 22, which indicates that the element 30 is selected, on the browser image 20 based on the size and the image position of the element 30 indicated by the acquired element information. The control unit 66 stores the data position (selector information) indicated by the acquired element information in the temporary storage unit 64 so as to be associated with the object 22 displayed on the browser image 20. The control unit 66 functions as an element information acquisition unit.

Figure 10:
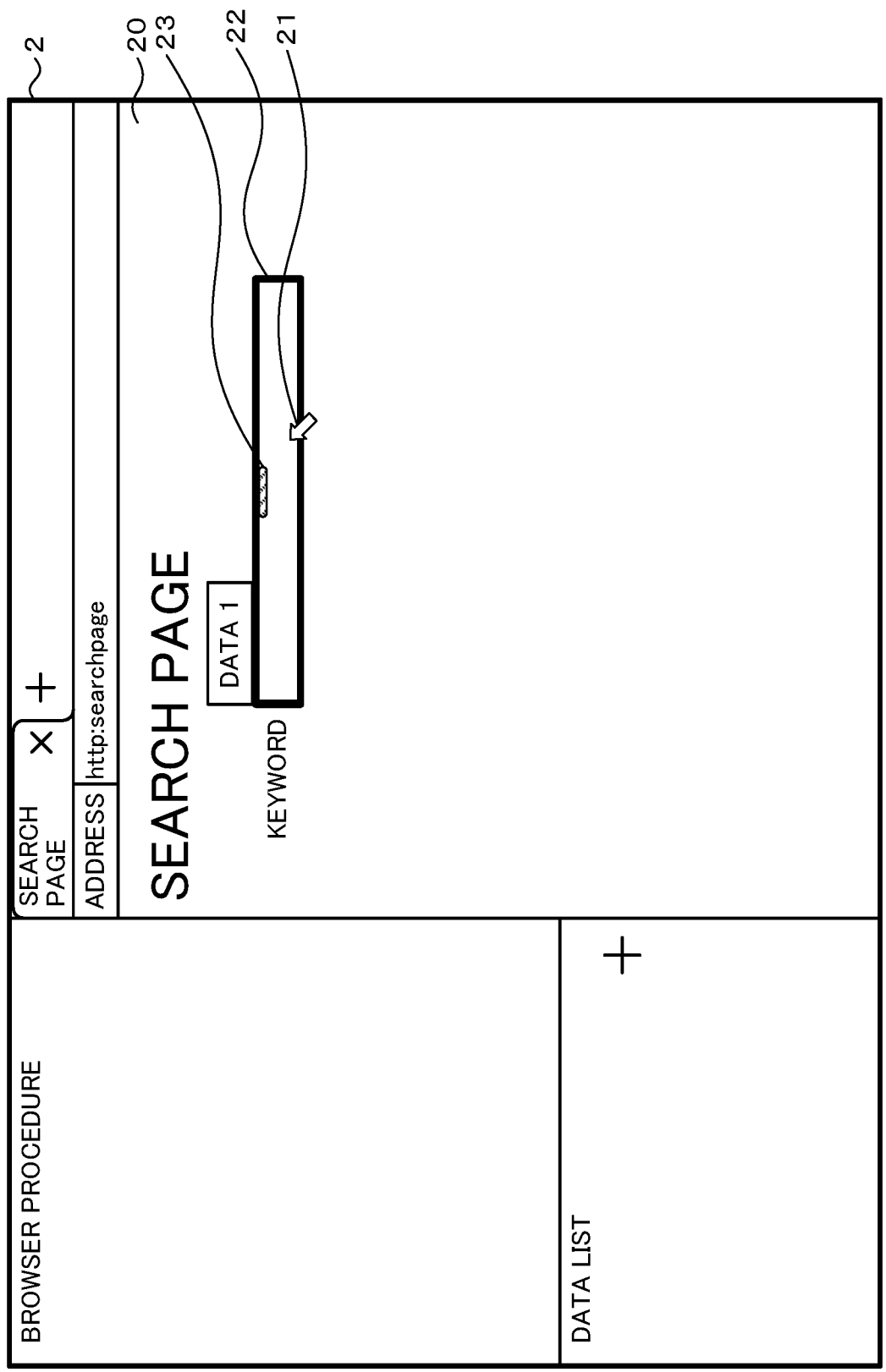
FIG. 10 is an explanatory diagram of the display of an object.

FIG. 10 is an explanatory diagram of the display of the object 22. The object 22 is shown by a thick solid line. The control unit 66 arranges the object 22, which has the same size as the size indicated by the element information received by the communication unit 63, so that the position of the object 22 matches the image position indicated by the element information. As a result, as shown in FIG. 10, the object 22 is displayed so as to surround the element 30 shown in the browser image 20. The control unit 66 instructs the display unit 60 to display a label at the upper left of the object 22. The label is arranged outside the object 22. A label name is displayed on the label. In FIG. 10, the label name is "DATA 1".

The display of the object 22 will be described below with reference to a flowchart.

Figure 11:
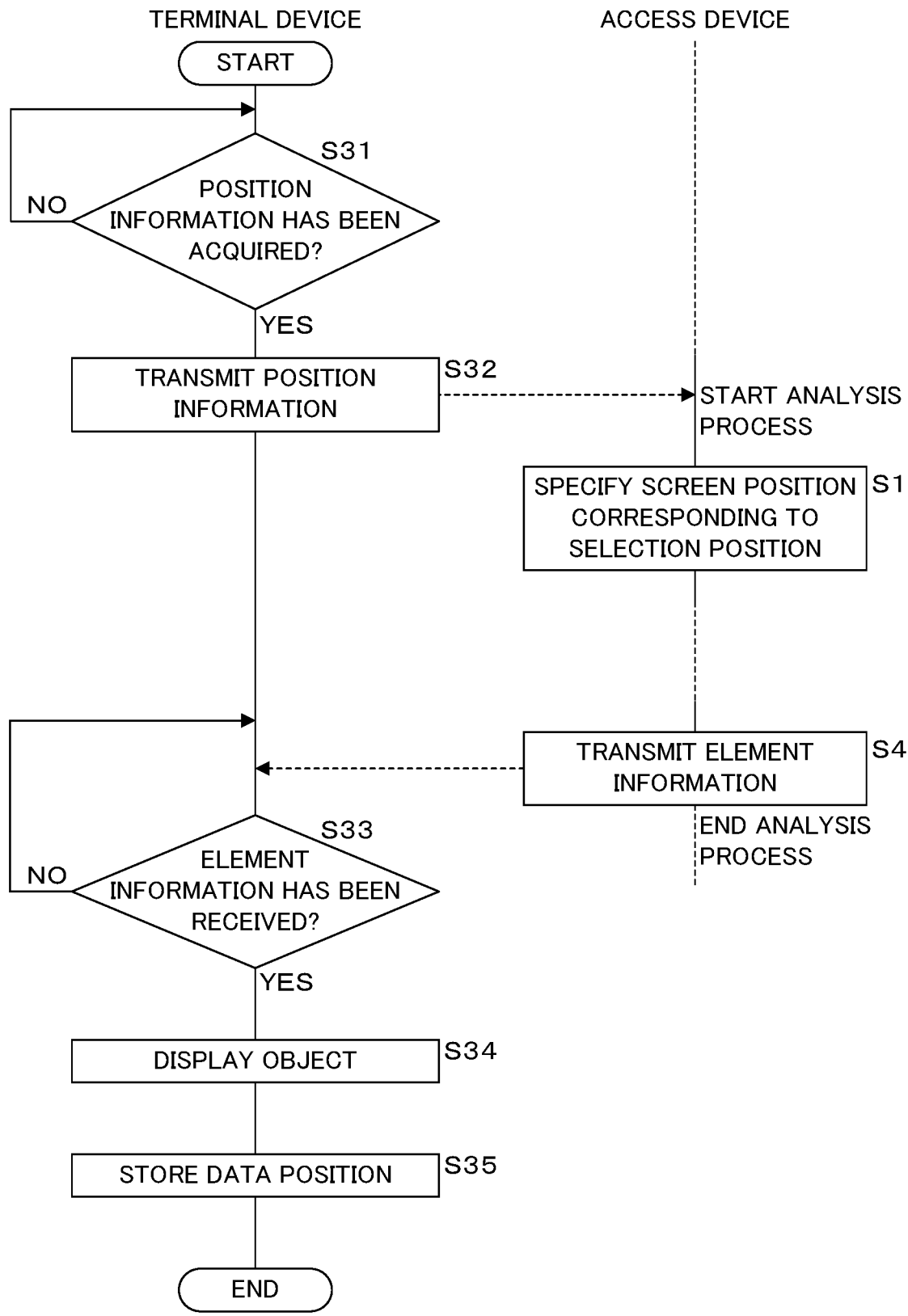
FIG. 11 is a flowchart showing the procedure of processing for displaying an object.

FIG. 11 is a flowchart showing the procedure of processing for displaying the object 22. The control unit 66 of the terminal device determines whether or not position information has been acquired (step S31). When it is determined that the position information has not been acquired (S31: NO), the control unit 66 executes step S31 again, and waits until the position information is acquired. When it is determined that the position information has been acquired (S31: YES), the control unit 66 instructs the communication unit 63 to transmit the acquired position information to the communication unit 40 of the access device 11 (step S32).

In the access device 11, when the communication unit 40 receives the position information, the control unit 42 starts the analysis process. In step S4 of the analysis process, the control unit 42 instructs the communication unit 40 to transmit the element information of the element 30, which is located at the screen position of the browser screen 3 corresponding to the selection position indicated by the position information received from the communication unit 63 of the terminal device 10, to the communication unit 63 of the terminal device 10. The control unit 42 ends the analysis processing after executing step S4.

After executing step S32, the control unit 66 of the terminal device 10 determines whether or not the communication unit 63 has received the element information (step S33). When it is determined that the communication unit 63 has not received the element information (S33: NO), the control unit 66 executes step S33 again, and waits until the communication unit 63 receives the element information. When it is determined that the communication unit 63 has received the element information (S33: YES), the control unit 66 instructs the display unit 60 to display the object 22 on the browser image 20 based on the element information received by the communication unit 63 as described above (step S34). Then, the control unit 66 stores the data position indicated by the element information received by the communication unit 63 in the temporary storage unit 64 so as to be associated with the object 22 displayed in step S34 (step S35). After executing step S35, the control unit 66 ends the processing of displaying the object 22. After this processing ends, the control unit 66 executes step S31 again, and waits until the position information is acquired.

As described above, the element 30 analyzed by the control unit 42 of the access device 11 may be only the element 30 located at the screen position of the browser screen 3 corresponding to the selection position selected by the user using the pointer 21 on the browser image 20. Since the control unit 42 does not analyze the element 30 before the user selects the element 30, it is not necessary to analyze all the elements 30 included in the browser image 20. Therefore, efficient recording of the browser procedure is realized.

In FIG. 10, when the user selects the object 22 corresponding to the element 30, which is a box, with the pointer 21, the control unit 66 receives an input of input data. The user inputs the input data by operating the input operation unit 62.

In addition, a menu button 23 shown by hatching is provided in the object 22. The user can select the menu button 23 using the pointer 21. The control unit 66 receives the selection of the menu button 23. When the menu button 23 is selected by the user, the control unit 66 receives a display instruction of an operation menu 24, and instructs the display unit 60 to display the operation menu 24 indicating a plurality of operations on the terminal screen 2.

Figure 12:
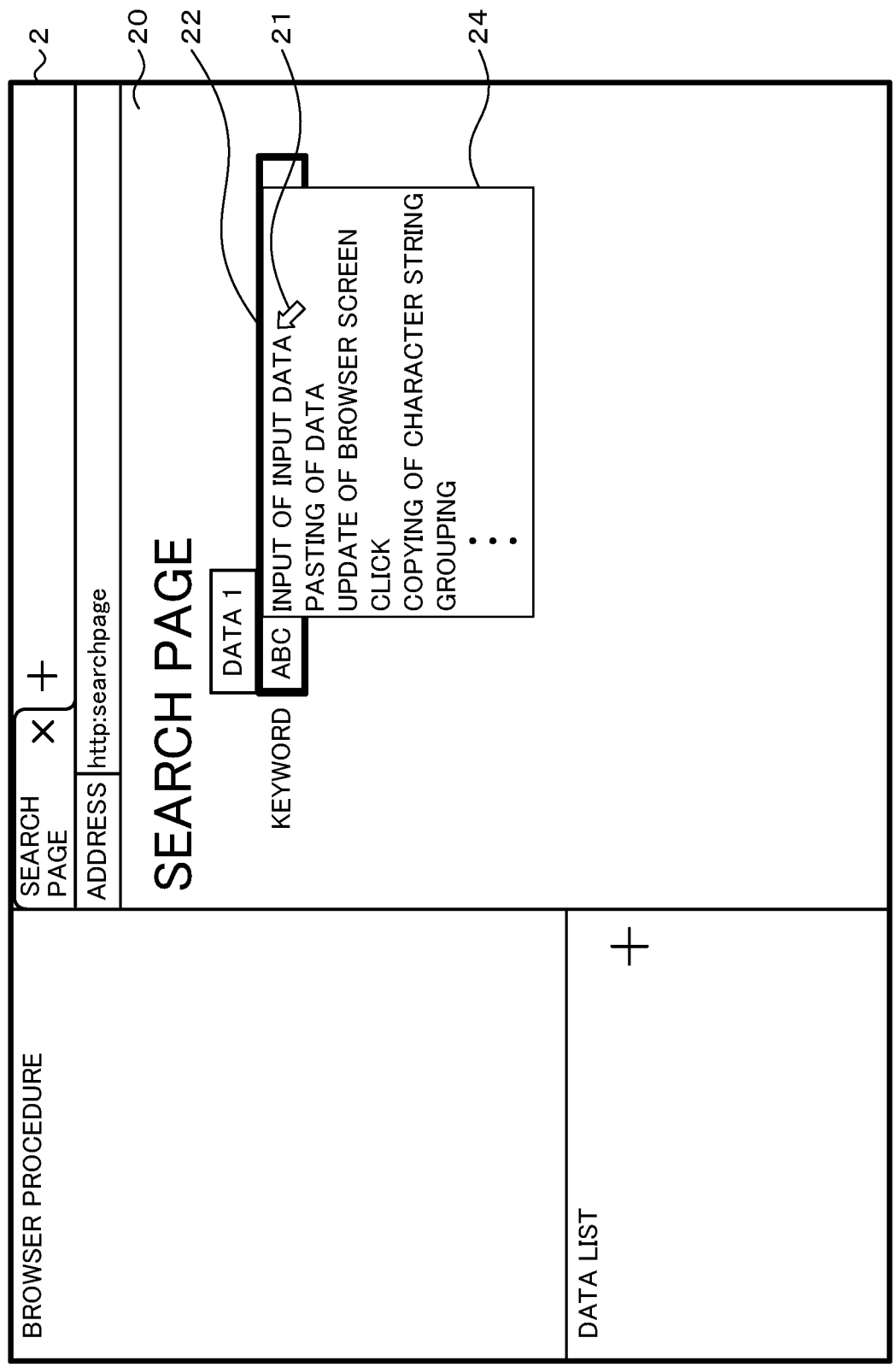
FIG. 12 is an explanatory diagram of the display of an operation menu.

FIG. 12 is an explanatory diagram of the display of the operation menu 24. The control unit 66 instructs the display unit 60 to display the operation menu 24 so as to overlap the object 22. In FIG. 12, as a plurality of operations indicated by the operation menu 24, input of input data, pasting of data, update of the browser screen 3, and the like are listed.

As described above, since the operation menu 24 is displayed so as to overlap the object 22, the user can easily select an operation on the object 22. In addition, when the user selects the menu button 23 using the pointer 21, the operation menu 24 is displayed and a part of the browser image 20 is hidden. Since the operation menu 24 does not hide the browser image 20 until the menu button 23 is selected, the display of the operation menu 24 does not interfere.

Figure 13:
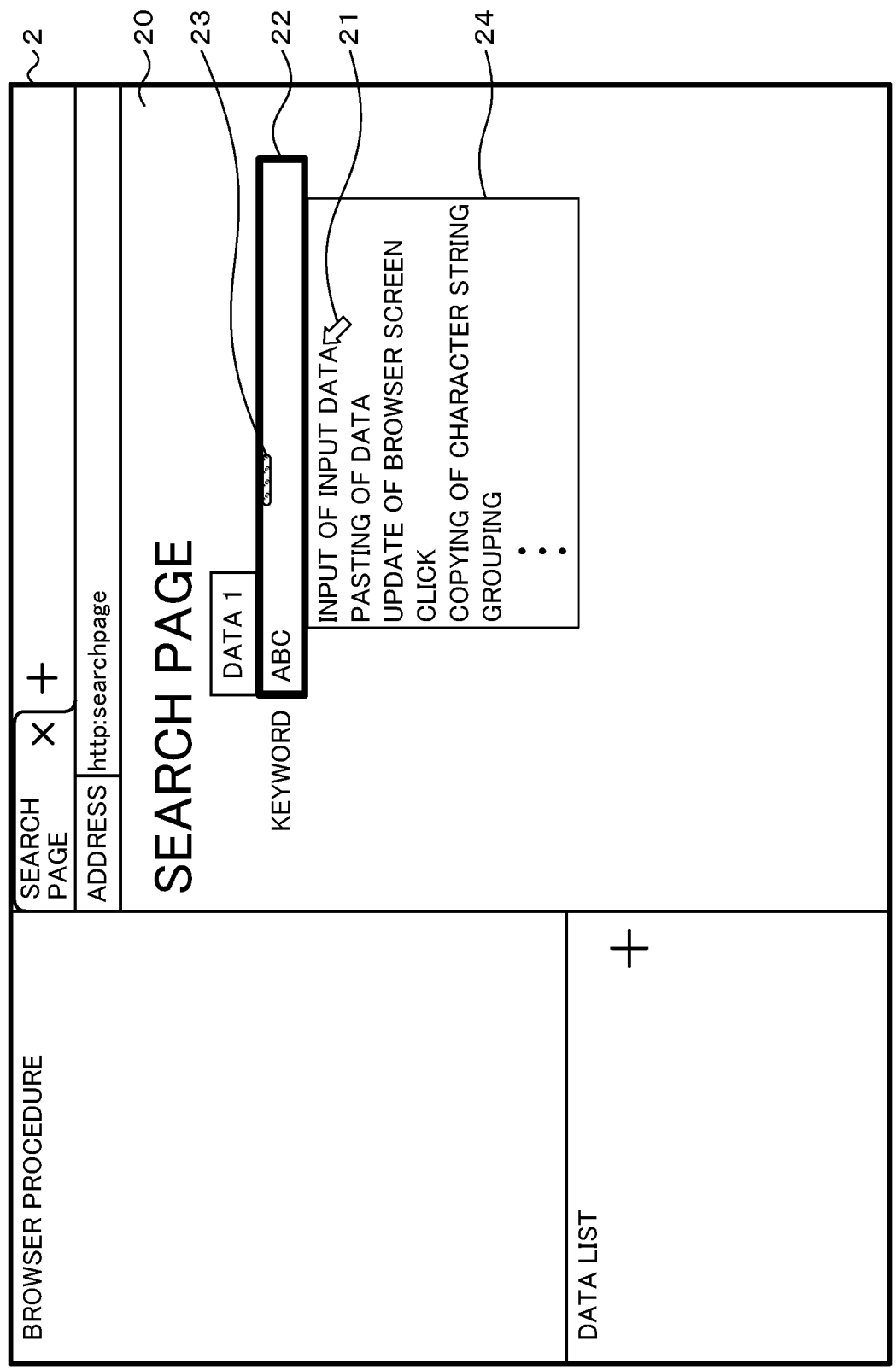
FIG. 13 is an explanatory diagram of another display of the operation menu.

FIG. 13 is an explanatory diagram of another display of the operation menu 24. The user can perform, on the pointer operation unit 61, an operation of giving an instruction to display the operation menu 24 in a state in which the position pointed to by the pointer 21 is aligned with the inside of the object 22. In this case, the control unit 66 receives a display instruction of the operation menu 24. Then, the control unit 66 instructs the display unit 60 to display the operation menu 24 in the vicinity of the object 22.

As described above, since the operation menu 24 is displayed in the vicinity of the object 22, the user can easily select an operation on the object 22. A plurality of operations indicated by the operation menu 24 differ depending on the type of the element corresponding to the object 22.

The display of the operation menu 24 will be described below with reference to a flowchart.

Figure 14:
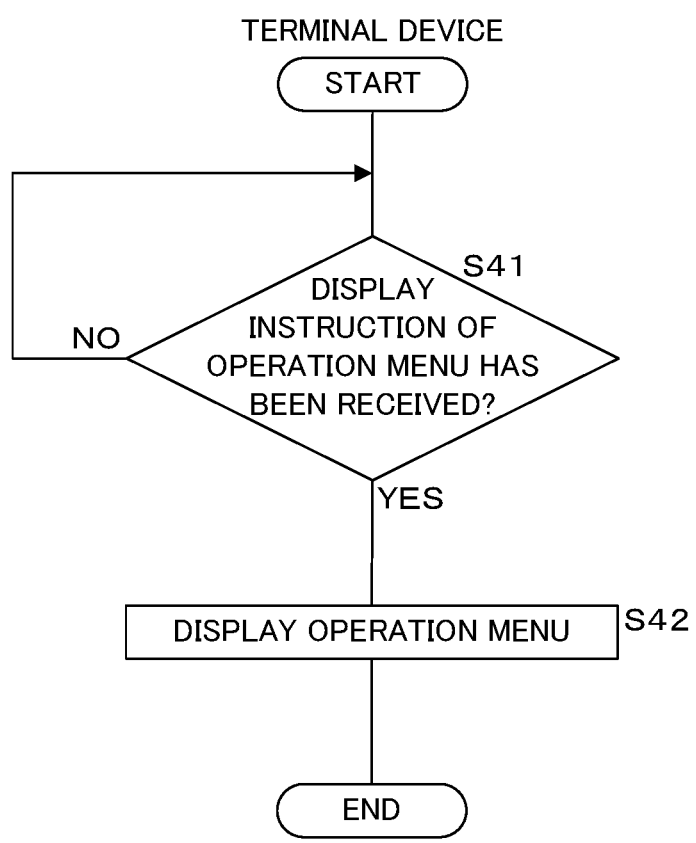
FIG. 14 is a flowchart showing the procedure of processing for displaying an operation menu.

FIG. 14 is a flowchart showing the procedure of processing for displaying the operation menu 24. The control unit 66 of the terminal device 10 determines whether or not a display instruction of the operation menu 24 has been received (step S41). When it is determined that the display instruction of the operation menu 24 has not been received (S41: NO), the control unit 66 executes step S41 again, and waits until the display instruction of the operation menu 24 is received. When it is determined that the display instruction of the operation menu 24 has been received (S41: YES), the control unit 66 displays the operation menu 24 (step S42) and ends the processing of displaying the operation menu 24. After this processing ends, the control unit 66 executes step S41 again, and waits until the display instruction of the operation menu 24 is received.

It is noted that, when the menu button 23 is selected, the control unit 66 may instruct the display unit 60 to display the operation menu 24 in the vicinity of the object 22. In addition, when an operation to give an instruction to display the operation menu 24 is performed by the pointer operation unit 61, the control unit 66 may instruct the display unit 60 to display the operation menu 24 so as to overlap the object 22. The method of displaying a plurality of operations in the operation menu 24 is not limited to the method of sequentially displaying a plurality of operations from the upper side to the lower side, and may be, for example, a method of displaying four operations on the upper side, the lower side, the left side, and the right side of the object 22.

In each of FIGS. 12 and 13, in the object 22, "ABC" is input as input data to be input to the element 30 corresponding to the object 22. In this stage, the control unit 42 of the access device 11 does not input the input data "ABC" to the element 30 of the browser screen 3 corresponding to the object 22.

In a state in which the display unit 60 displays the operation menu 24 as shown in FIG. 12 or FIG. 13, the user can select "INPUT OF INPUT DATA" using the pointer 21. The control unit 66 of the terminal device 10 receives the input of input data. When the input of the input data is received, the control unit 66 adds one procedure to the browser procedure and adds the input data to the data list.

Figure 15:
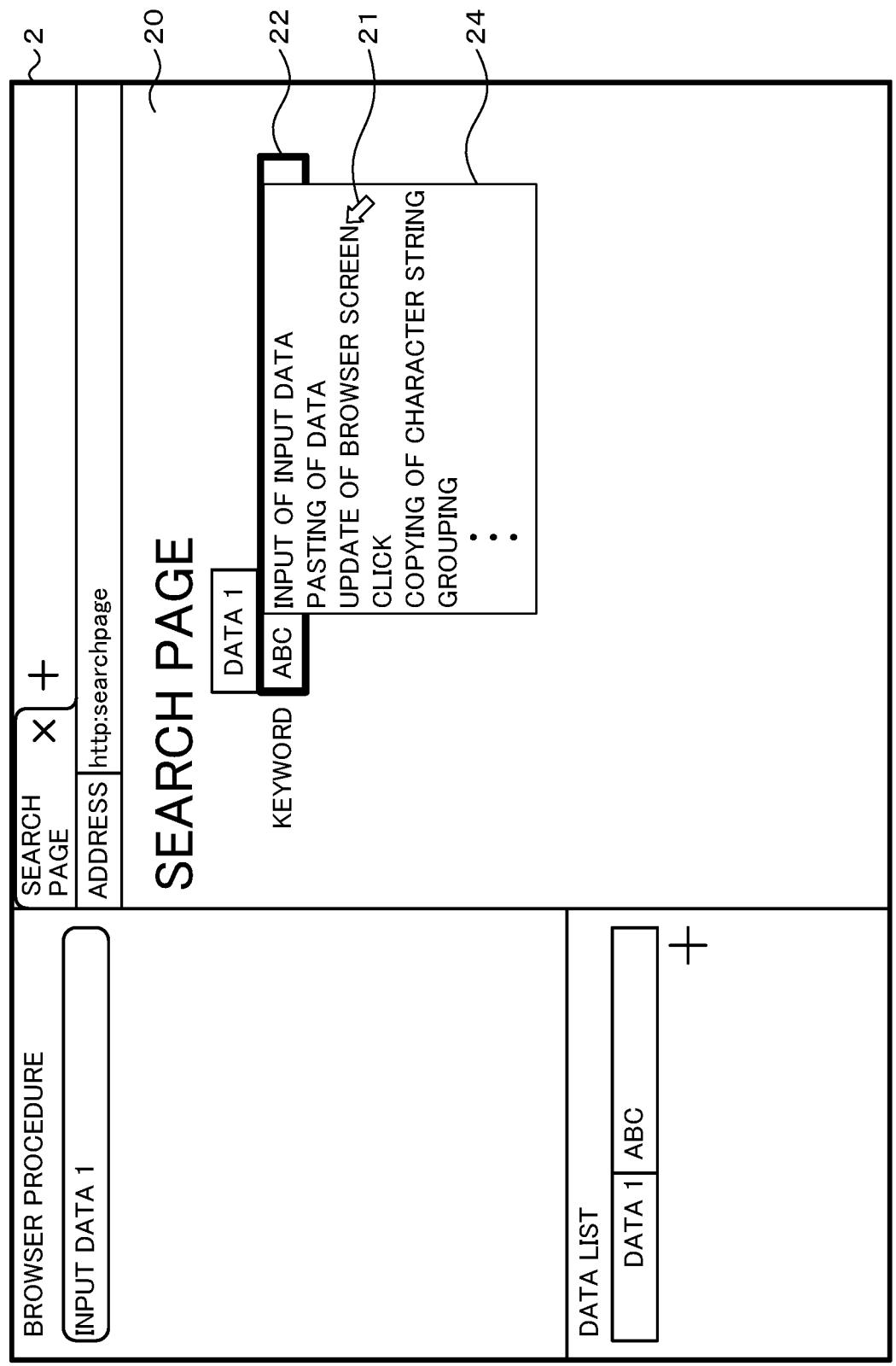
FIG. 15 is a schematic diagram of a terminal screen after input data is input.

FIG. 15 is a schematic diagram of the terminal screen 2 after the input data is input. As shown in FIG. 15, the control unit 66 instructs the display unit 60 to display an operation of inputting the input data of the label name "DATA 1", as a first operation, in the browser procedure column. In addition, the control unit 66 instructs the display unit 60 to display the input data "ABC" to be input to the element 30 corresponding to the object 22, in the data list column, together with the browser image 20 so as to be associated with the label name "DATA 1". Therefore, the user can easily check the input data on the terminal screen 2.

The display of input data will be described below with reference to a flowchart.

Figure 16:
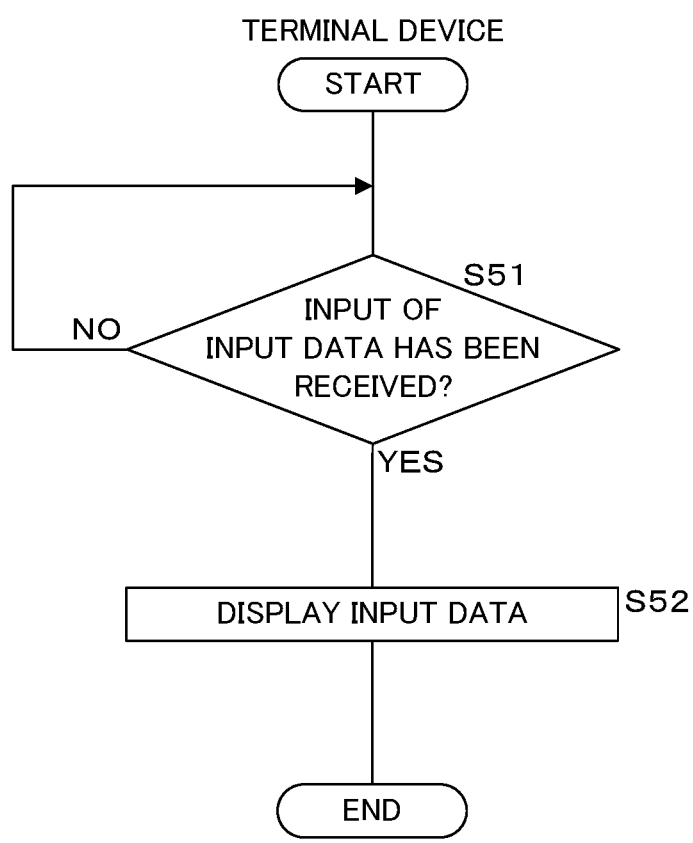
FIG. 16 is a flowchart showing the procedure of processing for displaying input data.

FIG. 16 is a flowchart showing the procedure of processing for displaying input data. The control unit 66 of the terminal device 10 determines whether or not the input of input data has been received (step S51). When it is determined that the input of input data has not been received (S51: NO), the control unit 66 executes step S51 again, and waits until the input of input data is received. When it is determined that the input of input data has been received (S51: YES), the control unit 66 instructs the display unit 60 to display the input data in the data list column so as to be associated with the label name (step S52). After executing step S52, the control unit 66 ends the processing of displaying the input data. After this processing ends, the control unit 66 executes step S51 again, and waits until the input of the input data is received.

It is noted that the control unit 66 may instruct the display unit 60 to display the browser procedure column and the data list column on a screen different from the terminal screen 2 displaying the browser image 20. Hereinafter, an example of displaying the browser procedure column, the data list column, and the browser image 20 on the same terminal screen 2 will be described.

As described above, the user can display the operation menu 24 again and select the update of the browser screen 3 using the pointer 21. The control unit 66 receives the selection for updating the browser screen 3. When the selection for updating the browser screen 3 is received, the control unit 66 instructs the communication unit 63 to transmit the update information to the communication unit 40 of the access device 11. In the example of FIG. 15, since the object 22 corresponds to the element 30 that is a box, the communication unit 63 transmits, to the communication unit 40 of the access device 11, update information which indicates: the data position of the element 30 corresponding to the selected object 22; and the input data "ABC" in the object 22.

In the access device 11, when the communication unit 40 receives the update information, the control unit 42 performs screen update processing. In this case, the control unit 42 inputs the input data "ABC" indicated by the update information to the element 30 located at the data position indicated by the update information in the browser screen data. The control unit 42 instructs the communication unit 40 to access the web server 12 to update the browser screen 3. The control unit 66 instructs the communication unit 40 to transmit, to the communication unit 63 of the terminal device 10, the browser image data of the browser image 20 in which the web page portion of the updated browser screen 3 is shown. When the communication unit 63 receives the browser image data, the control unit 66 of the terminal device 10 instructs the display unit 60 to display the browser image 20 of the browser image data received by the communication unit 63.

Figure 17:
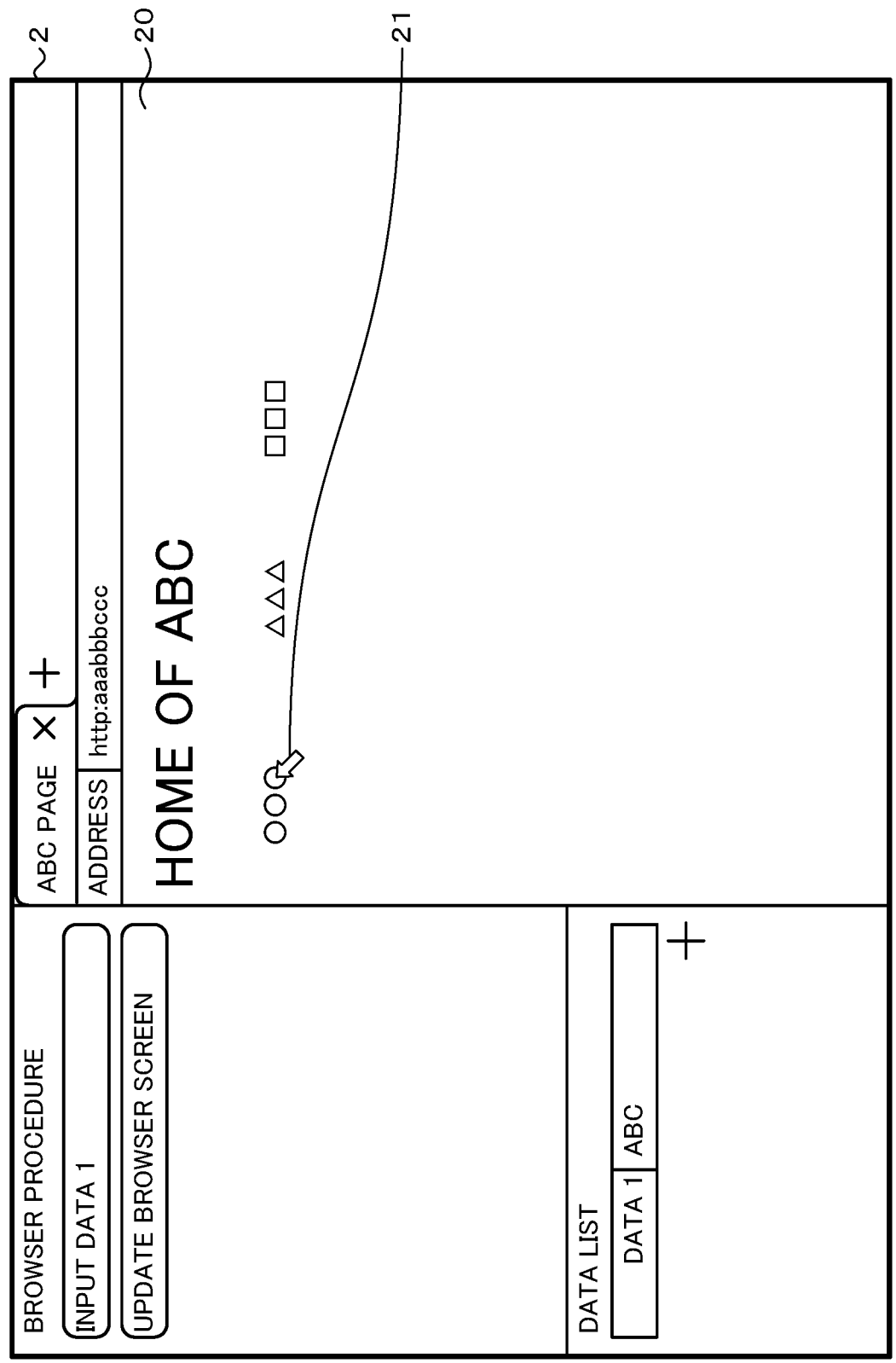
FIG. 17 is a schematic diagram of an updated terminal screen.

FIG. 17 is a schematic diagram of the updated terminal screen 2. As shown in FIG. 17, the browser image 20 showing a web page corresponding to the keyword "ABC" is displayed on the terminal screen 2. The control unit 66 instructs the display unit 60 to display the updated browser image 20 and display "UPDATE OF BROWSER SCREEN 3" in the browser procedure column. Three elements 30 shown by "○○○", "ΔΔΔ", and "□□□" are shown in the browser image 20 of FIG. 17. These elements 30 are links.

The update of the browser image 20 will be described below with reference to a flowchart.

Figure 18:
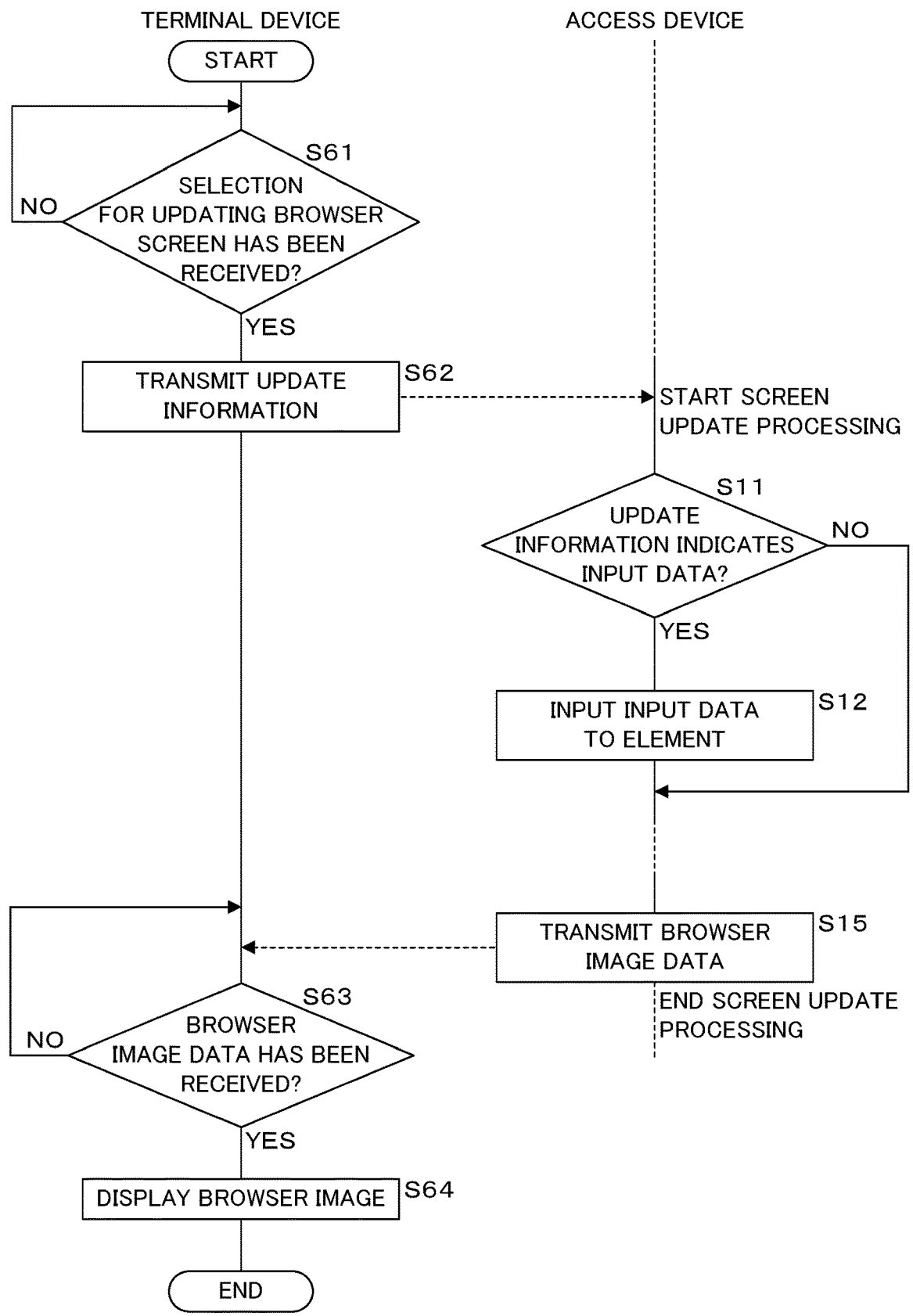
FIG. 18 is a flowchart showing the procedure of processing for updating a browser image.

FIG. 18 is a flowchart showing the procedure of processing for updating the browser image 20. The control unit 66 of the terminal device 10 determines whether or not the selection for updating the browser screen 3 has been received (step S61). When it is determined that the selection for updating the browser screen 3 has not been received (S61: NO), the control unit 66 executes step S61 again, and waits until the selection for updating the browser screen 3 is received. When it is determined that the selection for updating the browser screen 3 is received (S61: YES), the control unit 66 instructs the communication unit 63 to transmit the update information to the communication unit 40 of the access device 11 (step S62).

In the access device 11, when the communication unit 40 receives the update information, the control unit 42 starts the screen update processing. In step S15 of the screen update processing, the control unit 42 instructs the communication unit 40 to transmit, to the communication unit 63 of the terminal device 10, the browser image data of the browser image 20 in which the updated browser screen 3 is shown. After executing step S15, the control unit 42 ends the screen update processing.

After executing step S62, the control unit 66 of the terminal device 10 determines whether or not the communication unit 63 has received browser image data (step S63). When it is determined that the communication unit 63 has not received the browser image data (S63: NO), the control unit 66 executes step S63 again, and waits until the communication unit 63 receives the browser image data. When it is determined that the communication unit 63 has received the browser image data (S63: YES), the control unit 66 instructs the display unit 60 to display, on the terminal screen 2, the browser image 20 of the browser image data received by the communication unit 63 (step S64). After executing step S64, the control unit 66 ends the processing of updating the browser image 20. After this processing ends, the control unit 66 executes step S61 again, and waits until the selection for updating the browser screen 3 is received.

It is noted that, when the browser image 20 is a moving image, the browser image 20 is updated every time the browser screen 3 is updated.

In FIG. 17, the user can select the position of the element 30 using the pointer 21. At this time, the control unit 66 performs processing for displaying the object 22 as described above. Specifically, the control unit 66 acquires position information indicating the selection position selected by the pointer 21. When the position information is acquired, the control unit 66 instructs the communication unit 63 to transmit the acquired position information to the communication unit 40 of the access device 11. In the access device 11, when the communication unit 40 receives the position information, the control unit 66 performs analysis processing, and the communication unit 40 transmits the element information to the communication unit 63 of the terminal device 10. When the communication unit 63 receives the element information, the control unit 66 of the terminal device 10 displays the rectangular frame-shaped object 22 on the display unit 60 based on the size and the image position of the element 30 indicated by the element information received by the communication unit 63. The control unit 66 stores the data position indicated by the element information received by the communication unit 63 in the temporary storage unit 64 so as to be associated the displayed object 22.

Figure 19:
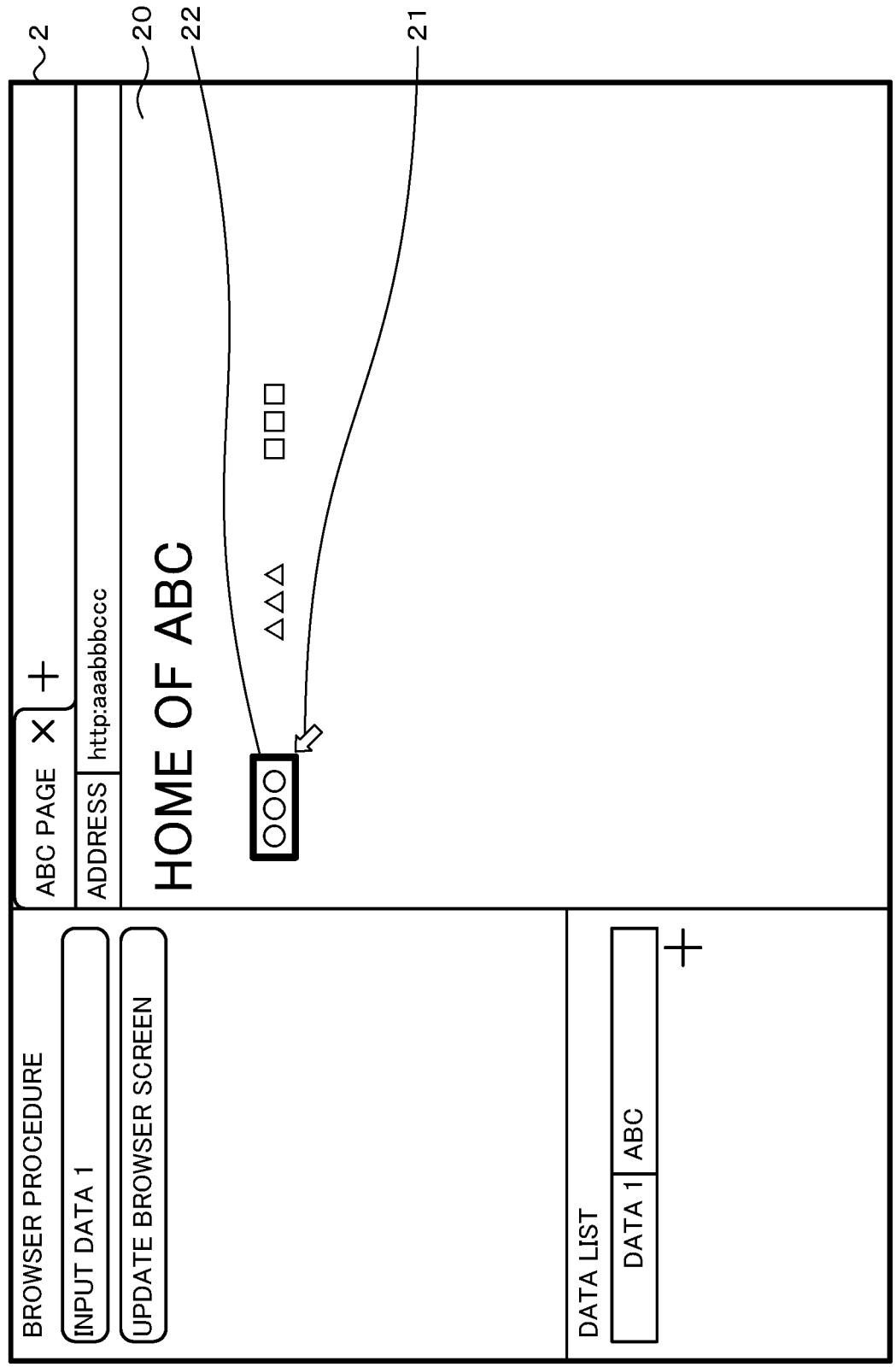
FIG. 19 is an explanatory diagram of another display of an object.

FIG. 19 is an explanatory diagram of another display of the object 22. The control unit 66 instructs the display unit 60 to arrange the object 22, which has the same size as the size indicated by the element information received by the communication unit 63, so that the position of the object 22 matches the image position indicated by the element information. As a result, as shown in FIG. 19, the object 22 surrounds the element 30 shown in the browser image 20. The user can perform an operation of giving an instruction to display the operation menu 24, in the pointer operation unit 61, in a state in which the position pointed by the pointer 21 is aligned with the object 22. At this time, as described above, the control unit 66 performs processing for displaying the operation menu 24, and receives an instruction to display the operation menu 24. The control unit 66 instructs the display unit 60 to display the operation menu 24 in the vicinity of the object 22 or so as to overlap the object 22.

Figure 20:
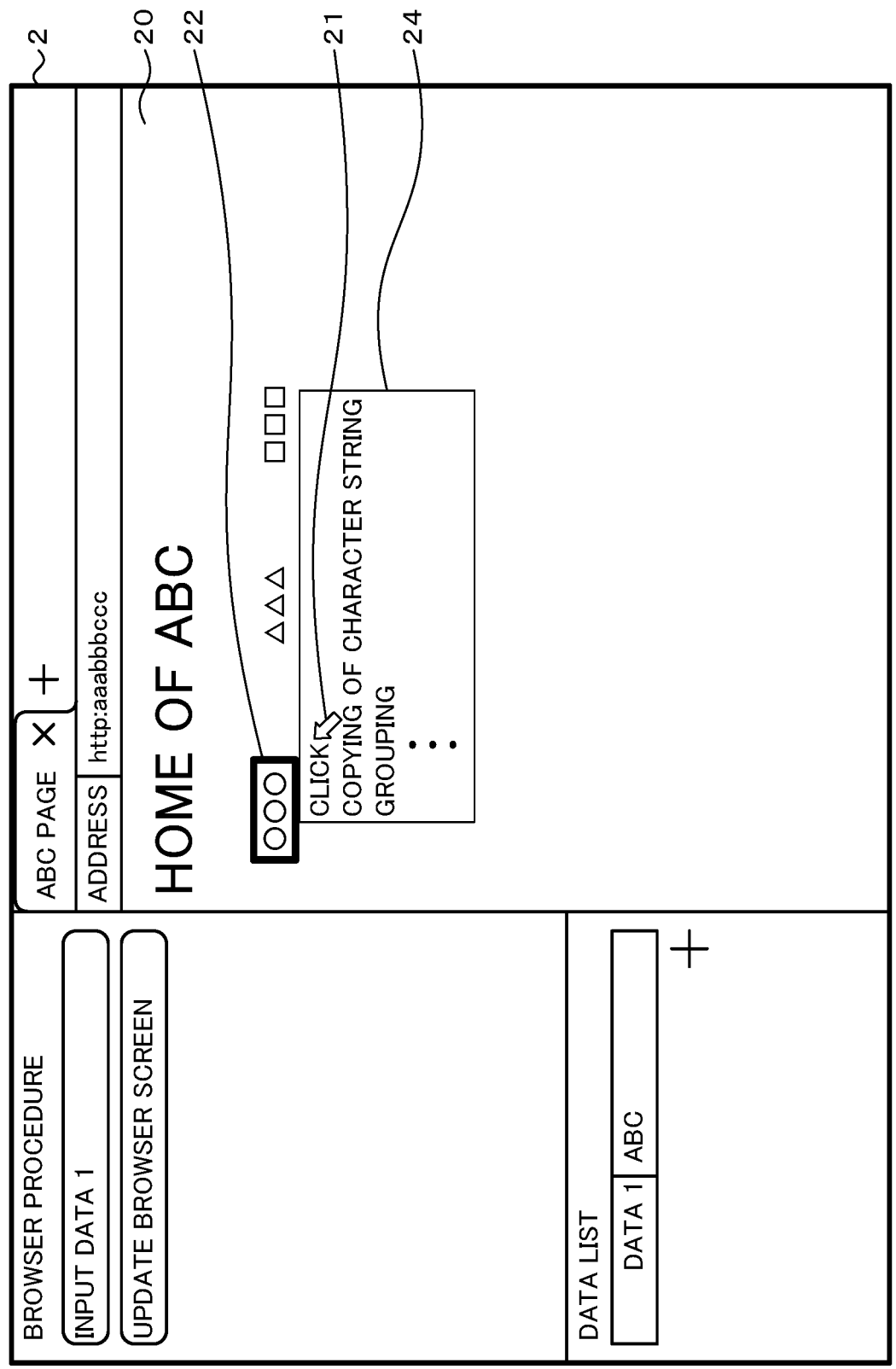
FIG. 20 is an explanatory diagram of an operation performed on an object.

FIG. 20 is an explanatory diagram of an operation performed on the object 22. As shown in FIG. 20, the operation menu 24 is displayed in the vicinity of the object 22. On the browser screen 3, when a link that is "◯◯◯" is selected, the user selects click using the pointer 21. In this case, the control unit 66 of the terminal device 10 performs processing for updating the browser image 20, and receives an instruction to update the browser screen 3 for the object 22. The control unit 66 instructs the communication unit 63 to transmit, to the communication unit 40 of the access device 11, update information which indicates the data position of the element corresponding to the object 22. In the example of FIG. 20, since the object 22 corresponds to the element 30 that is a link, the update information transmitted by the communication unit 63 does not indicate the input data in the object 22.

In the access device 11, the control unit 42 performs the screen update processing when the communication unit 40 receives the update information. In the screen update processing, the control unit 42 updates the browser screen 3 by causing the communication unit 40 to access the web server 12. Then, the control unit 42 instructs the communication unit 40 to transmit, to the communication unit 63 of the terminal device 10, the browser image data of the browser image 20 in which the web page portion of the updated browser screen 3 is shown. When the communication unit 63 receives the browser image data, the control unit 66 of the terminal device 10 instructs the display unit 60 to display, on the terminal screen, the browser image 20 of the browser image data received by the communication unit 63.

Figure 21:
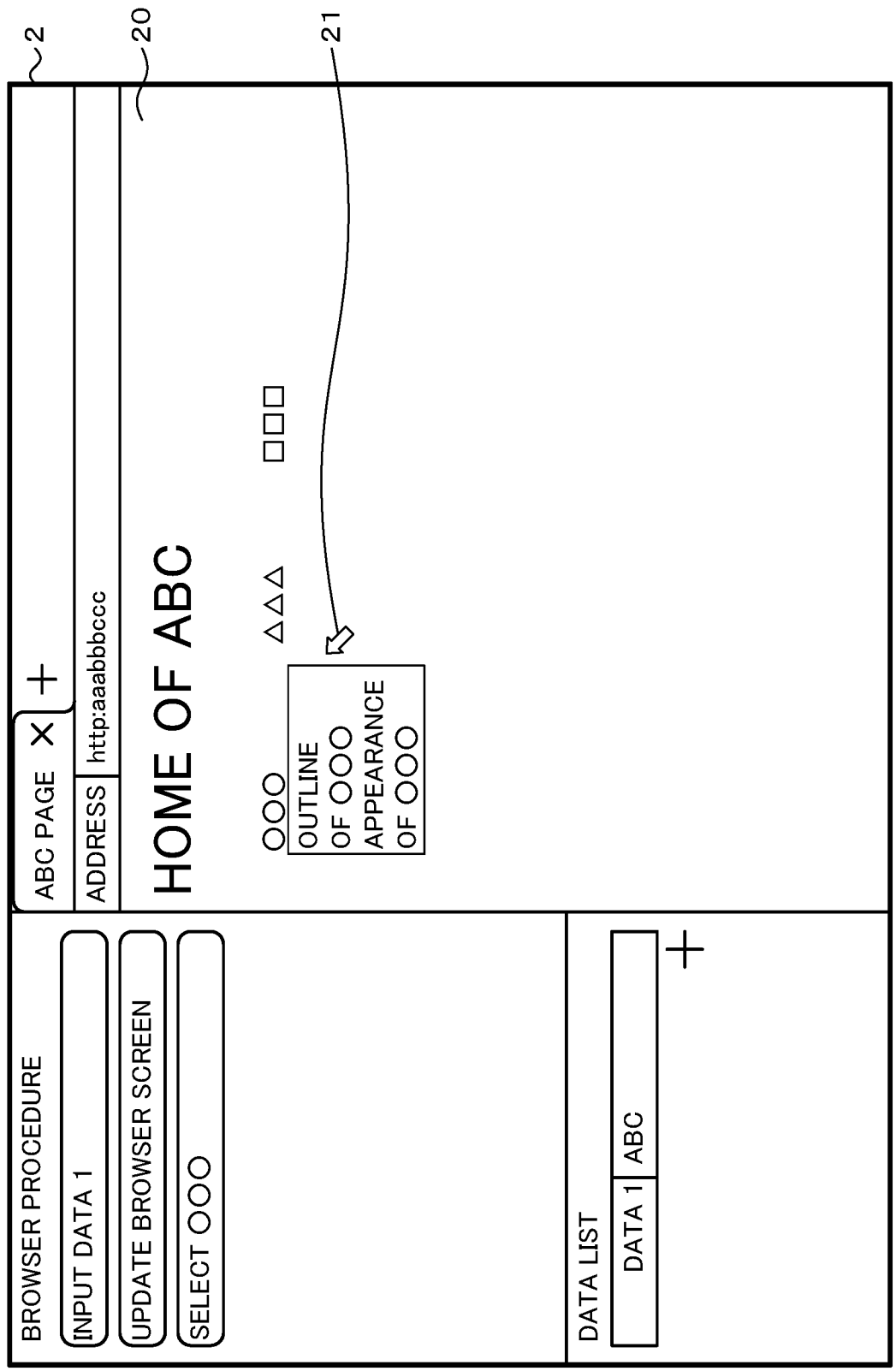
FIG. 21 is a schematic diagram of a terminal screen after an element is selected.

FIG. 21 is a schematic diagram of the terminal screen 2 after the element 30 is selected. As shown in FIG. 21, the browser image 20 is displayed in which two new elements 30 are shown below "◯◯◯". The control unit 66 instructs the display unit 60 to display "SELECT ◯◯◯" in the browser procedure column in addition to the browser image 20.

As described above, the control unit 66 receives an operation, such as selection using the pointer 21 or input of input data, on the terminal screen 2. The control unit 66 instructs the display unit 60 to add the operation to the browser procedure column and to add the data to the data list.

Figure 22:
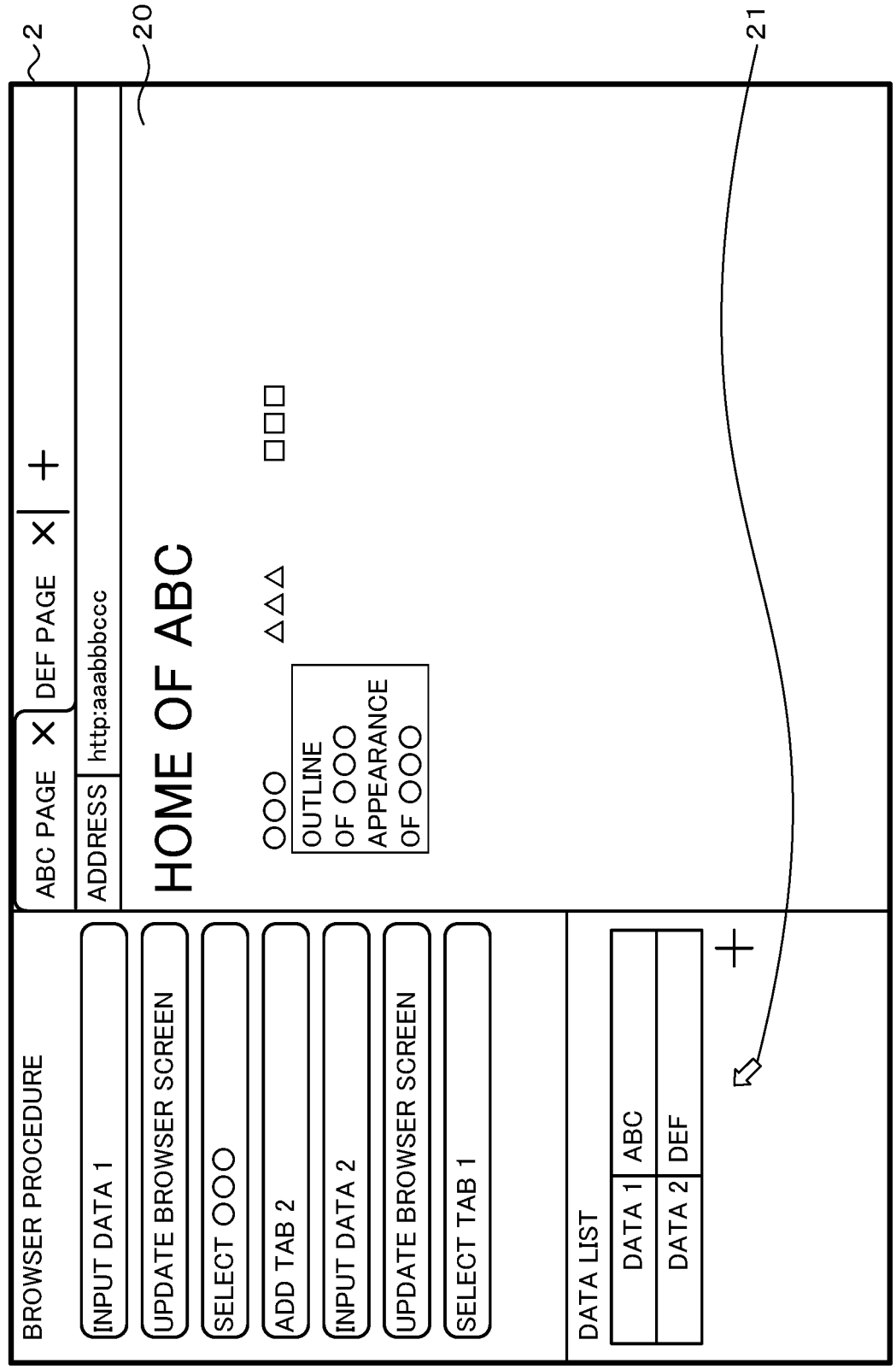
FIG. 22 is a schematic diagram of a terminal screen after various operations are performed.

FIG. 22 is a schematic diagram of the terminal screen 2 after various operations have been performed. In the procedure shown in FIG. 22, input data "ABC" corresponding to the label name "DATA 1" is input, the browser screen 3 is updated, and the element indicating "◯◯◯" is selected on the updated browser screen 3. Then, tab 2 is added, "DEF" corresponding to the label name "DATA 2" is input on the web page of tab 2, the browser screen 3 is updated, and tab 1 is selected on the updated browser screen 3. As a result, the web page corresponding to tab 1 is displayed.

The addition of tab 2 will be described. The user selects an add button for adding a web page on the terminal screen 2 using the pointer 21. Thereby, the control unit 66 of the terminal device 10 instructs the communication unit 63 to transmit update information indicating the selected button, that is, the add button, to the communication unit 40 of the access device 11.

When the communication unit 40 receives the update information, the control unit 42 of the access device 11 performs screen update processing. Thereby, as described above, the browser screen 3 is updated in the access device 11. As a result, tab 2 is added to the browser screen 3. The communication unit 40 transmits, to the communication unit 63 of the terminal device 10, the browser image data of the browser image 20 in which the web page portion of the updated browser screen 3 is shown. When the communication unit 63 receives the browser image data, the control unit 66 instructs the display unit 60 to display, on the terminal screen 2, the browser image 20 in which the web page portion of tab 2 is shown. Then, the control unit 66 instructs the display unit 60 to display "ADD TAB 2" in the browser procedure column. As a result, the addition of tab 2 is realized.

The selection of tab 1 will be described. The user selects a tab indicating "ABC PAGE" in the browser image 20 using the pointer 21. Thereby, the control unit 66 of the terminal device 10 instructs the communication unit 63 to transmit the update information indicating the selected tab to the communication unit of the access device 11.

When the communication unit 40 receives the update information, the control unit 42 of the access device 11 performs screen update processing. Thereby, as described above, the browser screen 3 is updated in the access device 11. As a result, a web page corresponding to the selected tab is displayed on the browser screen 3. The communication unit 40 transmits, to the communication unit 63 of the terminal device 10, the browser image data of the browser image 20 in which the web page portion of the updated browser screen 3 is shown. When the communication unit 63 receives the browser image data, the control unit 66 instructs the display unit 60 to display, on the terminal screen 2, the browser image 20 in which the web page portion of the tab is shown. Then, the control unit 66 instructs the display unit 60 to display "SELECT TAB 1" in the browser procedure column. As a result, the selection of tab 1 is realized.

The deletion of tab 2 will be described. The deletion of tab 2 is realized similarly to the addition of tab 2. The user selects a delete button for deleting a web page in the browser image 20 using the pointer 21. Thereby, the control unit 66 of the terminal device instructs the communication unit 63 to transmit update information indicating the selected button, that is, the delete button, to the communication unit 40 of the access device 11.

When the communication unit 40 receives the update information, the control unit 42 of the access device 11 performs screen update processing. Thereby, as described above, the browser screen 3 is updated in the access device 11. As a result, tab 2 is deleted from the browser screen 3. The communication unit 40 transmits, to the communication unit 63 of the terminal device 10, the browser image data of the browser image 20 in which the web page portion of the updated browser screen 3 is shown. The display unit 60 of the terminal device 10 displays, on the terminal screen 2, the browser image 20 which shows the web page portion of the browser screen 3 from which the web page of tab 2 and tab 2 have been deleted. As a result, the deletion of tab 2 is realized.

On the terminal screen 2 of FIG. 22, "DATA 1" and "DATA 2" are displayed as label names. The user can change the label name. The user selects a portion in which "DATA 1" is described in the browser procedure column or the data list column using the pointer 21. Thereby, the control unit 66 receives a change instruction of the label name, instructs the display unit 60 to display a box for inputting the label name, and receives an input of the label name from the user. The user operates the input operation unit 62 to input the name in the box. The control unit 66 instructs the display unit 60 to change the label name to the name input by the user.

Figure 23:
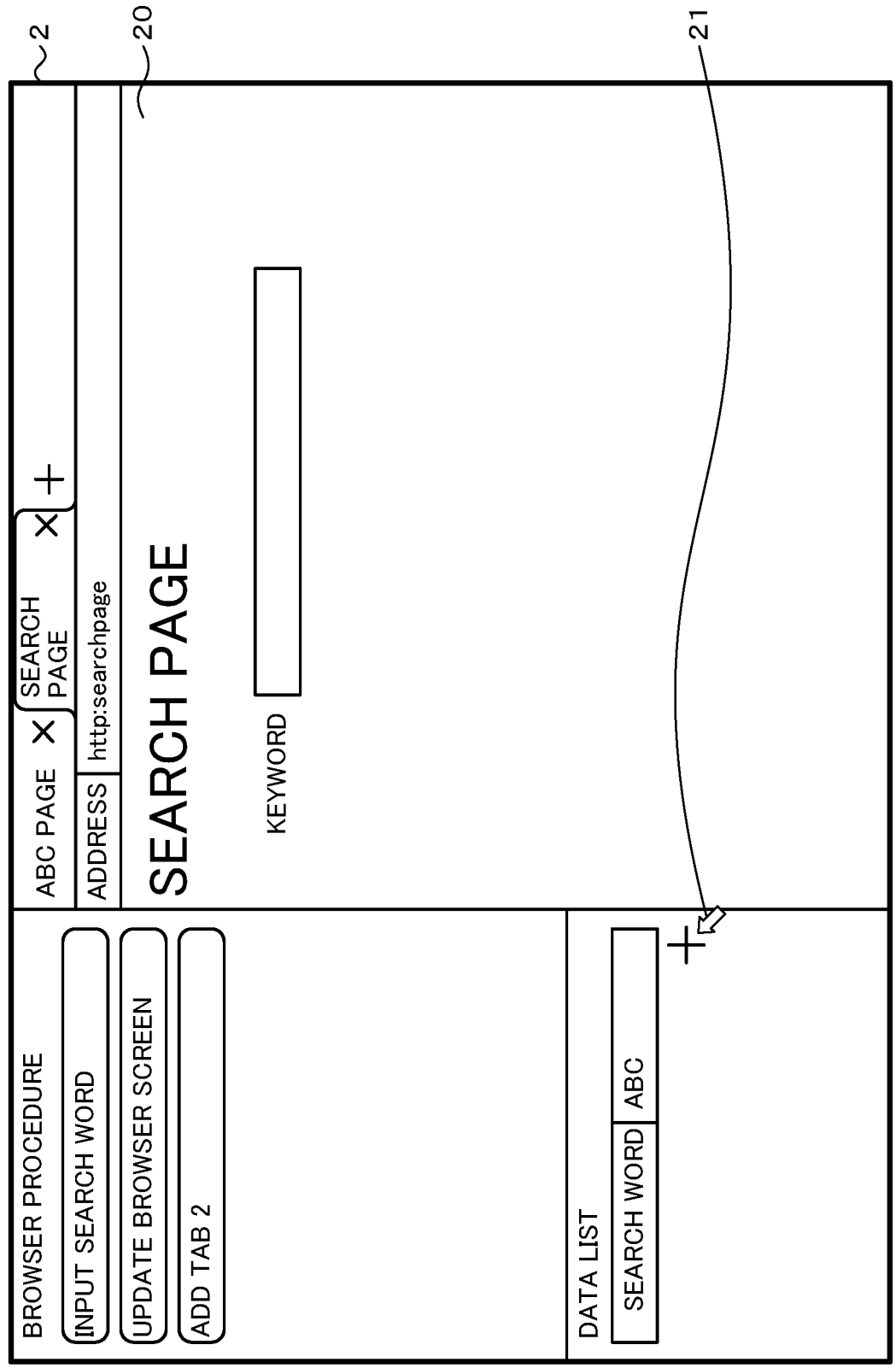
FIG. 23 is an explanatory diagram of the addition of input data to a data list.

FIG. 23 is an explanatory diagram of the addition of input data to the data list. On the terminal screen 2 shown in FIG. 23, the label name of the input data "ABC" is changed from "DATA 1" to "SEARCH WORD". In FIG. 23, the addition of input data to the data list will be described. When adding input data to the data list, the user clicks a button indicating the addition of input data to the data list using the pointer 21. Thereby, the control unit 66 receives an instruction to add the input data to the data list. The control unit 66 instructs the display unit 60 to display, in the data list column, an input field for input data which has a label name "ADD 1". Then, the control unit 66 receives an input of input data to the input field. The user can input the input data corresponding to the label name "ADD 1" by operating the input operation unit 62. When the input of the input data is received, the control unit 66 instructs the display unit 60 to add the input data to the data list.

Figure 24:
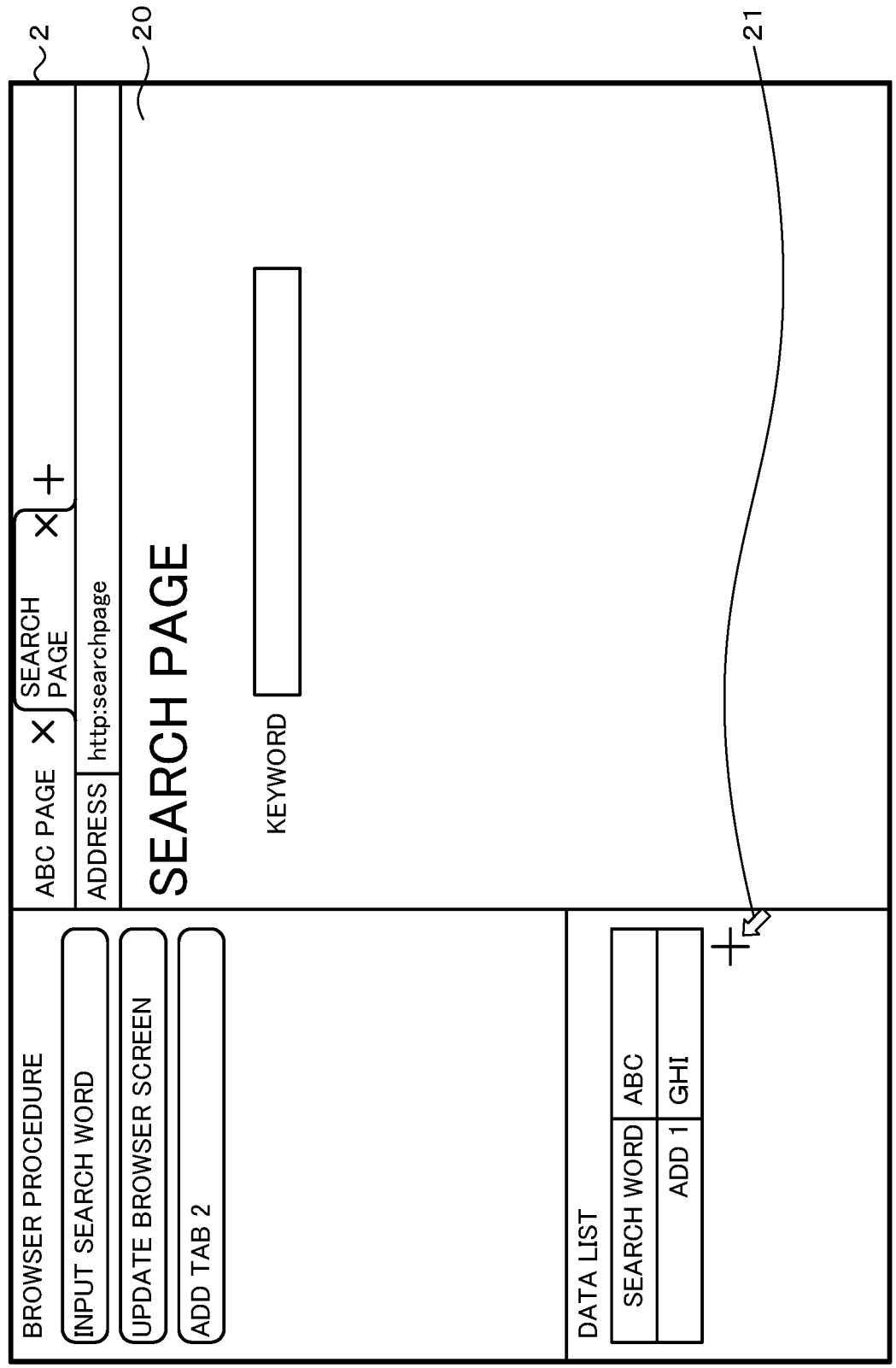
FIG. 24 is a schematic diagram of a terminal screen after input data is added to a data list.

FIG. 24 is a schematic diagram of the terminal screen 2 after the input data is added to the data list. In the example of FIG. 24, the user inputs "GHI" in the input field corresponding to the label name "ADD 1" by operating the input operation unit 62. The display unit 60 displays the input data "GHI". The control unit 66 stores the input data displayed in the data list column in the temporary storage unit 64.

Input data that is not used in the browser procedure can be changed again by the user. Specifically, the user can change the input data from "GHI" to other data. Input data used in the browser procedure cannot be changed by the user. Specifically, the user cannot change the input data corresponding to the label name "SEARCH WORD" from "ABC" to other data. The label name can be changed by the user at any time.

The addition of input data to the data list will be described below with reference to a flowchart.

Figure 25:
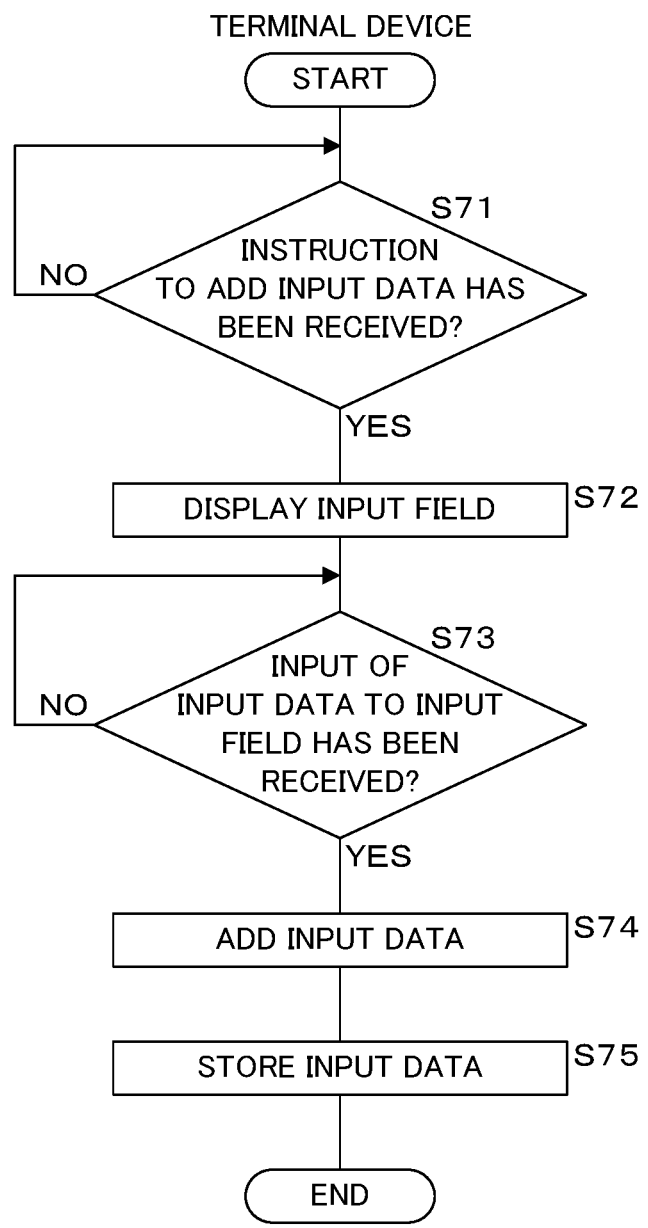
FIG. 25 is a flowchart showing the procedure of processing for adding input data to the data list.

FIG. 25 is a flowchart showing the procedure of processing for adding input data to the data list. The control unit 66 of the terminal device 10 determines whether or not an instruction to add input data has been received (step S71). When it is determined that the instruction to add the input data has not been received (S71: NO), the control unit 66 executes step S71 again, and waits until the instruction to add the input data is received. When it is determined that the instruction to add the input data has been received (S71: YES), the control unit 66 instructs the display unit 60 to display an input field for input data (step S72), and determines whether or not the input of input data to the input field has been received (step S73).

When it is determined that the input of input data has not been received (S73: NO), the control unit 66 executes step S73 again, and waits until the input of input data is received. When it is determined that the input of input data has been received (S73: YES), the control unit 66 instructs the display unit 60 to add the input data to the data list (step S74), and stores the input data in the temporary storage unit 64 (step S75). After executing step S75, the control unit 66 ends the processing of adding the input data to the data list. After this processing ends, the control unit 66 executes step S71 again, and waits until an instruction to add the input data is received.

Figure 26:
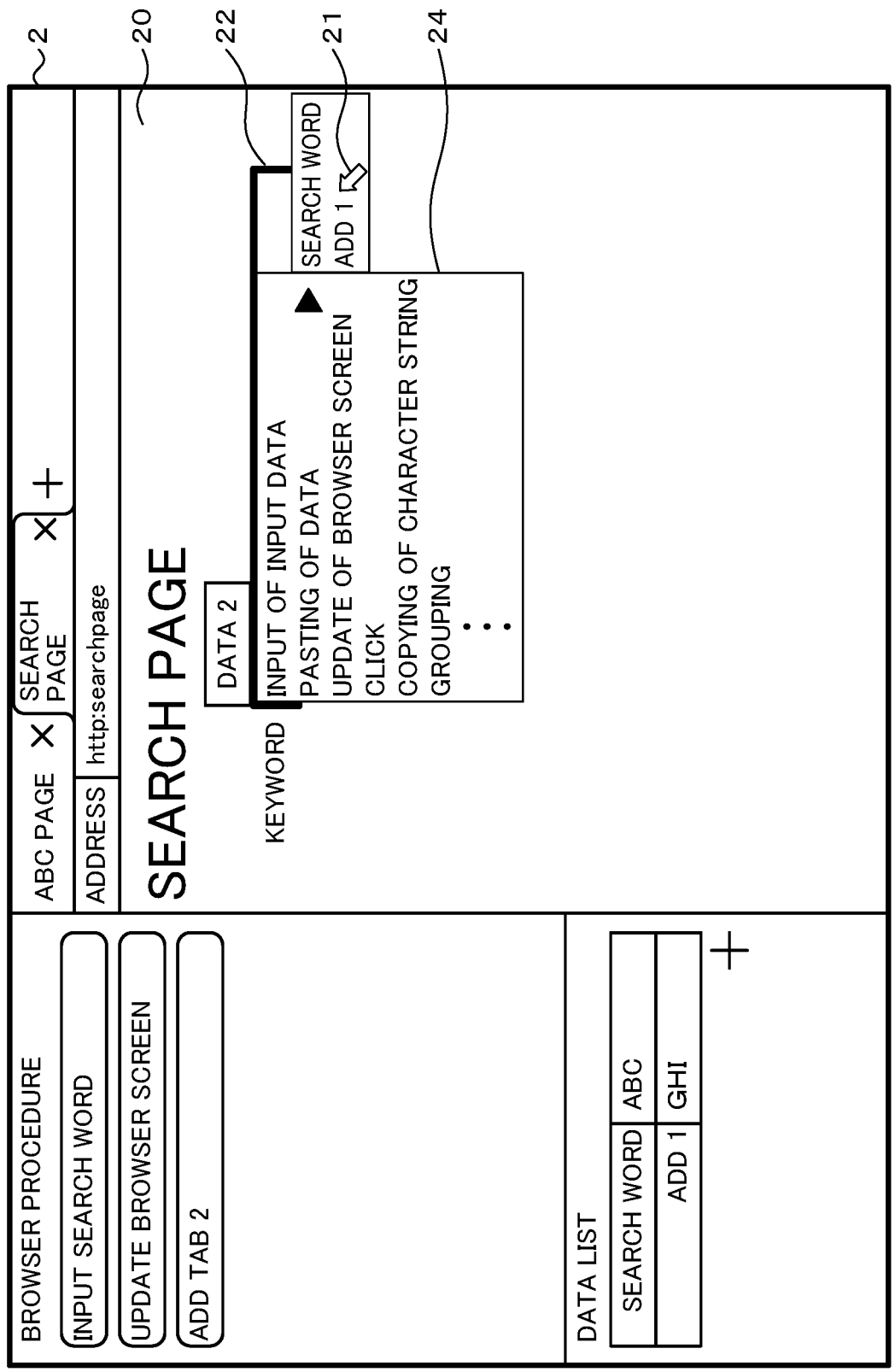
FIG. 26 is an explanatory diagram of the use of added input data.

FIG. 26 is an explanatory diagram of the use of added input data. When input data is added to the data list column, as one of the plurality of operations displayed in the operation menu 24 of the object 22 corresponding to the element 30 that is a box, the input of "PASTING OF DATA", that is, the input of the input data stored in the temporary storage unit 64, is included. The control unit 66 receives one selection among the plurality of operations displayed on the operation menu 24 from the user. When the user selects "PASTING OF DATA" with the pointer 21, the control unit 66 receives the selection of "PASTING OF DATA". When the selection of "PASTING OF DATA" is received, the control unit 66 instructs the display unit 60 to display the label name displayed in the data list. In FIG. 21, the display unit 60 displays "SEARCH WORD" and "ADD 1" as label names.

The user can select one of "SEARCH WORD" and "ADD 1" as the label name of the input data to be input to the object 22 by using the pointer 21. When the user selects "SEARCH WORD", the control unit 66 receives the input of the input data "ABC" corresponding to the label name "SEARCH WORD" and inputs the input data "ABC" in the object 22. When the user selects "ADD 1", the control unit 66 receives the input of the input data "GHI" corresponding to the label name "ADD 1" and inputs the input data "GHI" in the object 22.

As described above, the user completes the input of the input data displayed in the data list, that is, the input data stored in the temporary storage unit 64, by selecting "PASTING OF DATA". Therefore, it is possible to realize the recording of the browser procedure more easily.

The use of the input data of the data list will be described below with reference to a flowchart.

Figure 27:
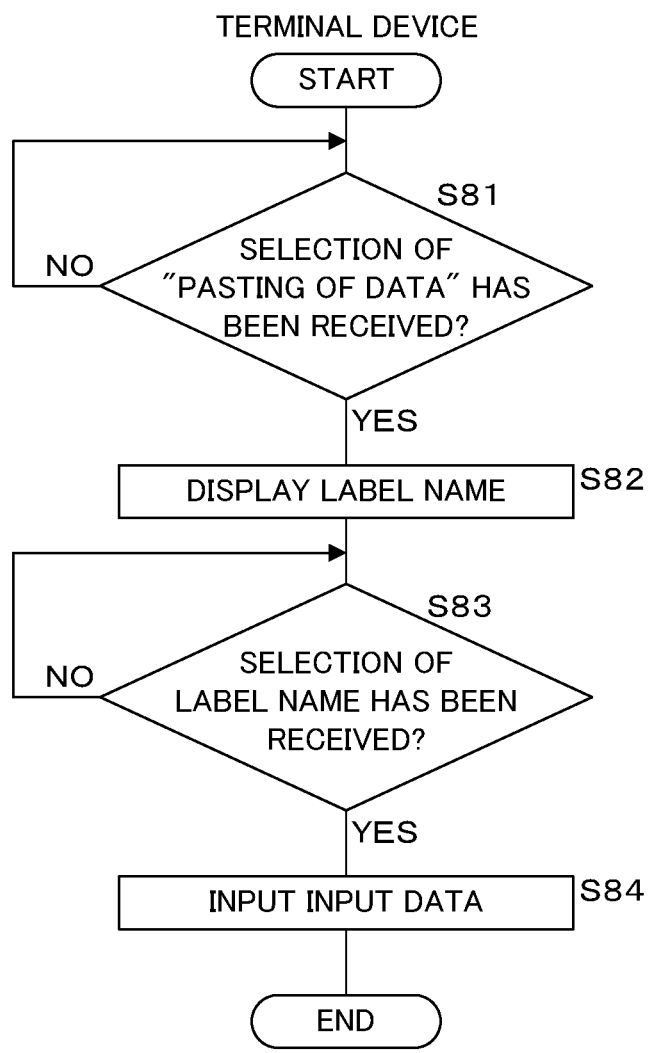
FIG. 27 is a flowchart showing the procedure of processing using input data of a data list.

FIG. 27 is a flowchart showing the procedure of processing using the input data of the data list. The control unit 66 of the terminal device 10 determines whether or not the selection of "PASTING OF DATA" has been received (step S81). When it is determined that the selection of "PASTING OF DATA" has not been received (S81: NO), the control unit 66 executes step S81 again, and waits until the selection of "PASTING OF DATA" is received. When it is determined that the selection of "PASTING OF DATA" is received (S81: YES), the control unit 66 instructs the display unit 60 to display the label name displayed in the data list (step S82).

Then, the control unit 66 determines whether or not the selection of the label name has been received (step S83). When it is determined that the selection of the label name has not been received (S83: NO), the control unit 66 executes step S83 again, and waits until the selection of the label name is received. When it is determined that the selection of the label name has been received (S83: YES), the control unit 66 inputs the input data corresponding to the selected label name in the object 22 (step S84). After executing step S84, the control unit 66 ends the processing of using the input data of the data list. After this processing ends, the control unit 66 executes step S81 again, and waits until the selection of "PASTING OF DATA" is received.

Figure 28:
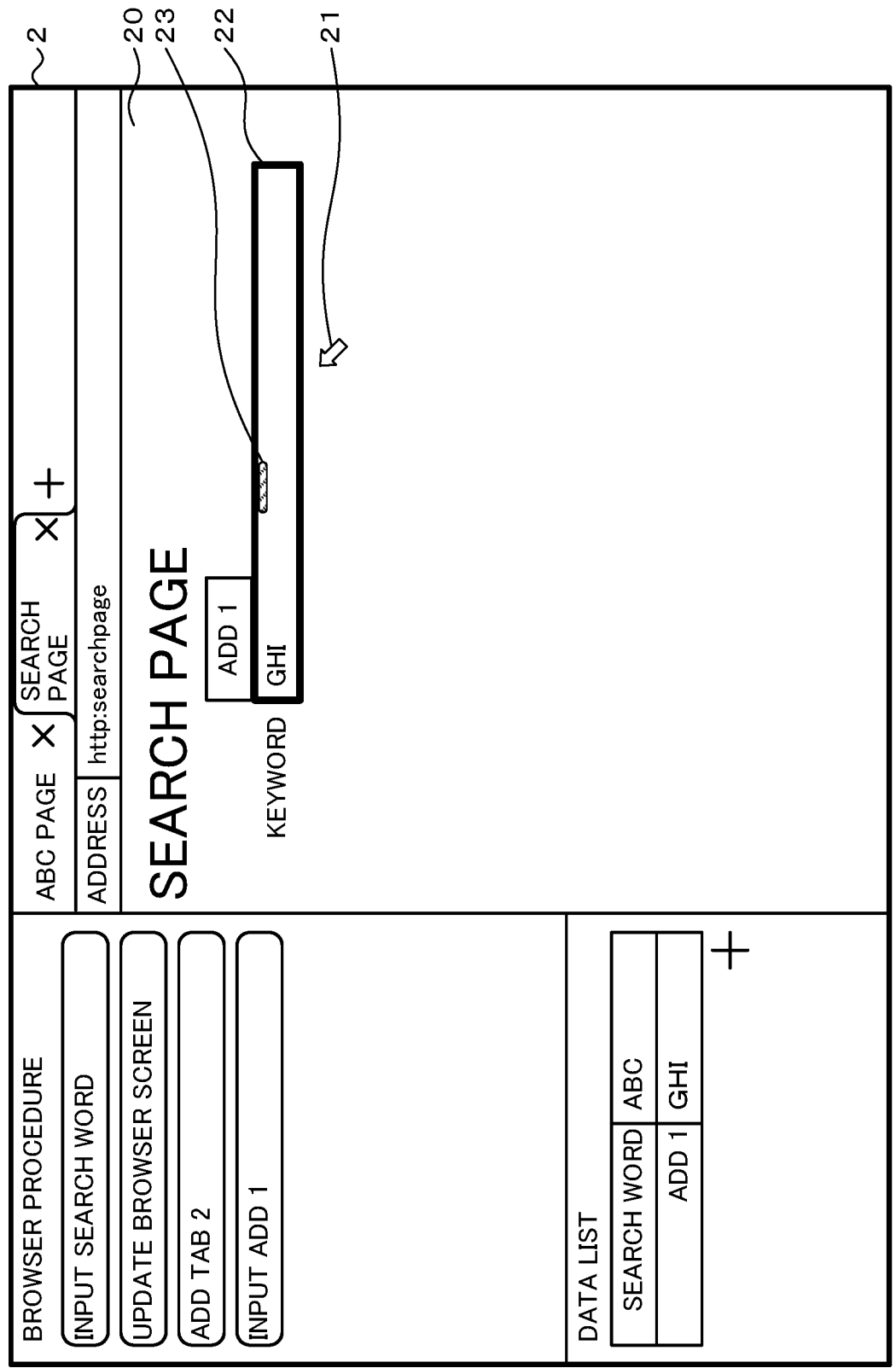
FIG. 28 is a schematic diagram of a terminal screen after input data of a data list is input.

FIG. 28 is a schematic diagram of the terminal screen 2 after the input data of the data list is input. The control unit 66 instructs the display unit 60 to add, to the browser procedure column, a procedure for inputting the input data "GHI" corresponding to the label name "ADD 1". In addition, the control unit 66 instructs the display unit 60 to change the label name of the object 22 from "DATA 2" to "ADD 1". In the browser procedure column, after the input data corresponding to the label name "ADD 1" is used, the user cannot change the input data corresponding to the label name "ADD 1" from "GHI" to other data.

The user can select the update of the browser screen 3 as an operation of the object 22 in which the input data "GHI" is input. When the selection for updating the browser screen 3 is received, the control unit 66 instructs the communication unit 63 to transmit, to the communication unit 40 of the access device 11, update information which indicates the data position of the object 22 and the input data "GHI". As described above, when the communication unit 40 receives the update information, the control unit 42 of the access device 11 performs the screen update processing. In the screen update processing, the input data "GHI" is input to the element 30 corresponding to the object 22 to which the input data "GHI" has been input, so that the browser screen 3 is updated. Therefore, the input data displayed in the data list column is data that is inputtable to the element 30 corresponding to the object 22. The input data input to the object 22 is data to be input to the element 30 corresponding to the object 22. The browser image 20 in which the updated browser screen 3 is shown is displayed on the terminal screen 2 of the terminal device 10.

It is noted that, when the input data "GHI" corresponding to the label name "ADD 1" is received, the control unit 66 may instruct the communication unit 63 to transmit the update information to the communication unit 40 of the access device 11 without inputting the input data "GHI" in the object 22. The update information which indicates the input data "GHI" and the data position of the object 22. In this case, the number of processings performed by the control unit 66 is reduced.

Figure 29:
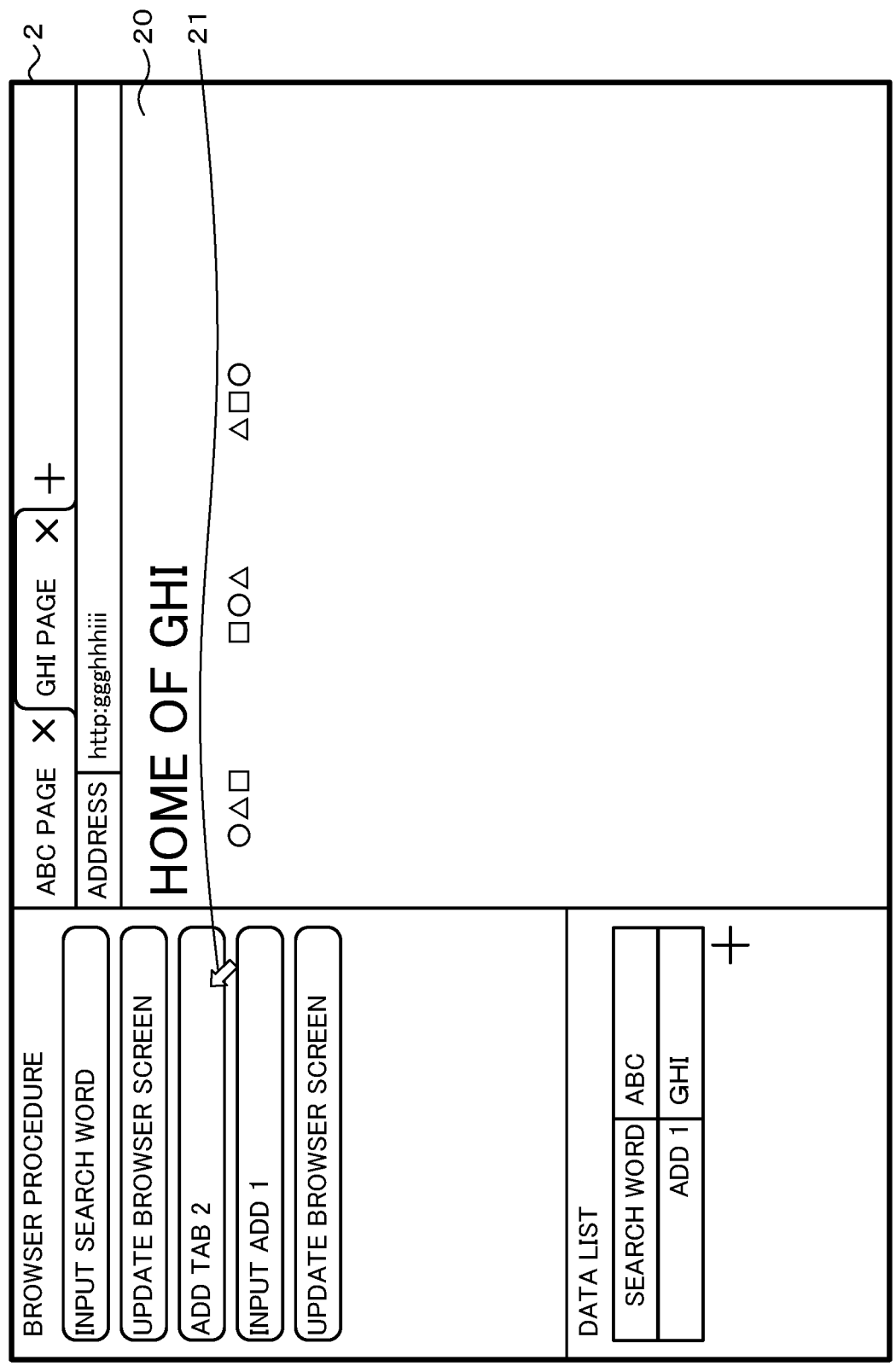
FIG. 29 is an explanatory diagram of redoing operations.

FIG. 29 is an explanatory diagram of redoing operations. When redoing recording from the past procedure, the user selects one of a plurality of procedures displayed in the browser procedure using the pointer 21. In FIG. 29, the user selects a procedure for adding tab 2. Thereby, the control unit 66 of the terminal device receives an instruction to redo recording. In this case, the control unit 66 instructs the control unit 42 of the access device 11 through the communication unit 63 to sequentially perform, on the browser screen 3, procedures from the first procedure to the selected procedure in the browser procedure.

Hereinafter, a method of adding input data to the data list by copying a character string in the browser image 20 will be described.

Figure 30:
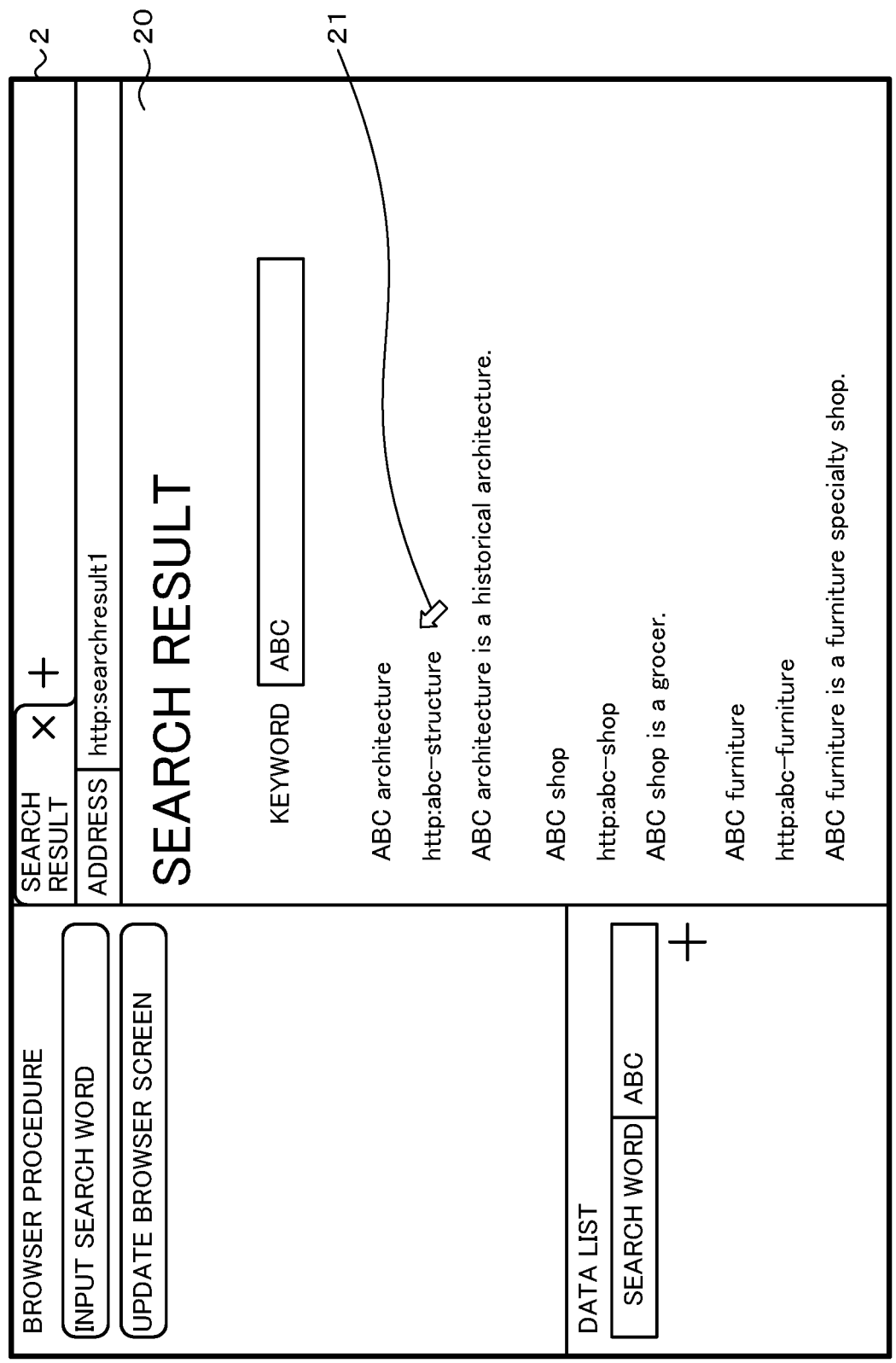
FIG. 30 is a schematic diagram of a terminal screen showing a search result.

FIG. 30 is a schematic diagram of the terminal screen 2 showing a search result. In this example, it is assumed that when the keyword "ABC" is entered on the search page, the search result is displayed instead of the ABC page. The browser image 20 in which the search result is shown is displayed on the terminal screen 2. In FIG. 30, three groups of information are displayed in the browser image 20. Each group of information includes a title, an address, and a description. In the top group, the title is "ABC architecture", the address is "http:abc-structure", and the description is "ABC architecture is a historical architecture". The title and the address are links. The description is a character string.

Figure 31:
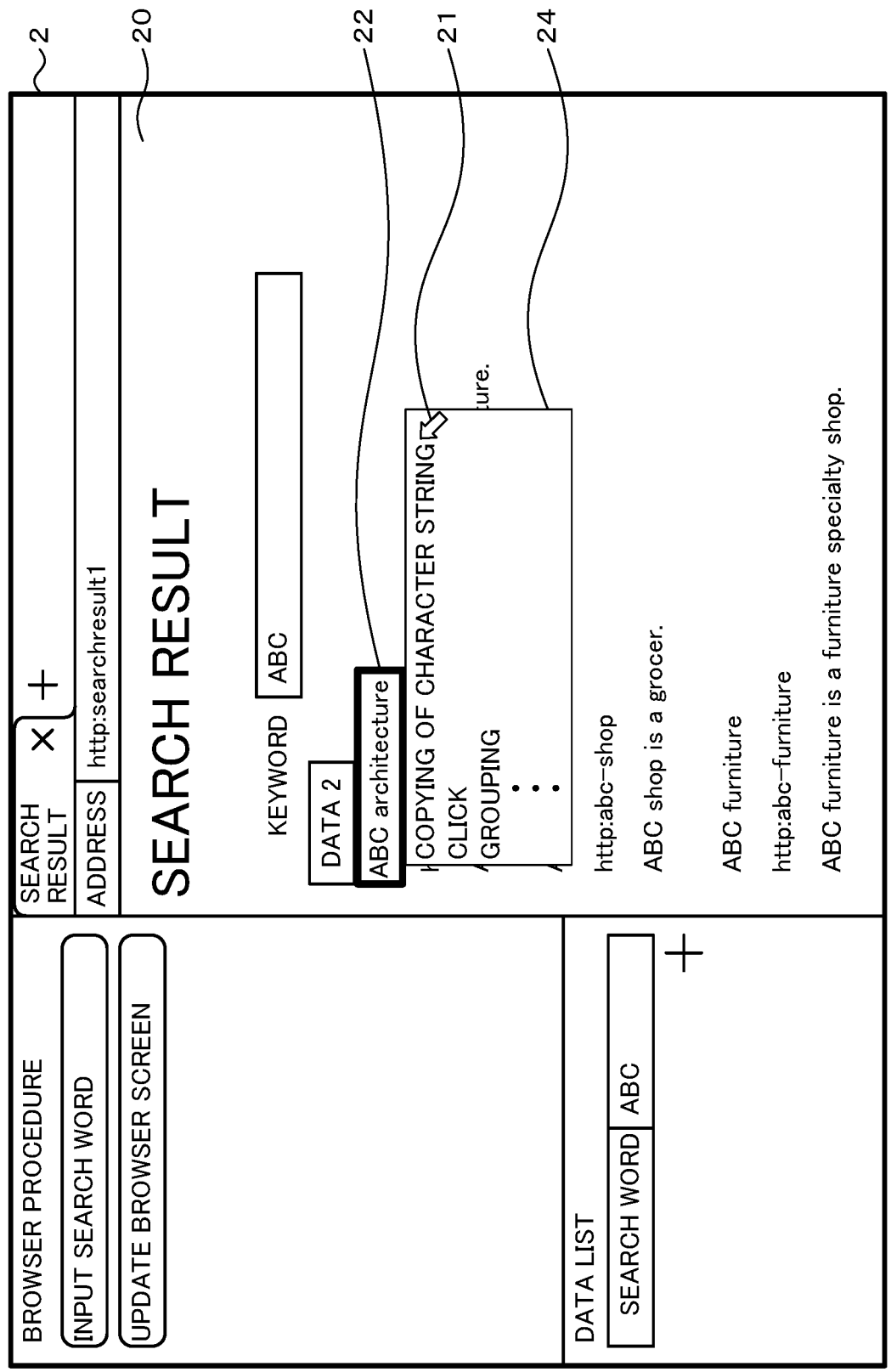
FIG. 31 is an explanatory diagram of copying a character string.

FIG. 31 is an explanatory diagram of copying a character string. As described above, when the user selects the element 30 shown in the browser image 20 using the pointer 21, the communication unit 63 of the terminal device 10 transmits the position information to the communication unit 40 of the access device 11. Then, the control unit 42 of the access device 11 performs analysis processing. The communication unit 63 of the access device 11 transmits the element information to the communication unit 40 of the terminal device 10. The display unit 60 of the terminal device 10 displays the object 22 in the browser image 20. The control unit 66 stores, in the temporary storage unit 64, the data position indicated by the element information received by the communication unit 63 so as to be associated with the object 22 displayed by the display unit 60. As described above, the object 22 is displayed in the browser image 20 based on the element information transmitted by the communication unit 63 of the access device 11. The object 22 indicates that the element 30 is selected.

The user can select "COPY CHARACTER STRING" in the operation menu 24 of the object 22 using the pointer 21. In this case, the control unit 66 of the terminal device 10 receives the selection of "COPY CHARACTER STRING". The control unit 66 instructs the communication unit 63 to transmit, to the communication unit 40 of the access device 11, extraction information which indicates the data position of the element 30 corresponding to the object 22. In the access device 11, the control unit 42 performs extraction processing when the communication unit 40 receives the extraction information. The control unit 42 specifies, on the browser screen 3, the element 30 which is located at the data position indicated by the extraction information received by the communication unit 40. The control unit 42 extracts a character string included in the specified element 30. The control unit 42 instructs the communication unit 40 to transmit character string information indicating the extracted character string to the communication unit 63 of the terminal device 10.

In the extraction processing, the character string extracted by the control unit 42 is a character string included in the object 22 in the browser image 20.

In the terminal device 10, when the communication unit 63 receives the character string information, the control unit 66 instructs the display unit 60 to add, to the data list column, the character string which is indicated by the character string information received by the communication unit 63. In addition, the control unit 66 stores, in the temporary storage unit 64, the character string indicated by the character string information received by the communication unit 63. Thereafter, the control unit 66 instructs the display unit 60 to add, to the browser procedure column, a procedure for copying the input data "ABC architecture" corresponding to the label name "DATA 2".

Figure 32:
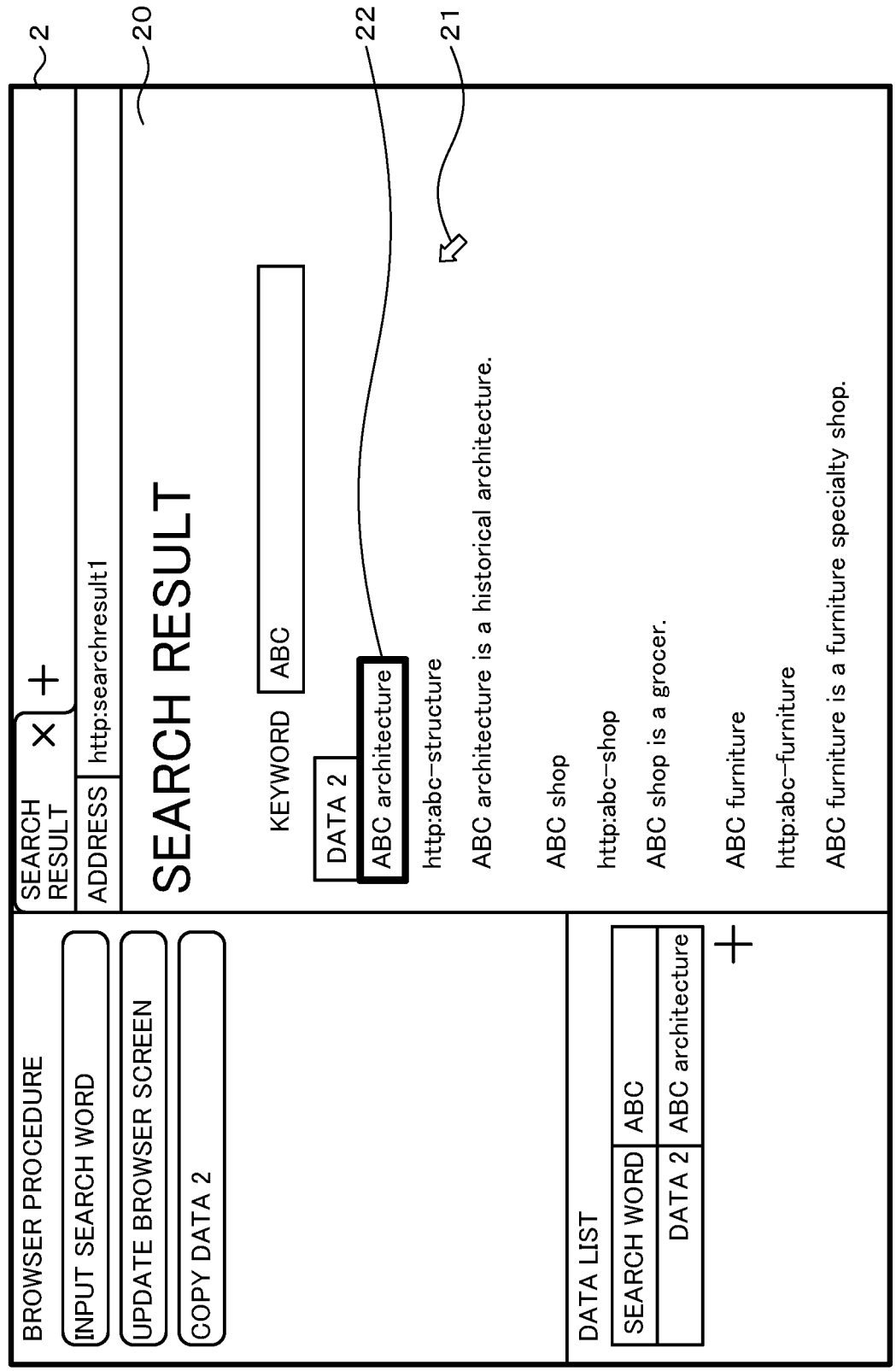
FIG. 32 is a schematic diagram of a terminal screen after a character string is copied.

FIG. 32 is a schematic diagram of the terminal screen 2 after the character string is copied. As shown in FIG. 32, the character string "ABC architecture" included in the object 22 is added to the data list column. In addition, a procedure for copying the input data "ABC architecture" corresponding to the label name "DATA 2" is added to the browser procedure column. The user can extract a character string for the other elements 30 shown in the browser image 20 by repeating the procedure for copying the character string. As a result, the control unit 66 of the terminal device 10 stores, in the temporary storage unit 64, a plurality of character strings which are included in the plurality of objects 22 in the browser image 20. In addition, the control unit 66 instructs the display unit 60 to display, in the data list column, the plurality of character strings stored in the temporary storage unit 64. The control unit 66 instructs the display unit 60 to add, to the browser procedure column, the procedure for copying a plurality of pieces of input data.

As described above, since the access device 11 performs the extraction of a character string, the amount of processing performed by the terminal device 10 for the recording of the browser procedure is small.

Copying a character string will be described below with reference to a flowchart.

Figure 33:
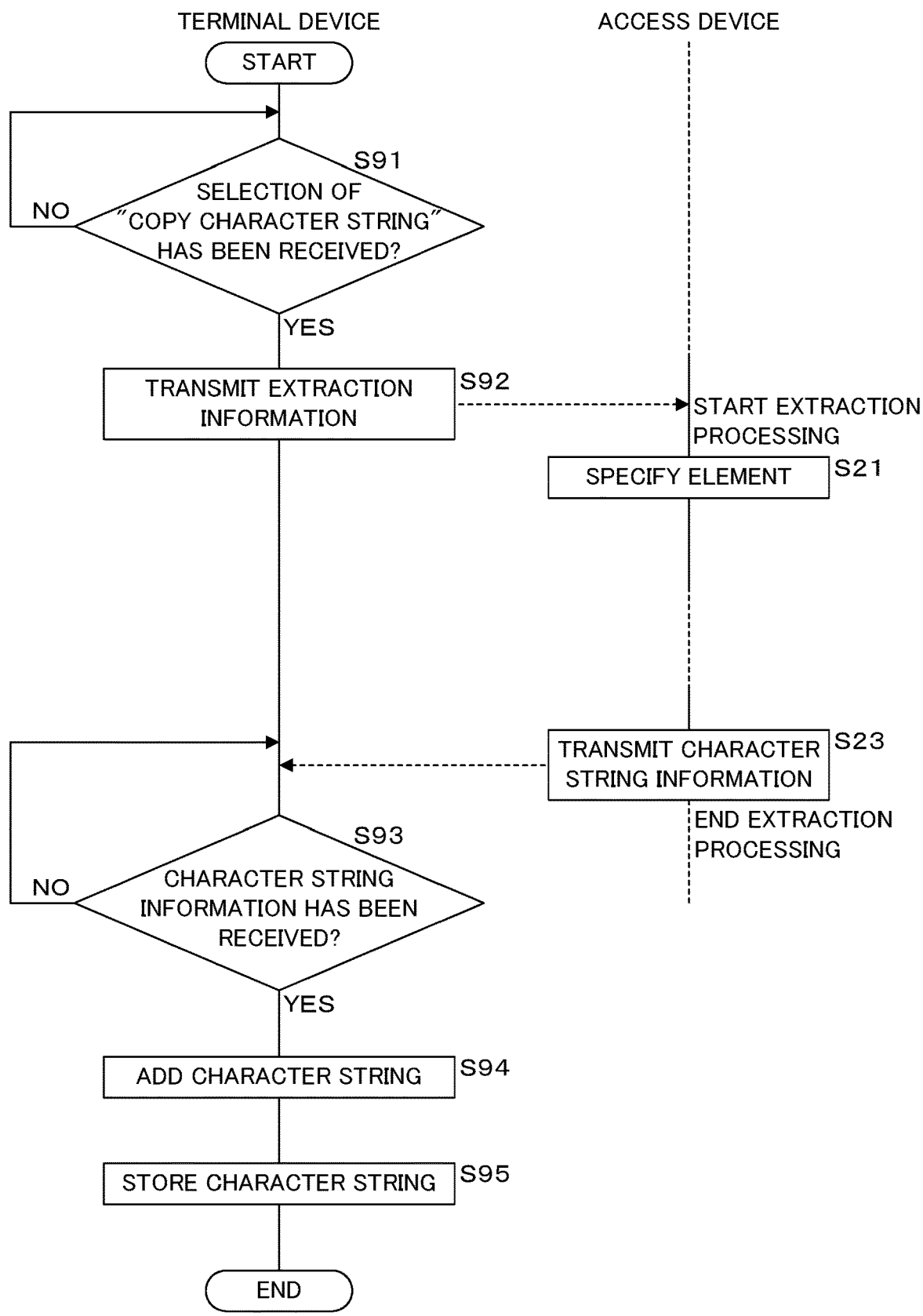
FIG. 33 is a flowchart showing the procedure of processing for copying a character string.

FIG. 33 is a flowchart showing the procedure of processing for copying a character string. The control unit 66 of the terminal device 10 determines whether or not the selection of "COPY CHARACTER STRING" has been received (step S91). When it is determined that the selection of "COPY CHARACTER STRING" has not been received (S91: NO), the control unit 66 executes step S91 again, and waits until the selection of "COPY CHARACTER STRING" is received. When it is determined that the selection of "COPY CHARACTER STRING" has been received (S91: YES), the control unit 66 instructs the communication unit 63 to transmit the extraction information to the communication unit 40 of the access device 11 (step S92).

In the access device 11, when the communication unit 40 receives the extraction information, the control unit 42 starts the extraction processing. In step S23 of the extraction processing, the control unit 42 instructs the communication unit 40 to transmit, to the communication unit 63 of the terminal device 10, character string information which indicates the character string included in the object 22 in the browser image 20. After executing step S23, the control unit 42 ends the extraction processing.

After executing step S92, the control unit 66 of the terminal device 10 determines whether or not the communication unit 63 has received the character string information (step S93). When it is determined that the communication unit 63 has not received the character string information (S93: NO), the control unit 66 executes step S93 again, and waits until the communication unit 63 receives the character string information. When it is determined that the communication unit 63 has received the character string information (S93: YES), the control unit 66 instructs the display unit 60 to add, to the data list, the character string (input data), which is indicated by the character string information received by the communication unit 63 (step S94). Then, the control unit 66 stores, in the temporary storage unit 64, the character string indicated by the character string information received by the communication unit 63 (step S95). After executing step S95, the control unit 66 ends the processing of copying the character string. After this processing ends, the control unit 66 executes step S91 again, and waits until the selection of "COPY CHARACTER STRING" is received.

Figure 34:
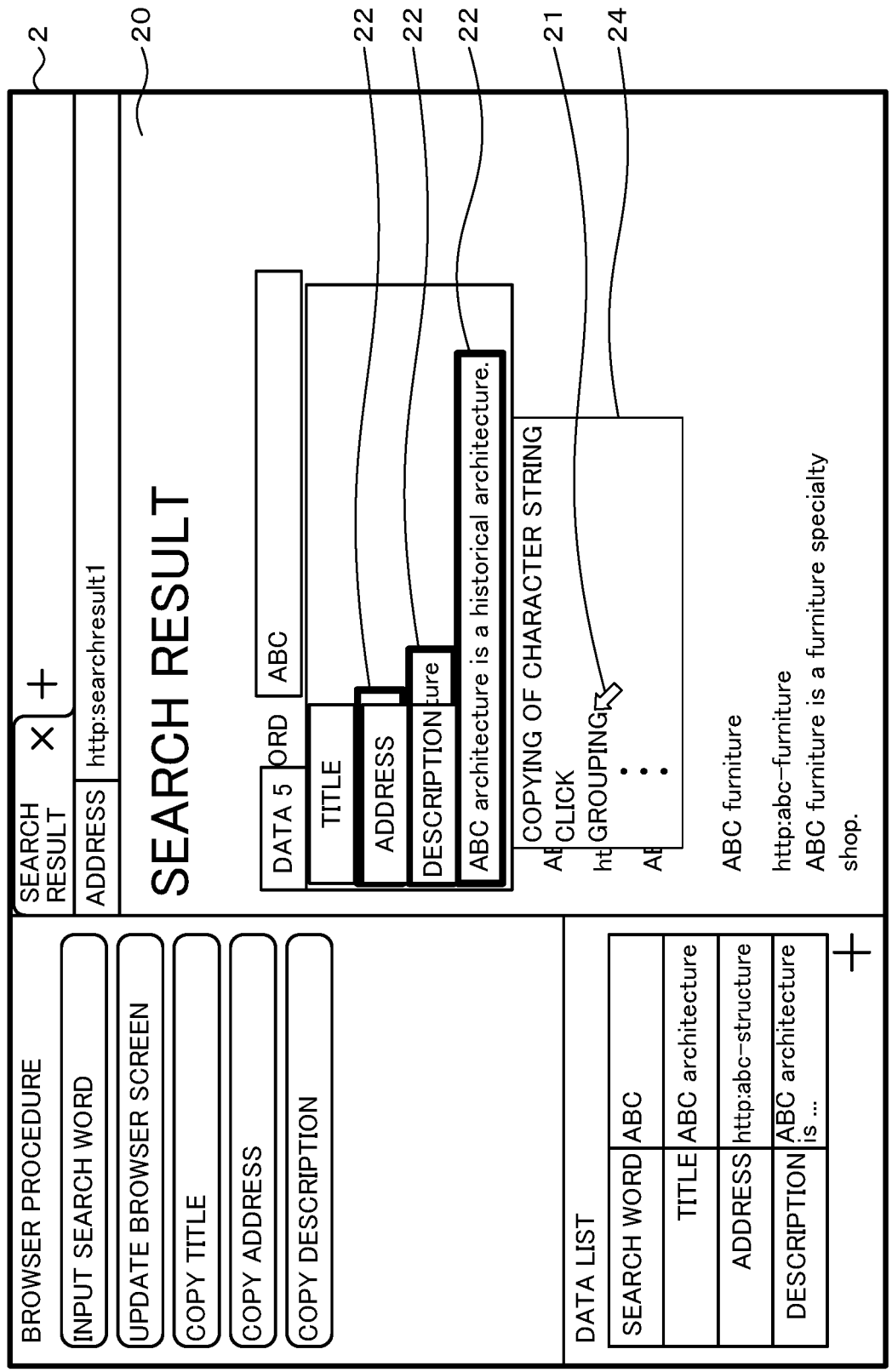
FIG. 34 is a schematic diagram of a terminal screen after a plurality of character strings are extracted.

FIG. 34 is a schematic diagram of the terminal screen 2 after a plurality of character strings are extracted. As shown in FIG. 34, three pieces of input data corresponding to the label names "TITLE", "ADDRESS", and "DESCRIPTION" are copied. Three pieces of input data are added to the data list and stored in the temporary storage unit 64. As described above, the user can appropriately change the label name. The user can select a region including the three objects 22 corresponding to the label names "TITLE", "ADDRESS", and "DESCRIPTION" using the pointer 21. In addition, the user can display the operation menu 24 by operating the pointer operation unit 61. The control unit 66 of the terminal device 10 receives an instruction to display the operation menu 24, and instructs the display unit 60 to display the operation menu 24. As one operation displayed on the operation menu 24, there is "GROUPING". The user can select "GROUPING" using the pointer 21.

Thereby, the control unit 66 of the terminal device 10 receives the grouping instruction, and groups the input data corresponding to the label names "TITLE", "ADDRESS", and "DESCRIPTION", that is, three character strings stored in the temporary storage unit 64. By the grouping, the processing can be performed in units of groups. Therefore, since the number of operations performed by the user is small, more efficient recording of the browser procedure is realized.

It is noted that the number of objects 22 to be grouped is not limited to 3, and may be 2 or 4 or more.

Figure 35:
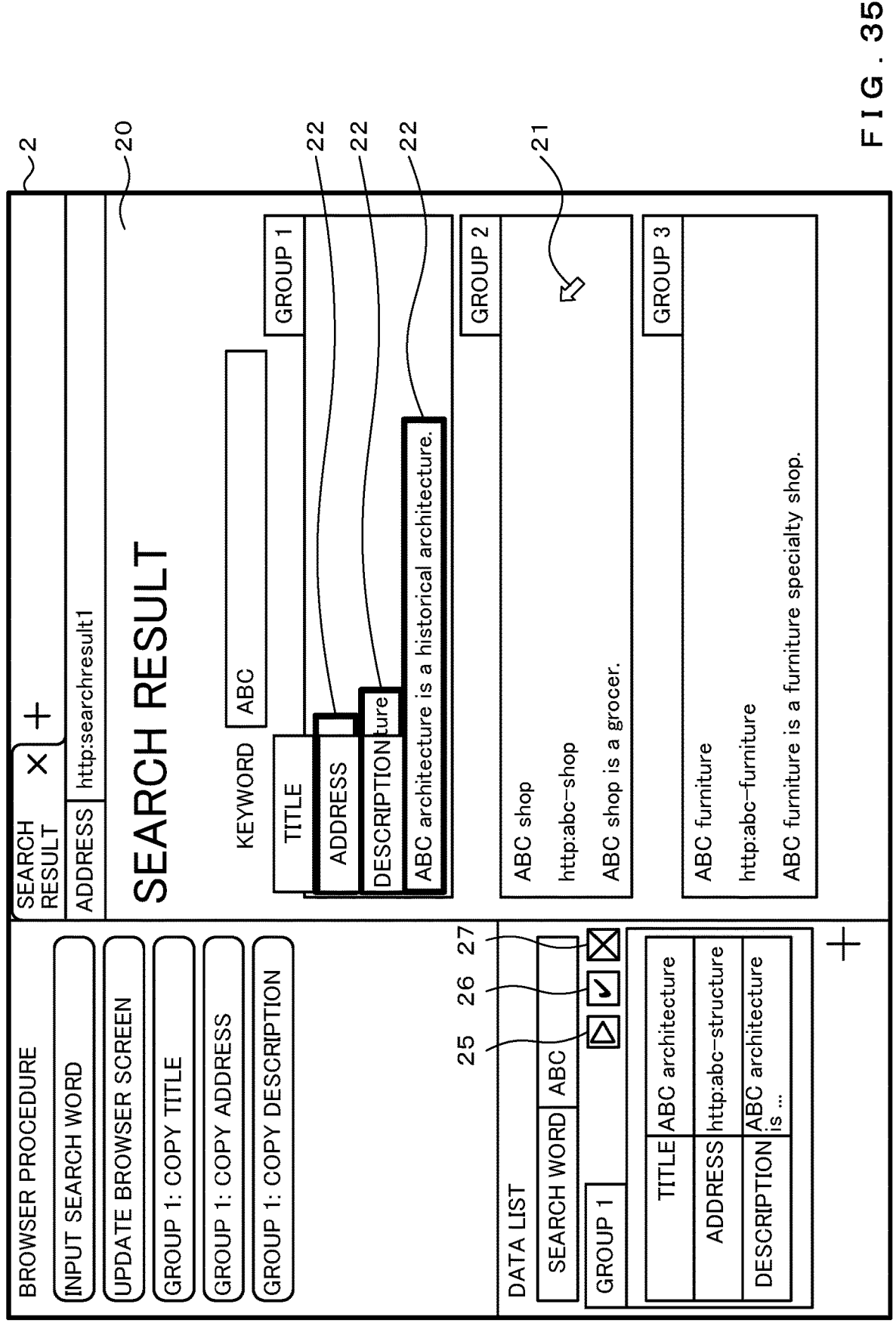
FIG. 35 is a schematic diagram of a terminal screen after a plurality of character strings are grouped.

FIG. 35 is a schematic diagram of the terminal screen 2 after a plurality of character strings are grouped. The control unit 66 of the terminal device 10 instructs the display unit 60 to display the group name "GROUP 1" for the three procedures for copying the three pieces of input data corresponding to the label names "TITLE", "ADDRESS", and "DESCRIPTION". In addition, the control unit 66 instructs the display unit 60 to display, in the data list, a plurality of character strings which are grouped, that is, three pieces of input data corresponding to the label names "TITLE", "ADDRESS", and "DESCRIPTION". Therefore, the user can easily check the plurality of character strings belonging to GROUP 1.

Figure 36:
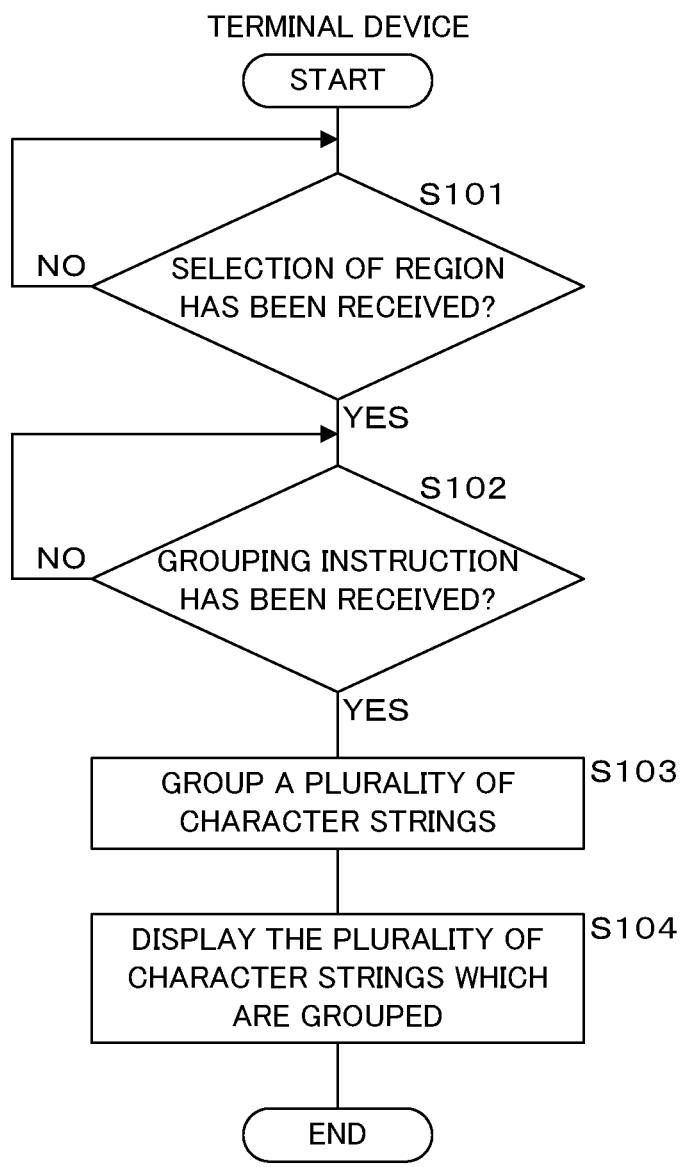
FIG. 36 is a flowchart showing the procedure of processing for grouping a plurality of character strings.

The grouping of a plurality of character strings will be described below with reference to a flowchart. FIG. 36 is a flowchart showing the procedure of processing for grouping a plurality of character strings. The control unit 66 of the terminal device 10 determines whether or not a region including a plurality of objects 22 has been selected by the user dragging, for example (step S101). When it is determined that the region has not been selected (S101: NO), the control unit 66 executes step S101 again, and waits until the region including the plurality of objects 22 is selected.

When it is determined that the region including the plurality of objects 22 has been selected (S101: YES), the control unit 66 determines whether or not a grouping instruction has been received (step S102). When it is determined that the grouping instruction has not been received (S102: NO), the control unit 66 executes step S102 again, and waits until the grouping instruction is received. When it is determined that the grouping instruction is received (S102: YES), the control unit 66 groups a plurality of character strings which are stored in the temporary storage unit 64 and which are correspond to the plurality of objects 22 included in the selected region (step S103). Then, the control unit 66 instructs the display unit 60 to display, in the data list, the plurality of character strings which are grouped (step S104). After executing step S104, the control unit 66 ends the processing of grouping a plurality of character strings. After this processing ends, the control unit 66 executes step S101 again, and waits until a region including the plurality of objects 22 is selected.

On the terminal screen 2 shown in FIG. 35, an execute button 25, an end button 26 and a cancel button 27 are displayed on the right side of the group name. The execute button 25 is used for receiving the execution of group processing in which input data in the group is used. The end button 26 is used for receiving the end of group processing. The cancel button 27 is used for receiving the cancellation of grouping.

The user can select one or more ranges, which are different from the group range corresponding to the group name "GROUP 1", in the browser image 20 by operating the pointer operation unit 61. In this case, the control unit 66 receives the selection of the range in the browser image 20. In FIG. 35, the control unit 66 receives the selection of the group ranges of the group names "GROUP 2" and "GROUP 3". The control unit 66 stores the two group ranges corresponding to the label names "GROUP 2" and "GROUP 3" in the temporary storage unit 64. The user can select the execute button using the pointer 21. In this case, the control unit 66 starts the execution of group processing using at least one of a plurality of pieces of input data belonging to the group name "GROUP 1". The group processing is one of the processings performed during the procedure recording processing.

Figure 37:
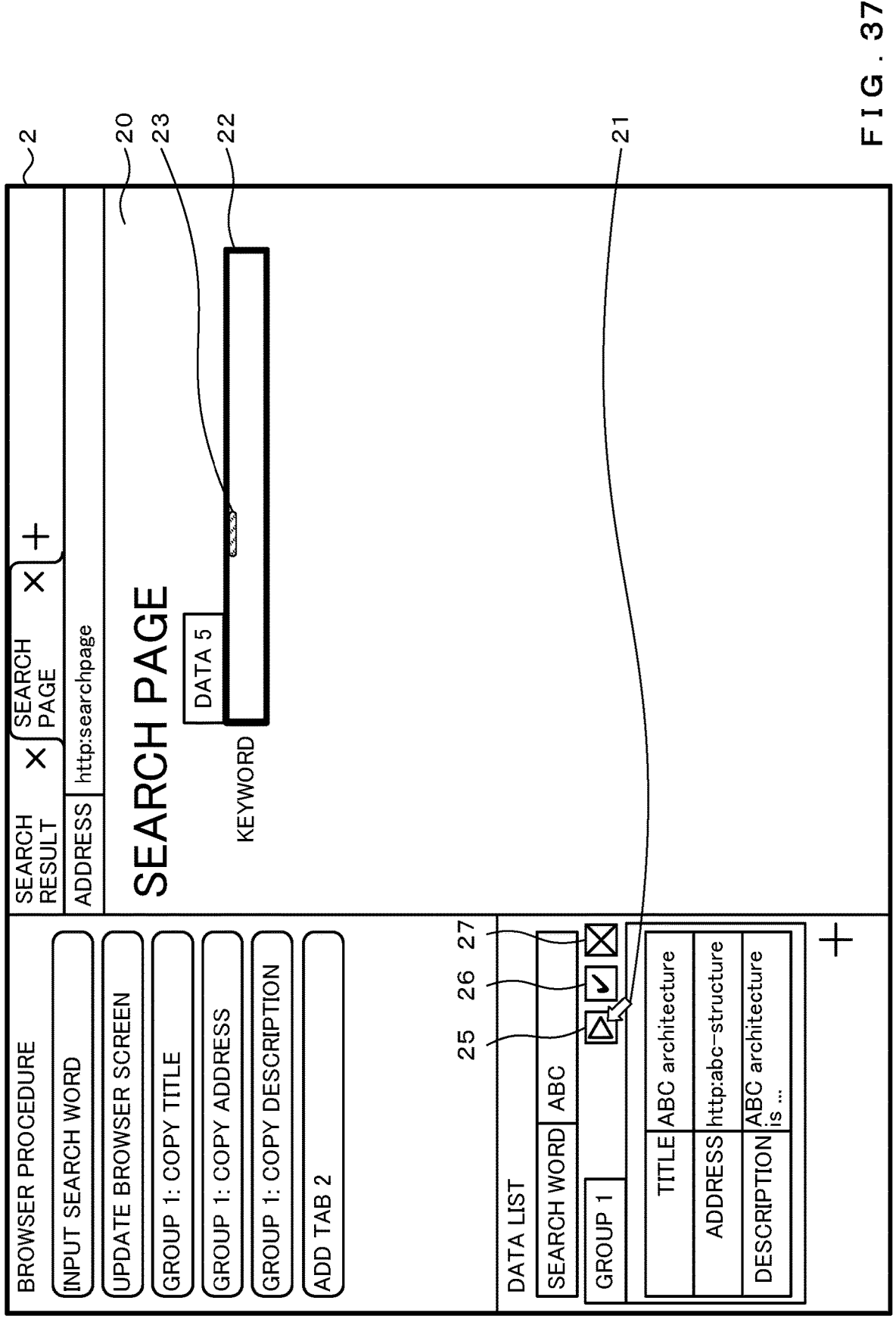
FIG. 37 is an explanatory diagram of the start of group processing.

FIG. 37 is an explanatory diagram of the start of group processing. When starting the group processing, the user selects the execute button 25 using the pointer 21. Thereby, the control unit 66 of the terminal device 10 receives the execution of the group processing. In the example of FIG. 37, the control unit 66 performs the group processing in a state in which the browser image 20 showing a search page that allows the search is displayed.

Figure 38:
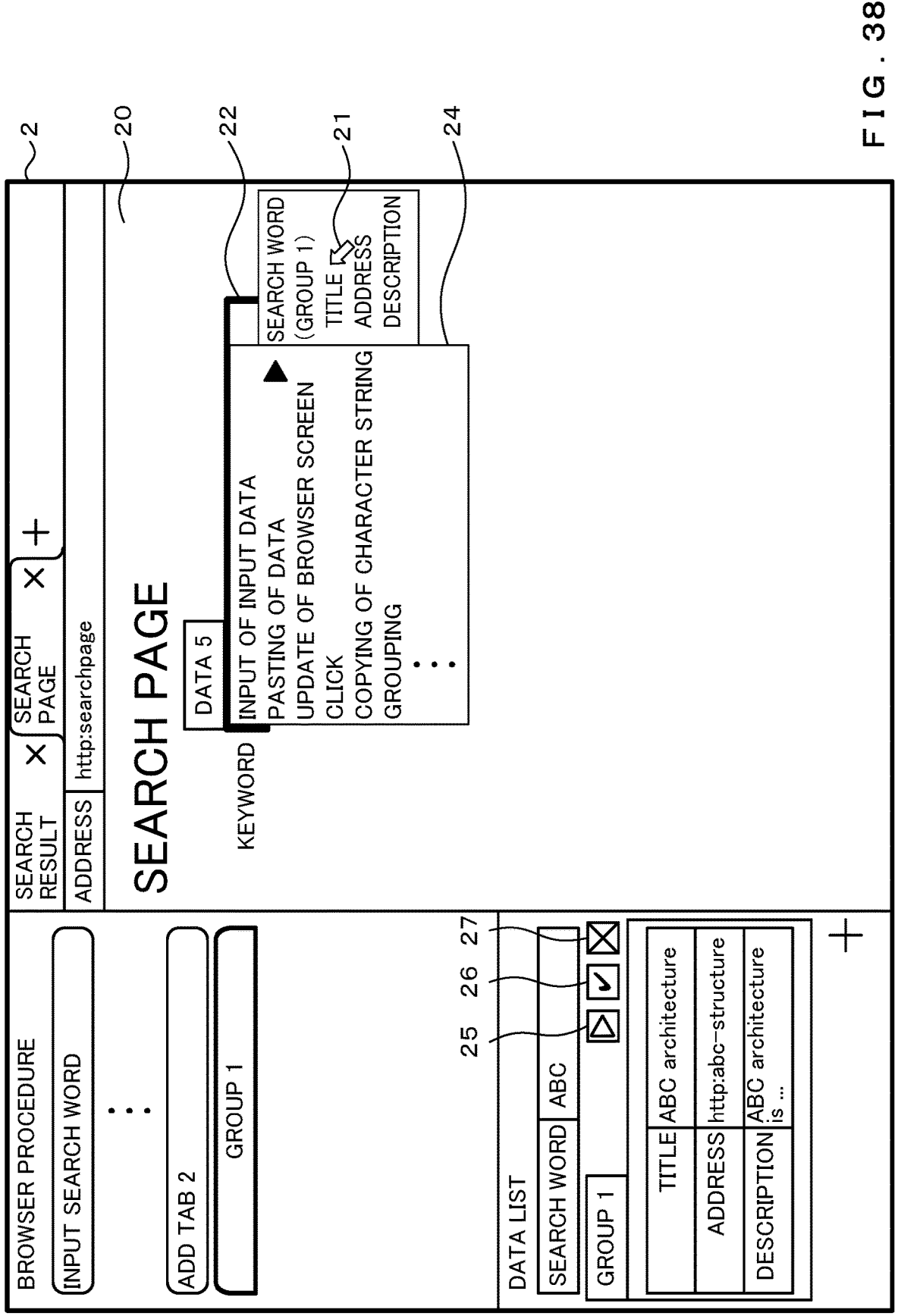
FIG. 38 is an explanatory diagram of operations using a character string.

FIG. 38 is an explanatory diagram of operations using a character string. When the execution of the group processing starts, the control unit 66 instructs the display unit 60 to display a start mark indicating the start of the group processing in the browser procedure column. "GROUP 1" is described in the start mark.

As described above, when the user selects the element 30 shown in the browser image 20 using the pointer 21, the control unit 42 of the access device 11 performs analysis processing and displays the object 22. When the user selects the menu button 23 provided in the object 22 using the pointer 21, the control unit 66 of the terminal device 10 instructs the display unit 60 to display the operation menu 24. When the user selects "PASTING OF DATA" in the operation menu 24, the control unit 66 instructs the display unit 60 to display the label name displayed in the data list.

Here, the user selects a label name belonging to the group name "GROUP 1", for example, "TITLE". Thereby, the control unit 66 instructs the display unit 60 to input, in the object 22, the input data "ABC architecture" of the selected label name "TITLE". Thereafter, the control unit 66 instructs the display unit 60 to add, to the browser procedure column, the procedure for inputting the input data "ABC architecture" corresponding to the label name "TITLE".

As described above, the user can select the update of the browser screen 3 in a state in which the input data is input in the object 22. In this case, the communication unit 63 of the terminal device 10 transmits the update information to the communication unit 40 of the access device 11. The control unit 42 of the access device 11 performs processing for updating the browser screen 3. The control unit 42 inputs the input data, which has been input to the object 22, to the element 30 corresponding to the object 22, so that the browser screen 3 is updated. Thereafter, the communication unit 40 transmits, to the communication unit 63 of the terminal device 10, the browser image data of the browser image 20, in which the updated browser screen 3 is shown. The browser image 20 displayed on the terminal screen 2 of the terminal device 10 is updated.

Figure 39:
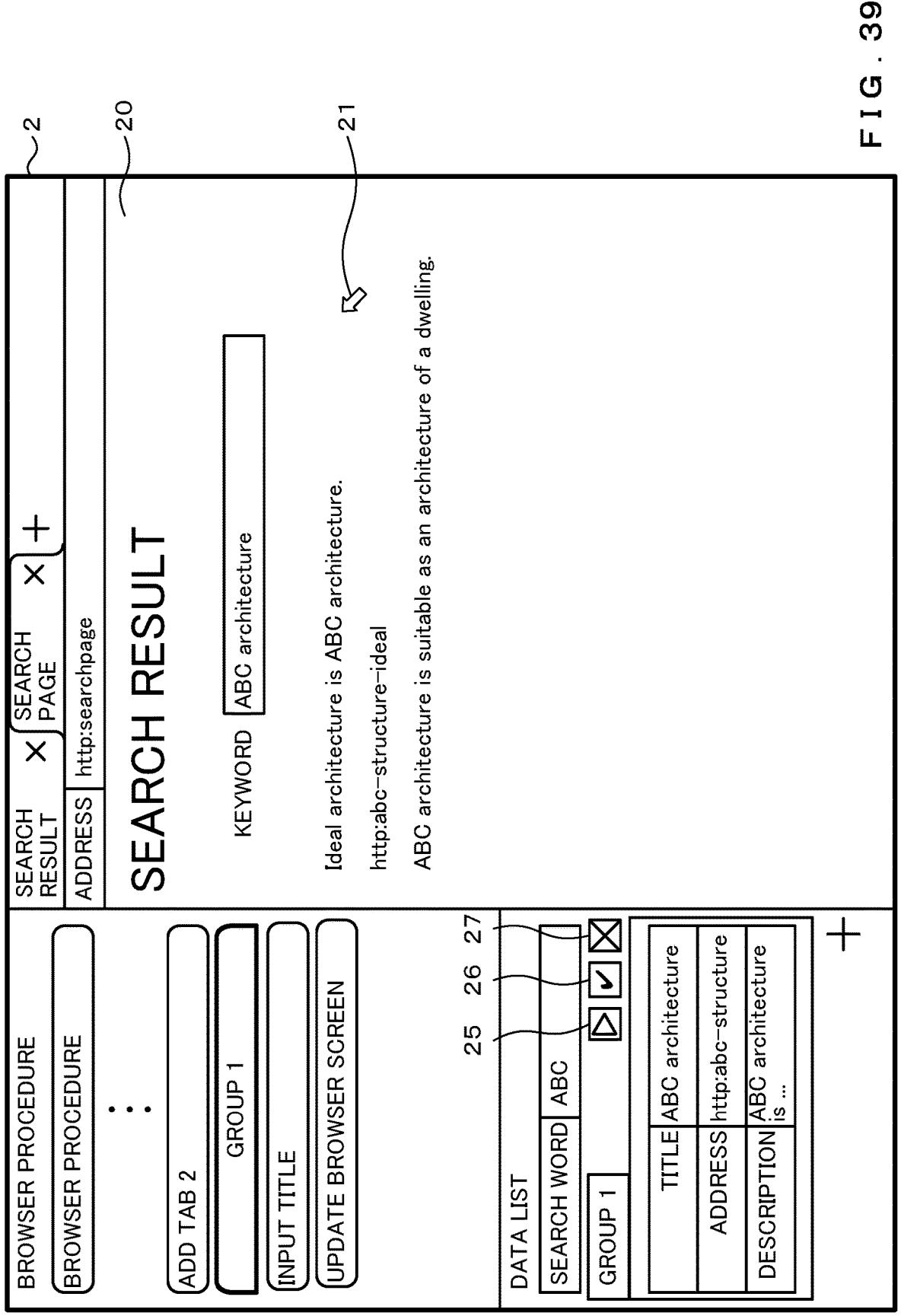
FIG. 39 is a schematic diagram of a terminal screen after a browser image is updated.

FIG. 39 is a schematic diagram of the terminal screen 2 after the browser image 20 is updated. As shown in FIG. 39, in the browser image 20 displayed on the terminal screen 2, a web page showing the search result is displayed. Here, the user can copy a character string shown in the browser image 20 and add the copied character string to the data list, as described above. In this case, as described above, transmission of position information, analysis processing, display of the object 22, transmission of extraction information, extraction processing, and transmission of character string information are performed. As a result, a character string "Ideal architecture is ABC architecture" is extracted and added to the data list column. Here, since the processing of extracting the character string is performed during the group processing, the character string belongs to GROUP 1.

It is noted that a search page on which the keyword "ABC" is entered may be different from a search page on which the keyword "ABC architecture" is entered.

Figure 40:
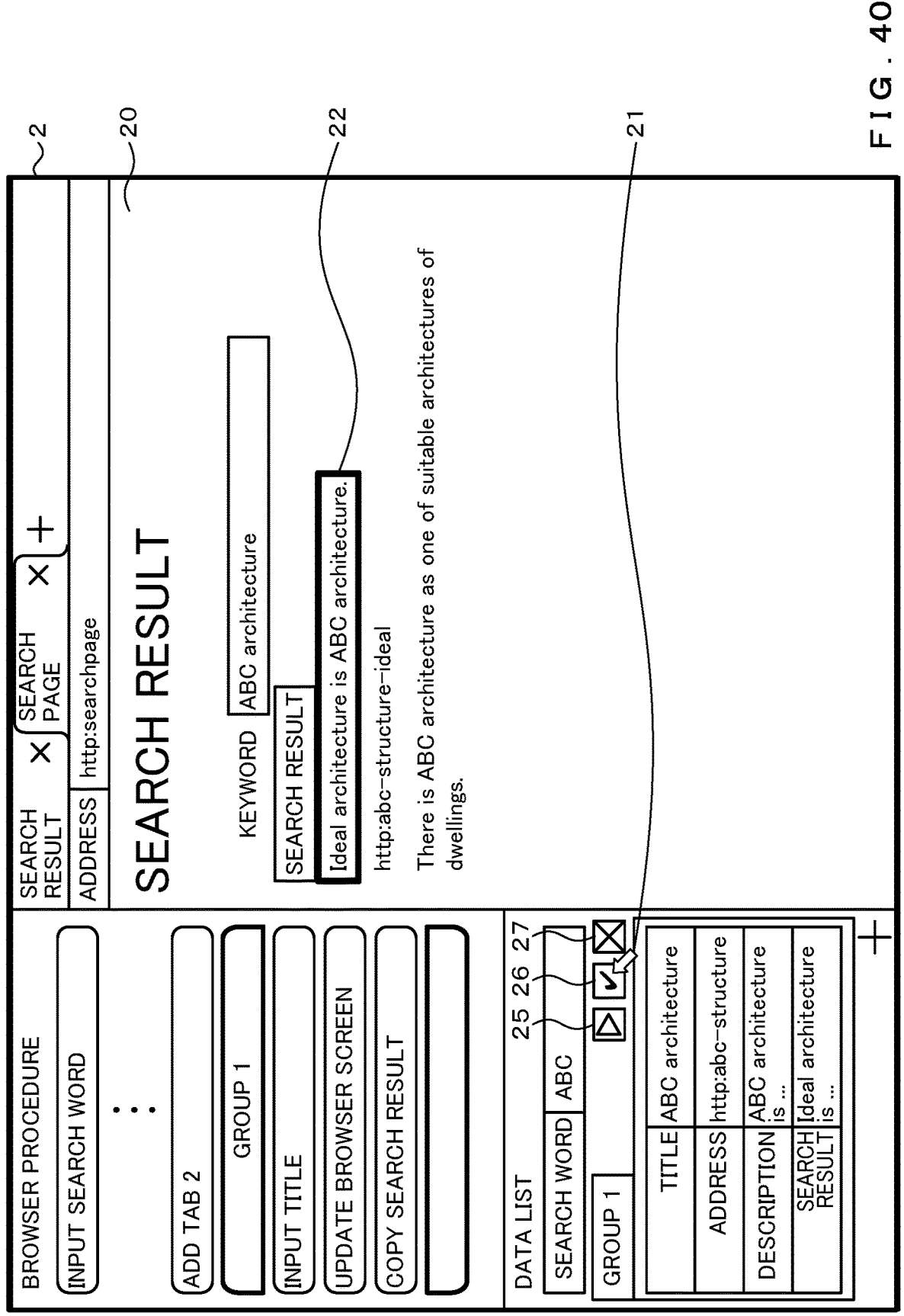
FIG. 40 is an explanatory diagram of the end of group processing.

FIG. 40 is an explanatory diagram of the end of the group processing. As shown in FIG. 40, the control unit 66 of the terminal device 10 stores the input data "Ideal architecture is ABC architecture" corresponding to the label name "SEARCH RESULT", and adds the input data to GROUP 1.

As described above, the control unit 42 receives an operation using at least one of the plurality of character strings belonging to GROUP 1. In this operation, input data corresponding to the label name "TITLE" is input in the object 22 and the update of the browser screen is instructed. The control unit 42 receives the selection of the object 22 on the browser image 20 corresponding to the browser screen 3 after executing the received operation. The control unit 42 stores, in the temporary storage unit 64, the character string "Ideal architecture is ABC architecture" which is included in the selected object 22. The control unit 42 adds the stored character string "Ideal architecture is ABC architecture" to GROUP 1. The character string "Ideal architecture is ABC architecture" corresponds to a second character string.

The user can select the end button 26 using the pointer 21. In this case, the control unit 66 of the terminal device 10 receives an instruction to end the group processing. When the control unit 66 receives the instruction to end the group processing, the control unit 66 instructs the display unit 60 to add, to the browser procedure column, an end mark indicating the end of the group processing. Then, the control unit 66 stores, in the temporary storage unit 64, a series of processings, which are performed by using at least one of the plurality of character strings belonging to GROUP 1. The control unit 66 ends the group processing.

It is noted that the number of character strings used in the group processing among the plurality of character strings belonging to GROUP 1 is not limited to one, and may be two or more.

After ending the group processing, the control unit 66 performs processings common to the series of processings stored in the group processing on a plurality of character strings included in the group range of the group name "GROUP 2" in FIG. 35. In addition, the control unit 66 performs processings common to the series of processings stored in the group processing on a plurality of character strings included in the group range of the group name "GROUP 3". Therefore, since the number of operations performed by the user to record the browser procedure is small, more efficient recording of the browser procedure is realized.

The group processing will be described below with reference to a flowchart.

Figure 41:
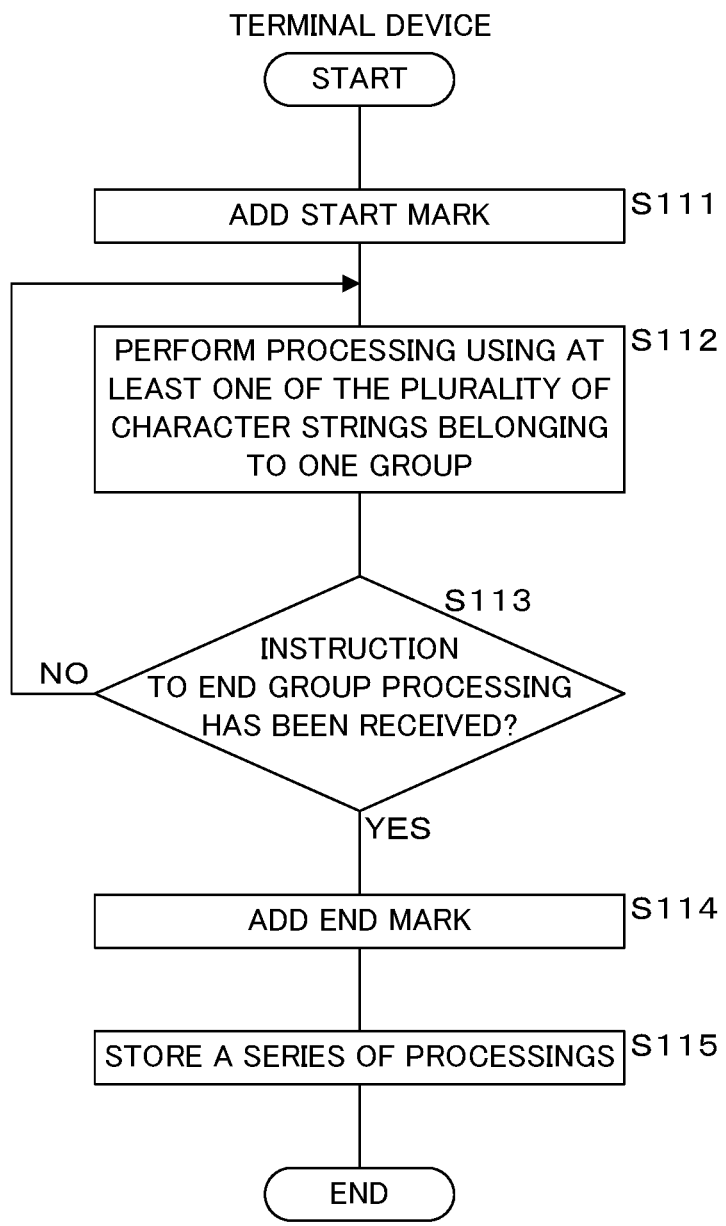
FIG. 41 is a flowchart showing the procedure of group processing.

FIG. 41 is a flowchart showing the procedure of group processing. The control unit 66 of the terminal device 10 performs the group processing when the execute button 25 is selected using the pointer 21. In the group processing, the control unit 66 instructs the display unit 60 to add a start mark to the browser procedure column (step S111). Then, the control unit 66 performs processing using at least one of the plurality of character strings belonging to one group, that is, GROUP 1, according to the operation performed by the user (step S112). Then, the control unit 66 determines whether or not an instruction to end the group processing has been received (step S113). When it is determined that the instruction to end the group processing has not been received (S113: NO), the control unit 66 executes step S112. The control unit 66 continues to perform the processing using at least one of the plurality of character strings belonging to GROUP 1 until the instruction to end the group processing is received.

When it is determined that the instruction to end the group processing has been received (S113: YES), the control unit 66 instructs the display unit 60 to add an end mark to the browser procedure column (step S114). Then, the control unit 66 stores, in the temporary storage unit 64, a series of processings which are performed by using at least one of the plurality of character strings belonging to GROUP 1 (step S115), and ends the group processing.

Execution of a second group processing will be described below with reference to a flowchart. In the second group processing, processings common to a series of processings performed on a plurality of character strings belonging to one group is performed on a plurality of character strings belonging to other groups.

Figure 42:
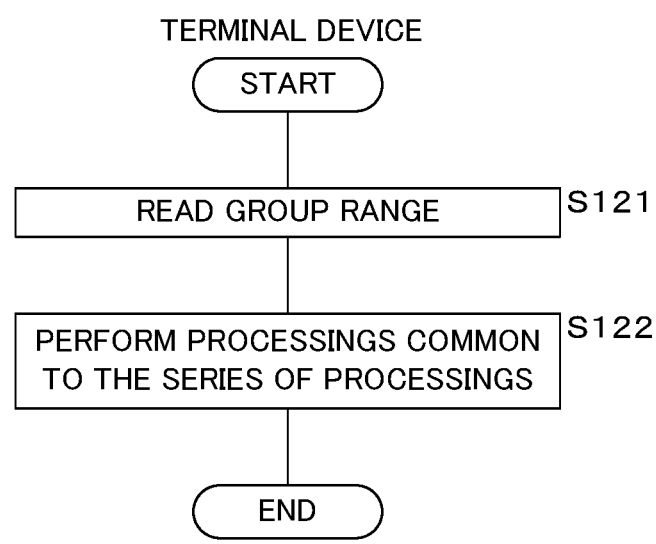
FIG. 42 is a flowchart showing the procedure of second group processing.

FIG. 42 is a flowchart showing the procedure of the second group processing. The control unit 66 performs the second group processing after performing the group processing. In the second group processing, the control unit 66 reads one or more group ranges from the temporary storage unit 64 (step S121). Then, the control unit 66 performs processings common to the series of processings stored in step S115 of the group processing on a plurality of character strings belonging to one or more groups corresponding to the one or more group ranges read in step S121 (step S122). The control unit 66 ends the second group processing after executing step S122.

The types of the plurality of character strings included in each of GROUPS 2 and 3 need to match the types of the plurality of character strings belonging to GROUP 1. That is, the plurality of character strings included in each of GROUPS 2 and 3 also need to be three character strings indicating the title, address, and description.

The control unit 66 adds, to the browser procedure column, a procedure which is obtained by performing the processing for each of GROUPS 2 and 3.

It is noted that the user can select the cancel button 27 using the pointer 21. In this case, the control unit 66 receives an instruction to cancel the grouping, cancels the grouping performed in the temporary storage unit 64, and instructs the display unit 60 to delete the enclosure of GROUP 1. Therefore, each of the plurality of character strings belonging to GROUP 1 is treated as a character string not belonging to the group.

The user gives an instruction to end the procedure recording processing by operating the pointer operation unit 61 or the input operation unit 62. Thereby, the control unit 66 receives an instruction to end the procedure recording processing from the user. When the control unit 66 receives an instruction to end the procedure recording processing, the control unit 66 generates browser procedure data indicating the browser procedure, and ends the procedure recording processing. As described above, after performing the procedure recording processing, the control unit 66 instructs the communication unit 63 to transmit, to the management device 13, the browser procedure data generated in the procedure recording processing. The management device 13 stores the browser procedure data received from the communication unit 63 in the database device 14.

The browser procedure data includes information indicating the data position of one or more elements 30 corresponding to the selected one or more objects 22 in the browser procedure. Therefore, when the processing is automatically performed based on the browser procedure data, the appropriate element 30 is selected without error.

It is noted that the object 22 only needs to indicate that the element 30 is selected. Therefore, the object 22 is not limited to the mark surrounding the element 30 shown in the browser image 20, and may be, for example, a menu. For example, the operation menu 24 may also have the function of the object 22. In this case, when the element 30 shown in the browser image 20 of the terminal screen 2 is selected by the pointer 21, the control unit 66 of the terminal device 10 instructs the display unit 60 to display the operation menu 24 in the vicinity of the element 30 shown in the browser image 20.

In addition, when there are a plurality of groups, it is not necessary to display, in the data list, a plurality of character strings (input data) belonging to each group for all the groups. For example, a plurality of character strings (input data) belonging to one group may be displayed as a representative.

Embodiment 2

In Embodiment 1, the control unit 66 performs, on the plurality of character strings belonging to GROUPS 2 and 3, processings common to the processings, which are performed on the plurality of character strings belonging to GROUP 1. However, the access device 11 may perform grouping. The control unit 42 of the access device 11 may perform, on the plurality of character strings belonging to GROUPS 2 and 3, processings common to the processings which are performed on the plurality of character strings belonging to GROUP 1. In this case, the control unit 66 of the terminal device 10 does not need to perform the second group processing, and some of the processings performed on the plurality of character strings belonging to GROUPS 2 and 3 by the control unit 66 are omitted.

By executing the basic program 50 and the browser program 51, one or more processing elements included in the control unit 42 of the access device 11 performs repetitive processing in which processings common to the processings performed on the plurality of character strings belonging to one group are repeated for the other groups.

Hereinafter, the differences between Embodiments 1 and 2 will be described. Since other configurations excluding the configuration to be described later are similar to those in Embodiment 1, components common to those in Embodiment 1 are denoted by the same reference numerals as in Embodiment 1 and the description thereof will be omitted.

As described in Embodiment 1 with reference to FIG. 35, the control unit 66 of the terminal device 10 groups the input data corresponding to the label names "TITLE", "ADDRESS", and "DESCRIPTION", and receives two group ranges corresponding to GROUPS 2 and 3. Thereafter, in Embodiment 2, the control unit 66 instructs the communication unit 63 to transmit the group information, which indicates a plurality of pieces of input data belonging to GROUP 1 and the received group range, to the communication unit 40 of the access device 11. When the communication unit 40 receives the group information, the control unit 42 of the access device 11 performs the repetitive processing.

FIG. 43 is a flowchart showing the procedure of the repetitive processing according to Embodiment 2. In the repetitive processing, the control unit 42 of the access device 11 groups a plurality of pieces of input data indicated by the group information received by the communication unit 40 in the storage unit 41 (step S131).

The plurality of pieces of input data indicated by the group information are a plurality of character strings extracted by the control unit 42 in the extraction processing. In addition, when the communication unit 40 receives the group information, the control unit 42 groups the plurality of pieces of input data which are extracted. Therefore, the group information corresponds to a grouping request. The communication unit 40 also functions as a second request receiving unit. The control unit 42 also functions as a grouping unit.

By the grouping, the processing can be performed in units of groups. Therefore, since the number of operations performed by the user is small, more efficient recording of the browser procedure is realized.

After executing step S131, the control unit 42 stores, in the storage unit 41, the group range indicated by the group information received by the communication unit 40 (step S132). Then, the control unit 42 stores, in the storage unit 41, a series of processings performed on a plurality of character strings belongs to one group, that is, GROUP 1, while the control unit 66 of the terminal device performs the group processing (step S133). Then, the control unit 42 performs processings common to the processings stored in step S133 on a plurality of character strings belonging to another group, that is, GROUPS 2 and 3 (step S134).

Then, the control unit 42 instructs the communication unit to transmit, to the communication unit 63 of the terminal device 10, processing result information indicating the result of the processing performed in step S134 (step S135). When the communication unit 63 receives the processing result information, the control unit 66 of the terminal device 10 instructs the display unit 60 to reflect the result indicated by the processing result information received by the communication unit 63 on the terminal screen 2. After executing step S135, the control unit 42 ends the repetitive processing.

The recording system 1 according to Embodiment 2 shows effects similar to those obtained in the recording system 1 according to Embodiment 1. In the recording system 1 according to Embodiment 2, some of the processings performed on a plurality of character strings belonging to GROUPS 2 and 3 by the control unit 66 of the terminal device 10 are omitted.

In Embodiments 1 and 2, when the user selects a plurality of ranges on the browser image 20, the group names of a plurality of groups belonging to the plurality of ranges are displayed or set in serial numbers, such as "GROUP 2" and "GROUP 3". However, the display or setting of the group name is not limited to the display or setting of the serial number. For example, the group names of a plurality of groups belonging to a plurality of ranges may be a common name, for example, "GROUP A".

In addition, in Embodiments 1 and 2, the data transmitted between the terminal device 10 and the access device 11 is not limited to the HTML format data. In addition, at least two of the access device 11, the management device 13, and the database device 14 may be realized by one server. In this case, for example, two or more virtual devices are realized in one server. In addition, the recording program 52 is not limited to a computer program executed by using the browser program 71 as a platform, and may be a computer program installed on the terminal device 10.

In addition, the extraction of a character string on the browser image 20 included in the object 22 may be realized by the control unit 66 of the terminal device 10. In this case, the control unit 66 extracts the character string directly from the browser image 20. In addition, the shape of the object 22 is not limited to the rectangular frame shape because the object 22 only needs to indicate the selection of the element 30. In addition, the device that transmits the recording program 52 to the terminal device 10 is not limited to the access device 11, and may be, for example, the management device 13.

It is noted that, as used herein and in the appended claims, the singular forms "a", "an", and "the" include plural referents unless the context clearly dictates otherwise.

The technical features (components) described in Embodiments 1 and 2 can be combined with each other, and new technical features can be formed by combining these.

It should be considered that Embodiments 1 and 2 disclosed are examples in all points and not restrictive. The scope of the present invention is defined by the claims rather than the meanings set forth above, and is intended to include all modifications within the scope and meaning equivalent to the claims.

The invention claimed is:

1. A non-transitory computer readable recording medium storing a computer program,
wherein the computer program is for recording a procedure of operations automatically performed on a browser screen which displays a web page, and
the computer program causes a computer to execute processings of:
displaying a browser image in which a portion of the web page of the browser screen is shown;
outputting a selection position selected by clicking or tapping on the browser image to an external device;
acquiring, regarding an element located at a screen position of the browser screen corresponding to the output selection position, element information indicating a size of the element and an image position of the element on the browser image from the external device; and
displaying an object, which indicates that the element is selected, on the browser image based on the acquired element information,
wherein
browser procedure data indicating the recorded procedure is stored in a database device, and
according to the procedure indicated by the browser procedure data read from the database device, a series of operations are automatically performed.

2. The recording medium according to claim 1, the computer program causing the computer to execute processing of:
  displaying an operation menu indicating a plurality of operations, in a vicinity of the object or so as to overlap the object.

3. The recording medium according to claim 2, the computer program causing the computer to execute processings of:
  receiving a selection of a button provided on the object; and
  displaying the operation menu when the button is selected.

4. The recording medium according to claim 1, the computer program causing the computer to execute processing of:
  displaying input data, which is to be input in an element corresponding to the object, together with the browser image.

5. The recording medium according to claim 4, the computer program causing the computer to execute processing of:
  displaying the input data together with the browser image so as to be associated with a name of the input data.

6. The recording medium according to claim 1, the computer program causing the computer to execute processing of:
  storing input data inputtable to an element corresponding to the object;
  receiving a selection of one of a plurality of operations including, as one operation, an input of the stored input data; and
  inputting the stored input data to an element corresponding to the object when the input of the stored input data is selected.

7. The recording medium according to claim 1, the computer program causing the computer to execute processings of:
  storing a plurality of character strings included respectively in a plurality of objects on the browser image; and
  grouping the plurality of stored character strings.

8. The recording medium according to claim 7, the computer program causing the computer to execute processing of:
  displaying the plurality of character strings which are grouped.

9. The recording medium according to claim 7, the computer program causing the computer to execute processings of:
  receiving an operation using at least one of the plurality of character strings which are grouped;
  receiving a selection of an object on the browser image corresponding to the browser screen after the received operation is performed;
  storing a second character string included in the selected object; and
  adding the second character string to a group including the plurality of character strings.

10. The recording medium according to claim 9, the computer program causing the computer to execute processings of:
  receiving a selection of a range on the browser image; and
  performing processing common to processing performed on the plurality of character strings which are grouped, on a plurality of character strings included in the selected range.

11. A recording system, comprising:
  a recording device that records a procedure of operations automatically performed on a browser screen which displays a web page; and
  an analysis device,
  wherein the recording device includes:
  a display unit that displays a browser image in which a portion of the web page of the browser screen is shown;
  an output unit that outputs, to the analysis device, a selection position selected by clicking or tapping on the browser image displayed by the display unit; and
  a processor,
  wherein the analysis device analyzes, regarding the element located at the screen position of the browser screen corresponding to the selection position output from the output unit, the size of the element and the image position of the element on the browser image,
  the processor executes processing of acquiring, from the analysis device, element information indicating the size and the image position analyzed by the analysis device,
  the display unit displays an object, which indicates that the element is selected, based on the element information acquired from the analysis device,
  browser procedure data indicating the procedure recorded by the recording device is stored in a database device, and
  according to the procedure indicated by the browser procedure data read from the database device, a series of operations are automatically performed.

12. The recording system according to claim 11, further comprising:
  a transmission device that transmits authentication information to the recording device when an authentication request is received,
  wherein the recording device further includes:
  a first transmission unit that transmits the authentication request to the transmission device;
  an information receiving unit that receives the authentication information from the transmission device; and
  a second transmission unit that transmits the authentication information received by the information receiving unit to the analysis device, and
  the analysis device performs processing relevant to the browser screen when the authentication information transmitted to the recording device by the transmission device is received from the second transmission unit.

13. A recording device,
  wherein the recording device records a procedure of operations automatically performed on a browser screen which displays a web page, the operations being performed by clicking or tapping,
  browser procedure data indicating the recorded procedure is stored in a database device, and
  according to the procedure indicated by the browser procedure data read from the database device, a series of operations are automatically performed,
  the recording device comprises:
  a display unit that displays a browser image in which a portion of the web page of the browser screen is shown;
  an output unit that outputs, to an external device, a selection position selected by clicking or tapping on the browser image displayed by the display unit; and
  a processor,
  wherein the processor execute processing of acquiring, regarding an element located at a screen position of the browser screen corresponding to the selection position output from the output unit, element information indicating a size of the element and an image position of the element on the browser image from the external device, and the display unit displays an object, which indicates that the element is selected, based on the element information acquired by the element acquisition unit.

14. An analysis device, comprising:

a processor; and a transmission unit, wherein the processor executes processings of:

acquiring, from a recording device that records a procedure of operations automatically performed on a browser screen which displays a web page, a selection position selected by clicking or tapping on a browser image in which a portion of the web page of the browser screen is shown; and analyzing, regarding an element located at a screen position of the browser screen corresponding to the acquired selection position, a size of the element and an image position of the element on the browser image, transmitting, by the transmission unit, element information indicating the analyzed size and the analyzed image position to the recording device, wherein browser procedure data indicating the recorded procedure is stored in a database device, and according to the procedure indicated by the browser procedure data read from the database device, a series of operations are automatically performed.

15. The analysis device according to claim 14, further comprising:

a request receiving unit that receives, from the recording device, an extraction request to make a request for extraction of a character string in an object which is displayed on the browser image based on the element information transmitted by the transmission unit and which indicates that the element is selected, wherein the processor executes processing of extracting the character string in the object from the browser screen when the request receiving unit receives the extraction request, and the transmission unit transmits the extracted character string to the recording device.

16. The analysis device according to claim 15, further comprising:

a second request receiving unit that receives, from the recording device, a grouping request to make a request for grouping of a plurality of the extracted character strings, wherein the processor executes processing of grouping the plurality of the extracted character strings when the second request receiving unit receives the grouping request.

17. A recording method, wherein the recording method is for recording a procedure of operations automatically performed on a browser screen which displays a web page, browser procedure data indicating the recorded procedure is stored in a database device, according to the procedure indicated by the browser procedure data read from the database device, a series of operations are automatically performed, and the recording method causes a computer to execute processings of:

displaying a browser image in which a portion of the web page of the browser screen is shown;

outputting position information, which indicates a selection position selected by clicking or tapping on the browser image, to an external device;

acquiring, regarding an element located at a screen position of the browser screen corresponding to the selection position indicated by the position information, element information indicating a size of the element and an image position of the element on the browser image from the external device; and displaying an object, which indicates that the element is selected, on the browser image based on the acquired element information.

* * * * *